US012495629B2

(12) United States Patent
Yoneda et al.

(10) Patent No.: US 12,495,629 B2
(45) Date of Patent: Dec. 9, 2025

(54) IMAGING DEVICE, ELECTRONIC DEVICE, AND MOVING OBJECT

(71) Applicant: SEMICONDUCTOR ENERGY LABORATORY CO., LTD., Atsugi (JP)

(72) Inventors: Seiichi Yoneda, Kanagawa (JP); Hiroki Inoue, Kanagawa (JP); Yusuke Negoro, Osaka (JP); Takayuki Ikeda, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 555 days.

(21) Appl. No.: 17/904,115

(22) PCT Filed: Feb. 8, 2021

(86) PCT No.: PCT/IB2021/050982
§ 371 (c)(1),
(2) Date: Aug. 12, 2022

(87) PCT Pub. No.: WO2021/165781
PCT Pub. Date: Aug. 26, 2021

(65) Prior Publication Data
US 2023/0090488 A1    Mar. 23, 2023

(30) Foreign Application Priority Data

Feb. 20, 2020   (JP) ................................ 2020-027302

(51) Int. Cl.
H01L 27/146  (2006.01)
H01L 29/786  (2006.01)
(Continued)

(52) U.S. Cl.
CPC .... *H10F 39/80377* (2025.01); *H10D 30/6755* (2025.01); *H10D 30/6757* (2025.01); *H10F 39/8053* (2025.01)

(58) Field of Classification Search
CPC .......... H10D 30/6757; H10D 30/6755; H10D 30/6734; H10D 86/60; H10D 86/423;
(Continued)

(56) References Cited

U.S. PATENT DOCUMENTS 8,378,391 B2   2/2013  Koyama et al.
9,236,408 B2   1/2016  Yamazaki
(Continued)

FOREIGN PATENT DOCUMENTS

CN    101834194 A    9/2010
CN    104969353 A    10/2015
(Continued)

OTHER PUBLICATIONS

International Search Report (Application No. PCT/IB2021/050982) Dated Jun. 1, 2021.
(Continued)

*Primary Examiner* — Nikolay K Yushin
(74) *Attorney, Agent, or Firm* — Fish & Richardson P.C.

(57) ABSTRACT

A small-sized and highly functional imaging device is provided. The imaging device includes a photoelectric conversion device formed on a silicon substrate and a transistor including a channel formation region in a silicon epitaxial growth layer formed on the silicon substrate. The transistor provided in the epitaxial growth layer has favorable electrical characteristics, so that the imaging device with little noise can be formed. Since the transistor can be formed so as to have a region overlapping with the photoelectric conversion device, the imaging device can be downsized.

18 Claims, 32 Drawing Sheets

(51) Int. Cl.
*H10D 30/67* (2025.01)
*H10F 39/00* (2025.01)

(58) Field of Classification Search
CPC .. H10D 86/481; H10D 30/67; H10D 30/6708; H10D 30/6715; H10D 86/40; H10F 39/12; H10F 39/80377; H10F 39/8053; H04N 25/70; H04N 25/76; H04N 25/54; H04N 25/12; H01L 21/768; H01L 21/3205; H01L 21/443; H01L 23/522; H01L 23/481; H01L 23/485
See application file for complete search history.

(56) References Cited

U.S. PATENT DOCUMENTS

| | | | |
|---|---|---|---|
| 9,543,356 | B2 | 1/2017 | Gambino et al. |
| 9,564,465 | B2 | 2/2017 | Tayanaka |
| 9,704,899 | B2 | 7/2017 | Kurokawa |
| 9,787,924 | B2 | 10/2017 | Tezuka |
| 9,947,700 | B2 | 4/2018 | Yamazaki et al. |
| 9,961,284 | B2 | 5/2018 | Koga |
| 10,163,962 | B2 | 12/2018 | Tayanaka |
| 10,192,913 | B2 | 1/2019 | Kurokawa |
| 10,237,500 | B2 | 3/2019 | Koga |
| 10,462,398 | B2 | 10/2019 | Koga |
| 10,951,850 | B2 | 3/2021 | Yamamoto et al. |
| 10,965,893 | B2 | 3/2021 | Koga |
| 11,024,665 | B2 * | 6/2021 | Sakaida ................ H10F 39/028 |
| 11,575,847 | B2 | 2/2023 | Koga |
| 11,902,678 | B2 | 2/2024 | Koga |
| 11,985,443 | B2 * | 5/2024 | Gocho ................... H04N 25/77 |
| 12,107,095 | B2 | 10/2024 | Okura et al. |
| 12,177,584 | B2 | 12/2024 | Koga |
| 2010/0230729 | A1 | 9/2010 | Ellis-Monaghan et al. |
| 2015/0279884 | A1 | 10/2015 | Kusumoto |
| 2016/0020247 | A1 | 1/2016 | Ohri |
| 2017/0186800 | A1 | 6/2017 | Ikeda et al. |
| 2020/0027910 | A1 | 1/2020 | Okura et al. |
| 2020/0099881 | A1 | 3/2020 | Kurokawa |
| 2020/0119098 | A1 * | 4/2020 | Sakaida ................ H10F 39/811 |
| 2020/0145600 | A1 | 5/2020 | Yamamoto et al. |
| 2020/0304691 | A1 | 9/2020 | Ohmaru |
| 2021/0134860 | A9 | 5/2021 | Ikeda et al. |
| 2021/0202549 | A1 | 7/2021 | Yoneda et al. |
| 2021/0225912 | A1 | 7/2021 | Ikeda |
| 2021/0273007 | A1 | 9/2021 | Takahashi et al. |
| 2021/0281777 | A1 | 9/2021 | Watanabe et al. |
| 2021/0291771 | A1 | 9/2021 | Yamazaki et al. |
| 2021/0391468 | A1 | 12/2021 | Yamazaki |
| 2021/0400224 | A1 * | 12/2021 | Gocho .................. H10F 39/802 |
| 2022/0102419 | A1 | 3/2022 | Yamazaki et al. |
| 2022/0406849 | A1 | 12/2022 | Kanemura et al. |

FOREIGN PATENT DOCUMENTS

| | | |
|---|---|---|
| CN | 110832845 A | 2/2020 |
| EP | 3598501 A | 1/2020 |
| EP | 3654635 A | 5/2020 |
| JP | 2008-060195 A | 3/2008 |
| JP | 2010-212668 A | 9/2010 |
| JP | 2011-119711 A | 6/2011 |
| JP | 2014-236183 A | 12/2014 |
| JP | 2015-046477 A | 3/2015 |
| JP | 2015-177323 A | 10/2015 |
| JP | 2019-212918 A | 12/2019 |
| JP | 2020-017724 A | 1/2020 |
| KR | 2010-0102043 A | 9/2010 |
| KR | 2015-0127577 A | 11/2015 |
| KR | 2020-0028967 A | 3/2020 |
| TW | 201436184 | 9/2014 |
| TW | 201448184 | 12/2014 |
| TW | 201933598 | 8/2019 |
| WO | WO-2014/141898 | 9/2014 |
| WO | WO-2018/185587 | 10/2018 |
| WO | WO-2019/012369 | 1/2019 |

OTHER PUBLICATIONS

Written Opinion (Application No. PCT/IB2021/050982) Dated Jun. 1, 2021.
Taiwanese Office Action (Application No. 110105493) Dated Dec. 31, 2024.

* cited by examiner $a = x_1 w_1 + x_2 w_2 + b$

FIG. 30A1
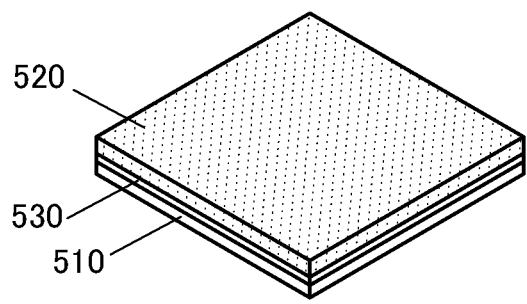
FIG. 30B1
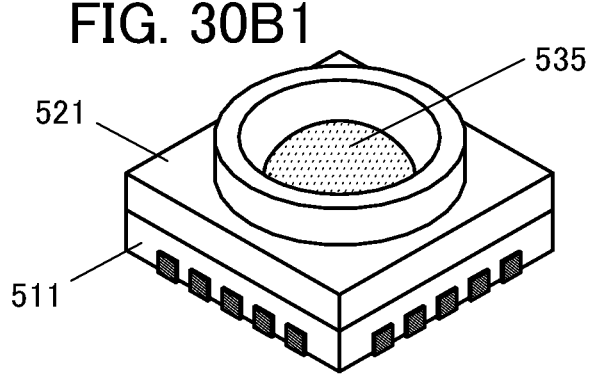
FIG. 30A2
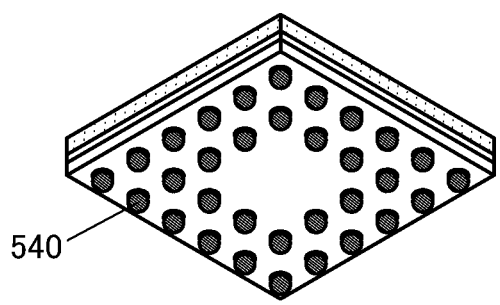
FIG. 30B2
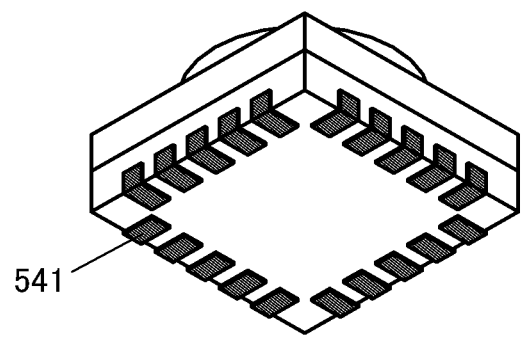
FIG. 30A3
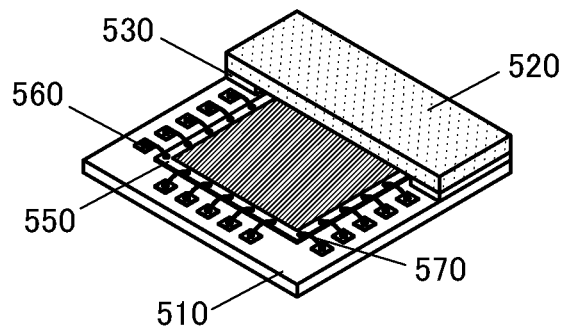
FIG. 30B3
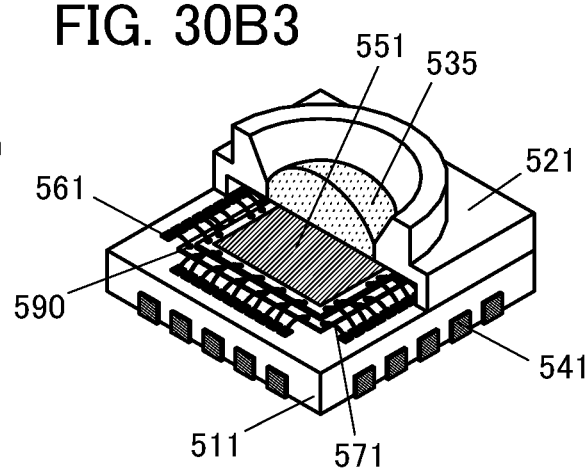

IMAGING DEVICE, ELECTRONIC DEVICE, AND MOVING OBJECT

CROSS REFERENCE TO RELATED APPLICATIONS

This application is a U.S. National Phase Application under 35 U.S.C. § 371 of International Application PCT/IB2021/050982, filed on Feb. 8, 2021, which is incorporated by reference and claims the benefit of a foreign priority application filed in Japan on Feb. 20, 2020, as Application No. 2020-027302.

TECHNICAL FIELD

One embodiment of the present invention relates to an imaging device.

Note that one embodiment of the present invention is not limited to the above technical field. The technical field of one embodiment of the invention disclosed in this specification and the like relates to an object, a method, or a manufacturing method. Another embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, an imaging device, an operation method thereof, and a manufacturing method thereof.

Note that in this specification and the like, a semiconductor device refers to any device that can function by utilizing semiconductor characteristics. A transistor and a semiconductor circuit are embodiments of semiconductor devices. A storage device, a display device, an imaging device, or an electronic device includes a semiconductor device in some cases.

BACKGROUND ART

A technique for forming a transistor by using an oxide semiconductor thin film formed over a substrate has attracted attention. For example, an imaging device with a structure in which a transistor that includes an oxide semiconductor and has an extremely low off-state current is used in a pixel circuit is disclosed in Patent Document 1.

REFERENCE

Patent Document

[Patent Document 1] Japanese Published Patent Application No. 2011-119711

SUMMARY OF THE INVENTION

Problems to be Solved by the Invention

Imaging devices mounted on portable devices and the like generally have a function of acquiring images with high definition. Next-generation imaging devices are required to have higher function.

In contrast, downsizing of imaging devices is also required so as to be incorporated into a variety of devices. Hence, components necessary to obtain highly functional imaging devices are preferably arranged while being stacked.

However, in the case where a plurality of devices or the like using silicon substrates are stacked, a polishing step, a bonding step, and the like are required to be performed a plurality of times. Thus, improvement in the yield is a challenge.

In view of the above, an object of one embodiment of the present invention is to provide a highly functional imaging device. Another object is to provide a small imaging device. Another object is to provide an imaging device or the like capable of high-speed operation. Another object is to provide an imaging device with high reliability. Another object is to provide a novel imaging device or the like. Another object is to provide a method for driving the above imaging device. Another object is to provide a novel semiconductor device or the like.

Note that the description of these objects does not preclude the existence of other objects. One embodiment of the present invention does not have to achieve all these objects. Other objects are apparent from the description of the specification, the drawings, the claims, and the like, and other objects can be derived from the description of the specification, the drawings, the claims, and the like.

Means for Solving the Problems

One embodiment of the present invention relates to an imaging device having a stacked structure of a plurality of devices.

One embodiment of the present invention is an imaging device including a first layer and a second layer. The first layer includes a region overlapping with the second layer. The first layer includes a semiconductor substrate and a photoelectric conversion device including a light-receiving plane that is a first plane of the semiconductor substrate. The second layer includes a semiconductor layer and a first transistor including a channel formation region in the semiconductor layer. The semiconductor layer is provided in contact with a second plane opposite to the first plane of the semiconductor substrate. The photoelectric conversion device is electrically connected to the first transistor. The photoelectric conversion device and the first transistor have a region where they overlap with each other.

A single crystal silicon substrate can be used as the semiconductor substrate, and a silicon epitaxial growth layer formed on the single crystal silicon substrate can be used as the semiconductor layer.

The first transistor can be used as a component of a pixel circuit or a driver circuit of the pixel circuit.

A third layer can be further included. The third layer includes a region overlapping with the first layer with the second layer therebetween. The third layer includes a second transistor including a metal oxide in a channel formation region. The second transistor is electrically connected to the photoelectric conversion device and/or the first transistor. The second transistor includes a region overlapping with the photoelectric conversion device and/or the first transistor.

The metal oxide preferably includes In, Zn, and M (M is one or more of Al, Ti, Ga, Ge, Sn, Y, Zr, La, Ce, Nd, and Hf).

The second transistor can be used as a component of the pixel circuit or the driver circuit of the pixel circuit.

A fourth layer can be further included. The fourth layer includes a region overlapping with the second layer with the first layer therebetween. The fourth layer includes a color filter. The color filter includes a region overlapping with the photoelectric conversion device.

Effect of the Invention

With the use of one embodiment of the present invention, a highly functional imaging device can be provided. A small imaging device can be provided. An imaging device or the like capable of high-speed operation can be provided. An imaging device with high reliability can be provided. A novel imaging device or the like can be provided. A method for driving the above imaging device can be provided. A novel semiconductor device or the like can be provided.

BRIEF DESCRIPTION OF THE DRAWINGS

FIG. 30A1 to FIG. 30A3 and FIG. 30B1 to FIG. 30B3 are perspective views of a package in which an imaging device is placed and a module in which an imaging device is placed.

MODE FOR CARRYING OUT THE INVENTION

Figure 1:
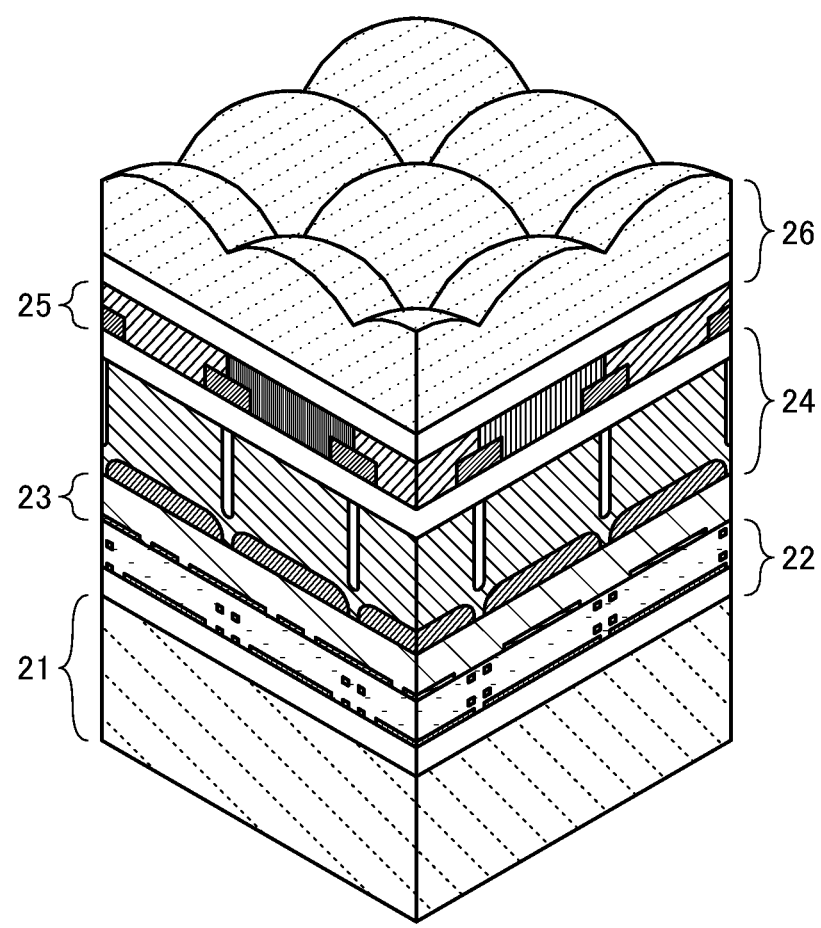
FIG. 1 is a diagram showing a pixel.

Embodiments are described in detail with reference to the drawings. However, the present invention is not limited to the following description, and it is readily appreciated by those skilled in the art that modes and details can be modified in various ways without departing from the spirit and the scope of the present invention. Therefore, the present invention should not be interpreted as being limited to the descriptions of embodiments below. Note that in structures of the invention described below, the same portions or portions having similar functions are denoted by the same reference numerals in different drawings, and the description thereof is not repeated in some cases. The same components are denoted by different hatching patterns in different drawings, or the hatching patterns are omitted in some cases.

Even in the case where a single component is illustrated in a circuit diagram, the component may be composed of a plurality of parts as long as there is no functional inconvenience. For example, in some cases, a plurality of transistors that operate as a switch may be connected in series or in parallel. In some cases, capacitors are divided and arranged in a plurality of positions.

One conductor has a plurality of functions such as a wiring, an electrode, and a terminal in some cases. In this specification, a plurality of names are used for the same component in some cases. Even in the case where components are illustrated in a circuit diagram as if they were directly connected to each other, the components may actually be connected to each other through one conductor or a plurality of conductors. In this specification, even such a configuration is included in direct connection.

Embodiment 1

In this embodiment, an imaging device of one embodiment of the present invention is described with reference to drawings.

One embodiment of the present invention is an imaging device including a plurality of stacked devices each including a silicon semiconductor. The imaging device includes a photoelectric conversion device (also referred to as a photoelectric conversion element) including a photoelectric conversion layer on a silicon substrate, and a transistor including a channel formation region in a silicon layer formed on the silicon substrate. The silicon layer is an epitaxial growth layer formed on the silicon substrate.

The transistor is formed on the epitaxial growth layer with few crystal defects, which allows formation of an imaging device having favorable electrical characteristics and little noise. Since the transistor can be formed so as to have a region overlapping with the photoelectric conversion device, downsizing of the imaging device can be achieved by using the transistor for formation of a pixel circuit, a driver circuit, and the like.

A transistor including a metal oxide in a channel formation region (hereinafter referred to as an OS transistor) can be formed over the silicon layer. When an appropriate circuit is formed with the OS transistor, a highly functional imaging device can be formed without using a bonding step or the like.

<Stacked Structure>

FIG. 1 is a perspective view including a cross section of a pixel in the imaging device of one embodiment of the present invention. The pixel has a stacked structure, and includes a layer 21, a layer 22, a layer 23, a layer 24, a layer 25, and a layer 26. The layer 21 includes a support substrate and the like. The layer 22 includes a wiring and the like. The layer 22 can also include a transistor and the like. The layer 23 includes a transistor and the like. The layer 24 includes a photoelectric conversion device and the like. The layer 25 includes a photoelectric conversion layer and the like. The layer 26 includes a microlens array and the like.

The transistors and the like provided in the layer 22 and the layer 23 can constitute a pixel circuit (excluding the photoelectric conversion device), a driver circuit of the pixel circuit, a reading circuit, a memory circuit, an arithmetic circuit, and the like. Note that in the following description, these circuits are collectively referred to as a functional circuit in some cases.

Figure 2:
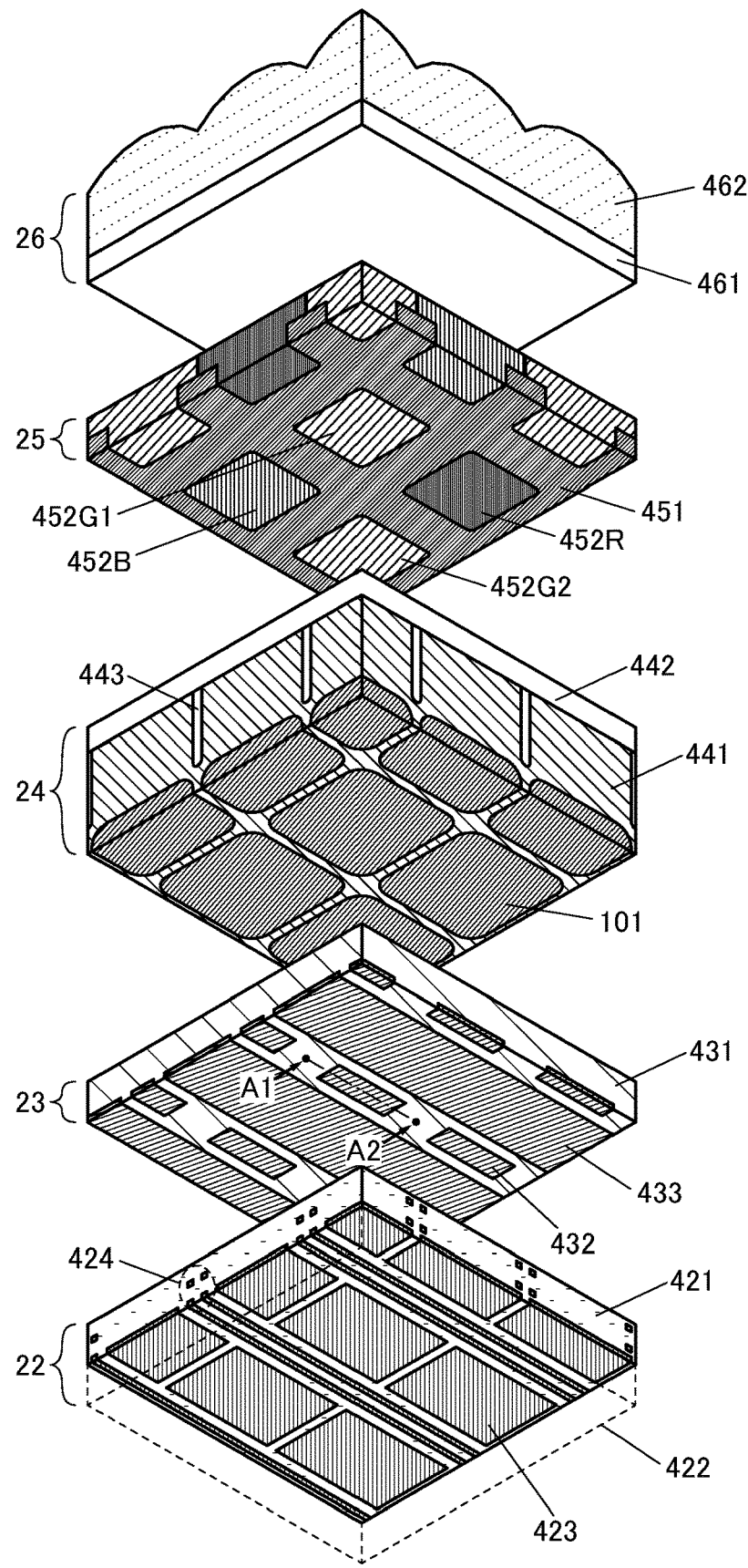
FIG. 2 is a diagram showing a pixel.

Detailed structures of the respective layers are described with reference to FIG. 2. FIG. 2 illustrates the separated layers of the stacked structure illustrated in FIG. 1. Note that components included in each layer are not limited to components illustrated in FIG. 2, and another component may be included. In a structure in which two layers are in contact with each other, a component such as an insulating layer positioned near the boundary is illustrated as a component of one of the layers for convenience, but may be a component of the other of the layers.

Note that the layer 21 is not illustrated in FIG. 2. The layer 21 is a support substrate, which preferably has hardness and a flat surface. For example, a semiconductor substrate of silicon or the like, a glass substrate, a ceramic substrate, a metal substrate, or a resin substrate can be used. A structure without the layer 21 may also be employed. The layers are described below in an appropriate order.

<Layer 24>

The layer 24 includes photoelectric conversion devices 101, an insulating layer 442, element separation layers 443, and the like, which are provided on a single crystal silicon substrate 441. The insulating layer 442 is provided in contact with a first plane of the single crystal silicon substrate 441, and a second plane opposite to the first plane is provided with a layer having a conductivity type opposite to that of the single crystal silicon substrate 441. The photoelectric conversion devices 101 are pn-junction photodiodes each having a light-receiving plane that is the first plane of the single crystal silicon substrate 441. The plurality of photoelectric conversion devices 101 are separated by the element separation layers 443, and when each of the photoelectric conversion devices 101 and a color filter included in the layer 25 are combined to operate, data for constituting a color image can be acquired.

<Layer 23>

The layer 23 includes a circuit 432. The layer 23 may also include a circuit 433. Here, the circuit 432 can be a component of the pixel circuit. The circuit 433 can be a component of a functional circuit other than the pixel circuit. Each of the circuit 432 and the circuit 433 can include a transistor as a component, which includes a channel formation region in a semiconductor layer 431.

The semiconductor layer 431 is an epitaxial growth layer formed on the second plane of the single crystal silicon substrate 441 included in the layer 24. The silicon epitaxial growth layer (single crystal silicon layer) can grow on the single crystal silicon substrate by hydrogen reduction of silicon tetrachloride or trichlorosilane at a high temperature of approximately 1150° C. to 1200° C.

Transistors constituting the photoelectric conversion device, the pixel circuit, and the like are conventionally formed on the same single crystal silicon substrate. However, the single crystal silicon substrate contains a large amount of impurities such as oxygen entering in the manufacturing process and includes many crystal defects generated in the formation step of the photoelectric conversion device or the like. The impurities and crystal defects adversely affect the electrical characteristics and the like of the transistors.

In one embodiment of the present invention, the transistors are formed on the semiconductor layer 431, which is formed by epitaxial growth and includes a small amount of impurities such as oxygen and few crystal defects; thus, a circuit with favorable electrical characteristics and little noise can be formed. In addition, the circuit 432 and the circuit 433 can be formed so as to have a region overlapping with the photoelectric conversion device 101, allowing downsizing of the imaging device. Since the transistors do not need to be provided in the layer 24, the area of the photoelectric conversion device 101 can be enlarged to increase photosensitivity. Furthermore, a complicated step such as a bonding step is not used, so that an inexpensive imaging device can be provided at high yield. Note that the epitaxial growth layer is a single crystal layer continuous from the silicon single crystal substrate, and the interface therebetween can be determined by measuring the amount of impurities such as oxygen by secondary ion mass spectrometry (SIMS).

<Layer 22>

The layer 22 has a multilayer structure including components such as wirings and insulating layers, and includes wirings 424, an insulating layer 421, an insulating layer 422, and the like. A circuit 423 may also be provided. The insulating layer 422 provided between the layer 22 and the layer 21 is illustrated by a dashed line for clarity.

The circuit 423 is a component of the functional circuit and an OS transistor can be used in part or the whole of the circuit 423. The OS transistor can be formed with a stack of thin films and can be formed over a Si device or the like by using a process common to a wiring process or the like. Hence, the circuit and the like can be easily stacked without using a bonding step or the like.

The plurality of wirings 424 are arranged in the insulating layer 421, on a surface of the insulating layer 421, or the like. The insulating layer 421 may also be a stack of a plurality of layers. The wirings 424 can be used as wirings electrically connected to the circuit 432, the circuit 433, and the like included in the layer 23.

<Layer 25>

The layer 25 is a layer including a photoelectric conversion layer; an example shown here includes color filters 452R, 452G1, 452G2, and 452B corresponding to color imaging. The layer 25 includes a light-blocking layer 451.

The color filter 452R is colored red, the color filters 452G1 and 452G2 are colored green, and the color filter 452B is colored blue. The color filters 452R, 452G1, 452G2, and 452B are provided in regions overlapping with the corresponding photoelectric conversion devices 101.

The light-blocking layer 451 is provided in a position overlapping with a boundary between the color filters, and can prevent light passing through a color filter from entering an adjacent pixel.

<Layer 26>

The layer 26 includes a microlens array 462 and an insulating layer 461. The microlens array 462 has a function of condensing incident light and making light efficiently enter the photoelectric conversion devices 101.

<Pixel Circuit 1>

Figure 3A:
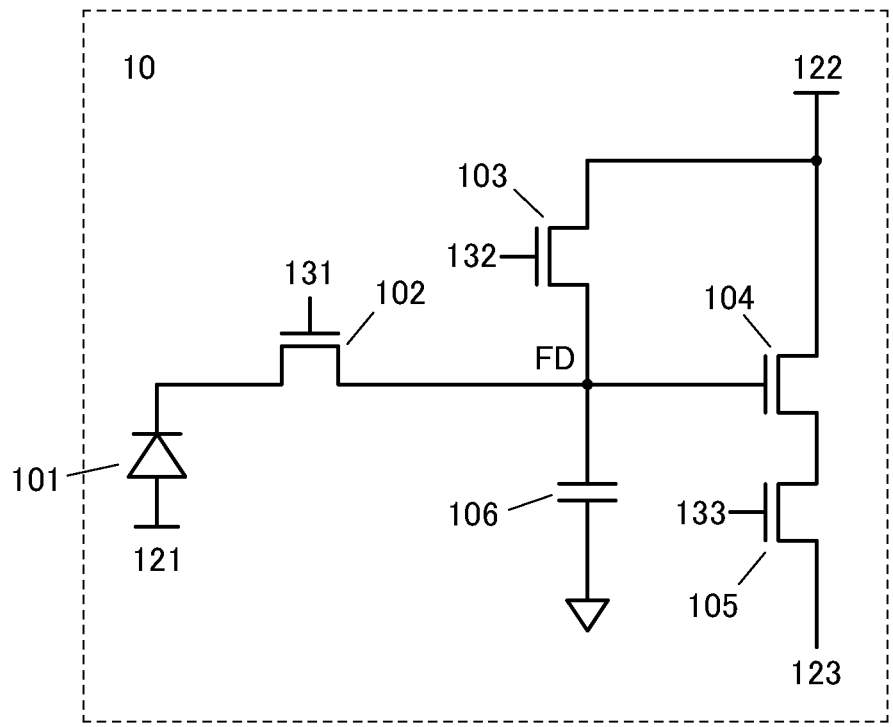
FIG. 3A and FIG. 3B are diagrams each showing a pixel circuit.

FIG. 3A is a circuit diagram showing an example of a pixel 10. The pixel 10 includes the photoelectric conversion device 101, a transistor 102, a transistor 103, a transistor 104, a transistor 105, and a capacitor 106. For example, the transistor 102, the transistor 103, the transistor 104, the transistor 105, and the capacitor 106 can be components included in the circuit 432 illustrated in FIG. 2.

One electrode of the photoelectric conversion device 101 is electrically connected to one of a source and a drain of the transistor 102. The other of the source and the drain of the transistor 102 is electrically connected to one of a source and a drain of the transistor 103, a gate of the transistor 104, and one electrode of the capacitor 106. One of a source and a drain of the transistor 104 is electrically connected to the other of the source and the drain of the transistor 105.

Here, a point where the other of the source and the drain of the transistor 102, the one of the source and the drain of the transistor 103, the gate of the transistor 104, and the one electrode of the capacitor 106 are electrically connected is a node FD. The node FD can function as a charge detection portion.

The other electrode of the photoelectric conversion device 101 is electrically connected to a wiring 121. The other of the source and the drain of the transistor 103 is electrically connected to a wiring 122. The other of the source and the drain of the transistor 104 is electrically connected to the wiring 122. The other of the source and the drain of the transistor 105 is electrically connected to a wiring 123.

A gate of the transistor 102 is electrically connected to a wiring 131. A gate of the transistor 103 is electrically connected to a wiring 132. A gate of the transistor 105 is electrically connected to a wiring 133.

The wirings 121 and 122 can each function as a power supply line. In the structure illustrated in FIG. 3A, the wiring 121 can be a low-potential power supply line, and the wiring 122 can be a high-potential power supply line.

The wirings 131, 132, and 133 can function as signal lines for controlling conduction of the respective transistors. The wiring 123 can function as an output line, and is electrically connected to a reading circuit including a correlated double sampling circuit (CDS circuit), an A/D converter circuit, and the like, for example.

The transistor 102 has a function of reading out electric charge from the photoelectric conversion device 101 and controlling the potential of the node FD. The transistor 103 has a function of resetting the potential of the node FD. The transistor 104 functions as a component of a source follower circuit. The transistor 105 has a function of selecting output of the pixel.

Figure 3B:
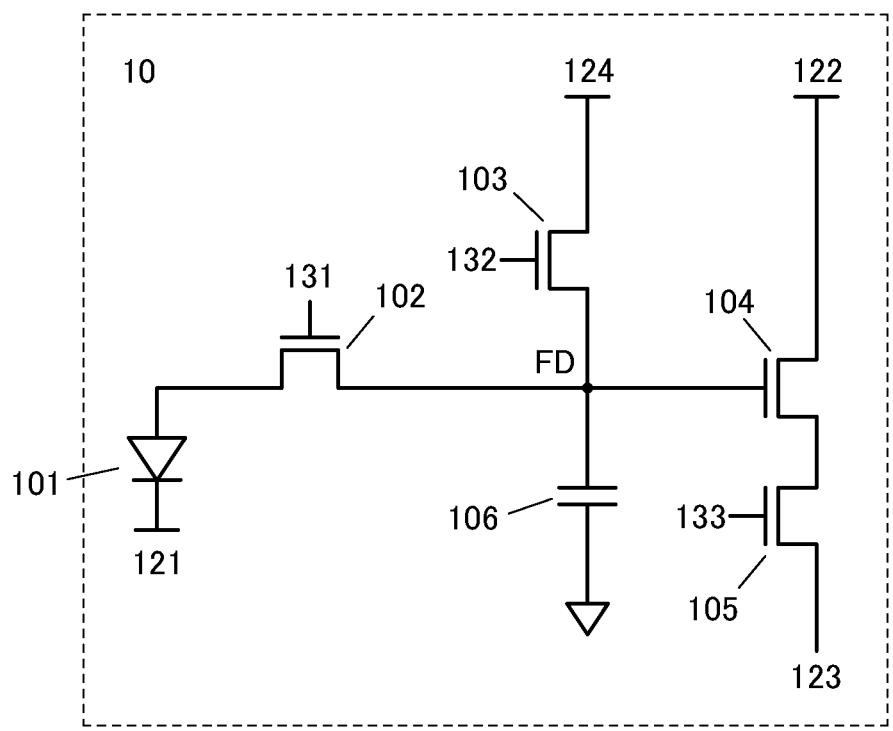

In the circuit of the pixel 10, the connection relation of the cathode and the anode of the photoelectric conversion device 101 in FIG. 3A may be reversed as illustrated in FIG. 3B. In this case, the other of the source and the drain of the transistor 103 is electrically connected to a wiring 124, the wirings 121 and 122 are high-potential power supply lines, and the wiring 124 is a low-potential power supply line.

<Layout 1>

Figure 5:
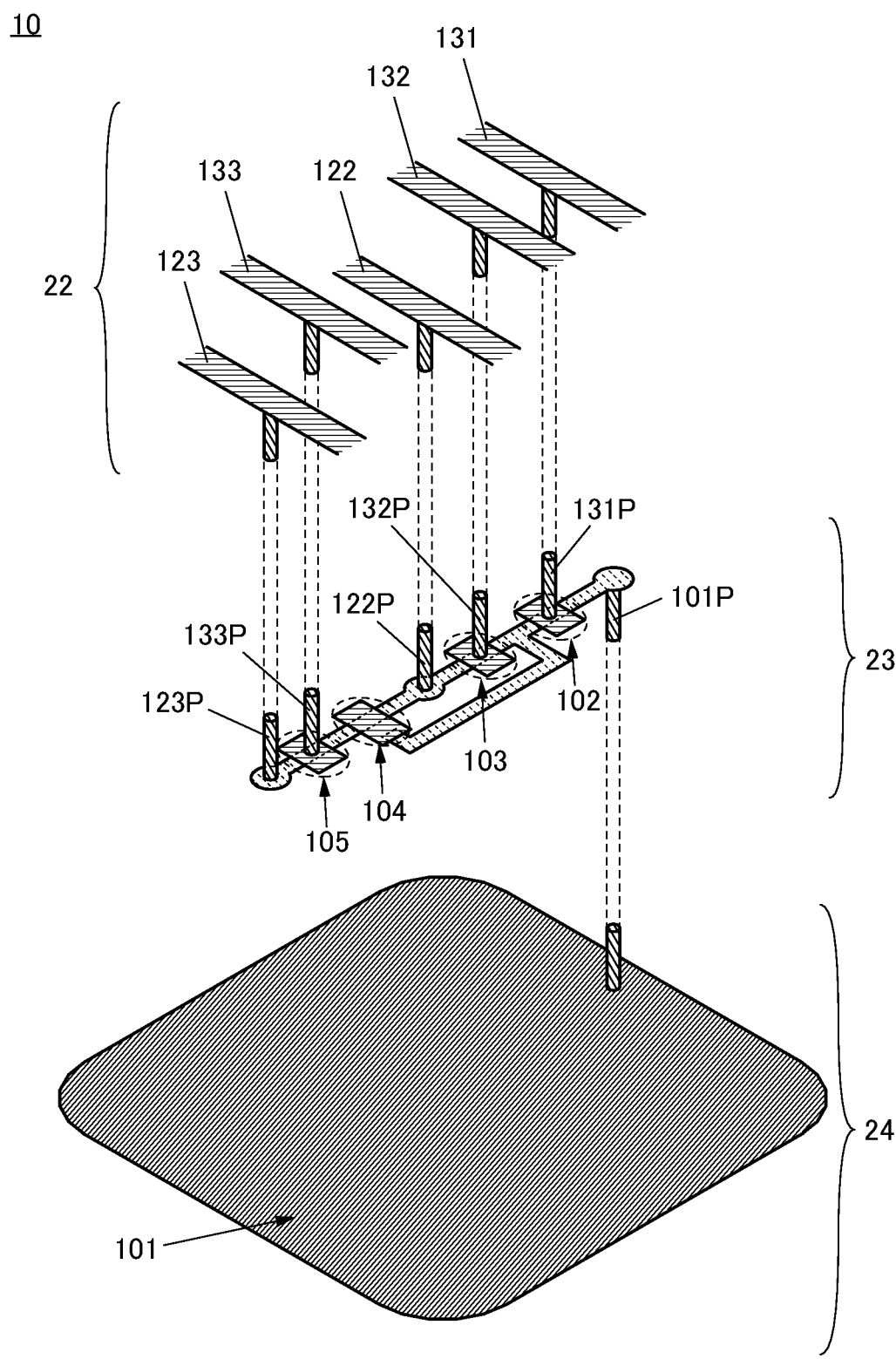
FIG. 5 is a diagram showing a layout of a pixel circuit.

FIG. 5 is a perspective view of a simple layout of the components of the pixel 10 illustrated in FIG. 3A and FIG. 3B. FIG. 5 illustrates an example in which the transistors provided in the layer 23 are electrically connected to the wirings provided in the layer 22 or the photoelectric conversion device provided in the layer 24 through plugs.

Specifically, the one of the source and the drain of the transistor 102 is electrically connected to the one electrode of the photoelectric conversion device 101 through a plug 101P. The other of the source and the drain of the transistor 103 and the other of the source and the drain of the transistor 104 are electrically connected to the wiring 122 through a plug 122P. The other of the source and the drain of the transistor 105 is electrically connected to the wiring 123 through a plug 123P. The gate of the transistor 102 is electrically connected to the wiring 131 through a plug 131P. The gate of the transistor 103 is electrically connected to the wiring 132 through a plug 132P. The gate of the transistor 105 is electrically connected to the wiring 133 through a plug 133P.

The wirings 122, 123, 131, 132, and 133 provided in the layer 22 are each a multilayer wiring, which does not necessarily include wirings parallel to each other and may include wirings orthogonal to each other. The components may be electrically connected through a plurality of plugs. The components may be electrically connected through a plug and a wiring in combination.

<Layout 2>

Figure 6:
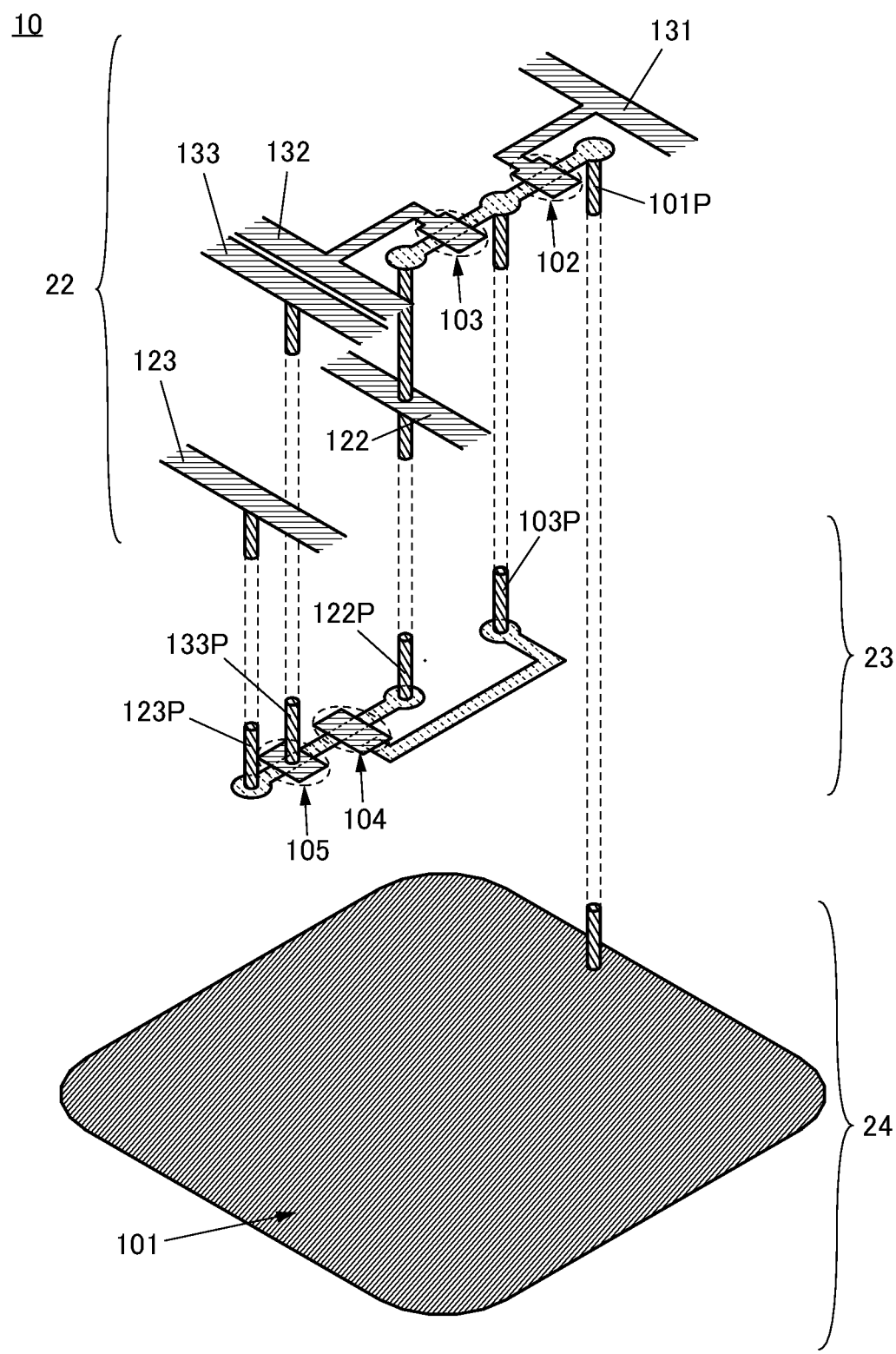
FIG. 6 is a diagram showing a layout of a pixel circuit.

FIG. 6 illustrates an example of the pixel 10, which is different from that in FIG. 5. The layout illustrated in FIG. 6 is different from that in FIG. 5 in that the transistor 102 and the transistor 103 are provided in the layer 22. In this layout, the other of the source and the drain of the transistor 102 and the one of the source and the drain of the transistor 103 are electrically connected to the gate of the transistor 104 through a plug 103P.

OS transistors can be used as the transistor 102 and the transistor 103. The OS transistor has a characteristic of an extremely low off-state current. When the transistors with a low off-state current are used as the transistors 102 and 103, the electric charge retention period at the node FD can be elongated greatly, and image data with little deterioration can be read out. That is, a global shutter operation in which all the pixels concurrently perform an image capturing operation is possible. Note that a rolling shutter operation is also possible.

<Pixel Circuit 2>

Figure 4A:
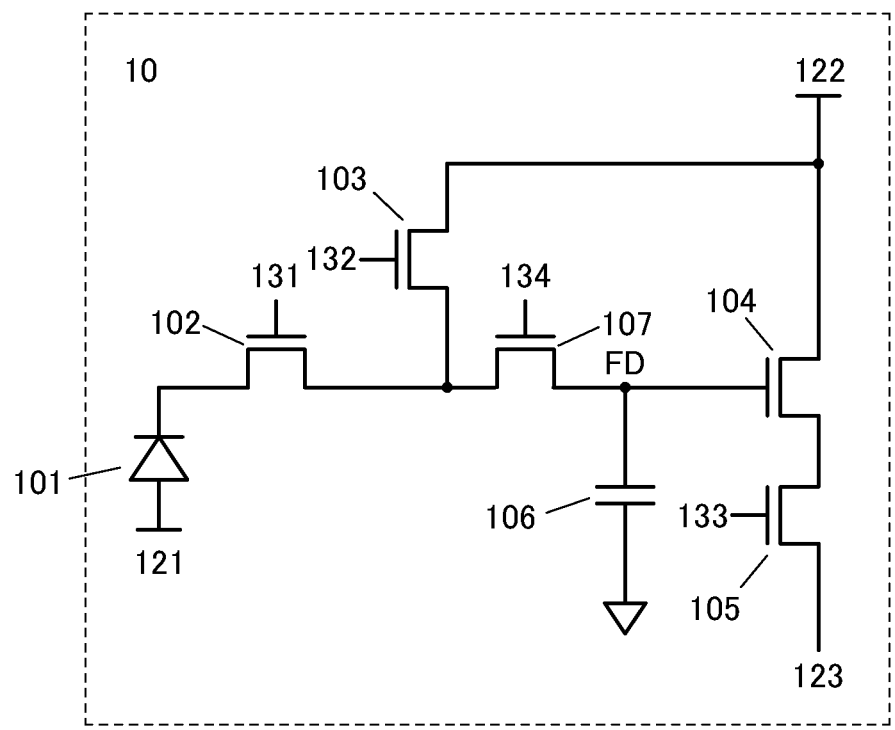
FIG. 4A and FIG. 4B are diagrams each showing a pixel circuit.
Figure 4B:
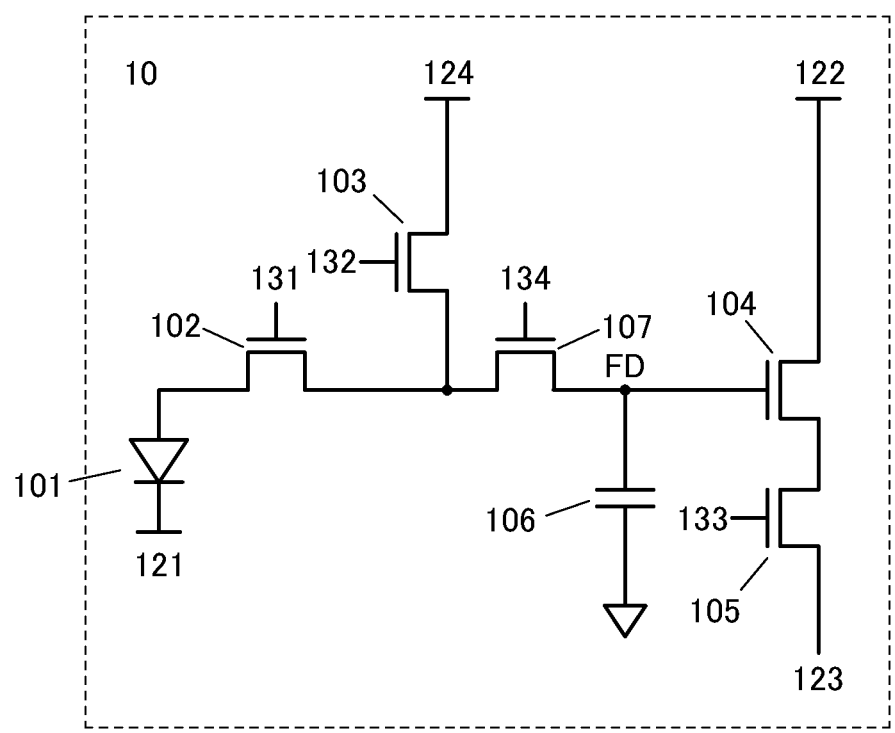

The pixel 10 of one embodiment of the present invention may have any of circuit structures illustrated in FIG. 4A and FIG. 4B. The pixels 10 illustrated in FIG. 4A and FIG. 4B have structures in which a transistor 107 is added to the circuits illustrated in FIG. 3A and FIG. 3B, respectively. One of a source and a drain of the transistor 107 is electrically connected to the one of the source and the drain of the transistor 102 and the one of the source and the drain of the transistor 103. The other of the source and the drain of the transistor 107 is electrically connected to the gate of the transistor 104 and the one electrode of the capacitor 106.

An OS transistor can be used as the transistor 107. Since the OS transistor has a low off-state current, when the OS transistor is connected to this position, electric charge can be retained at the node FD for a long period even in the case where the transistor 102 and the transistor 103 have a relatively high off-state current.

This effect can also be obtained even when OS transistors are used as the transistor 102 and the transistor 103; the transistor 102 and the photoelectric conversion device 101 can also be directly connected to each other without through a wiring, achieving a structure with little noise.

<Layout 3>

Figure 7:
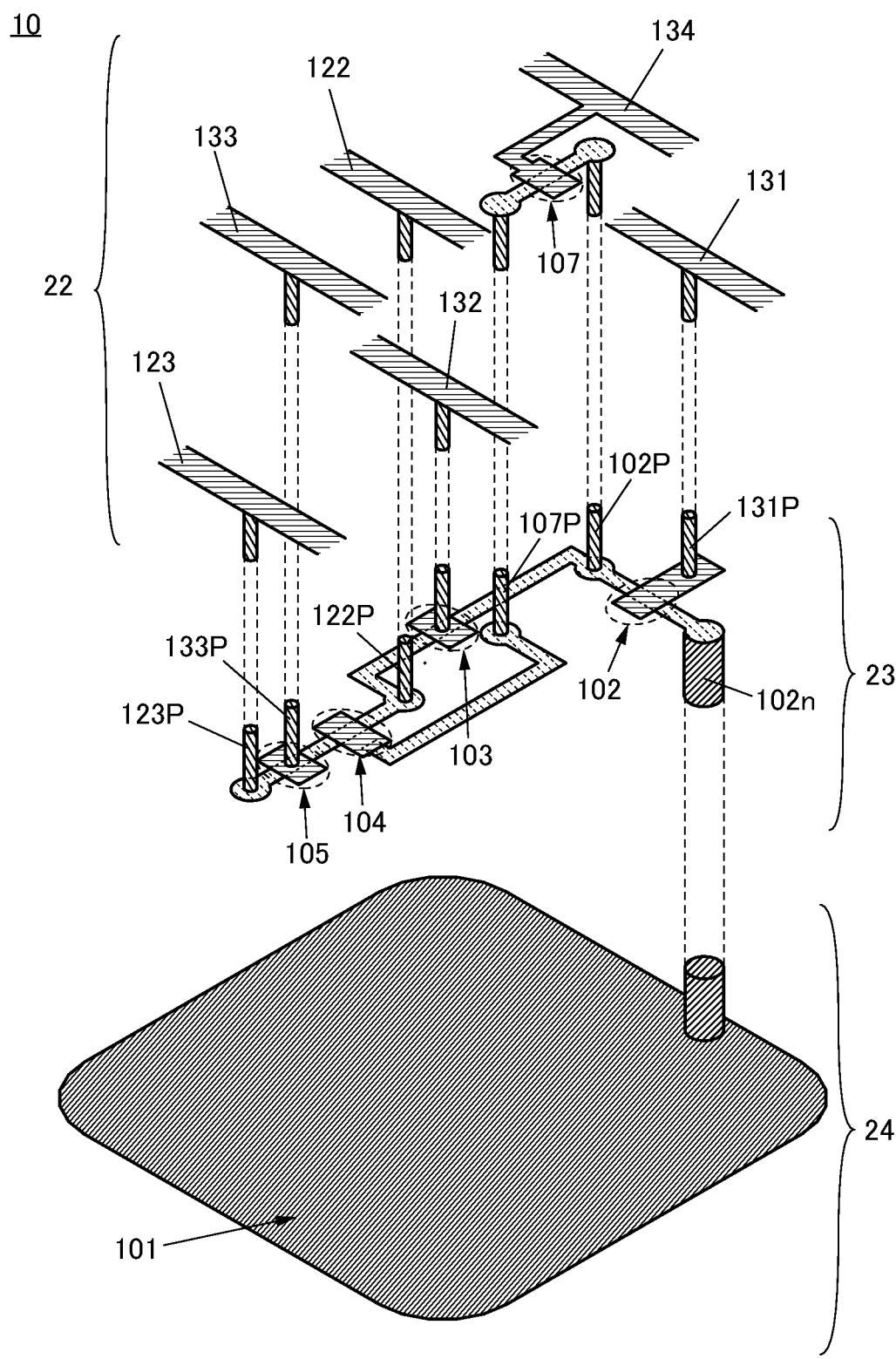
FIG. 7 is a diagram showing a layout of a pixel circuit.

FIG. 7 is a perspective view of a simple layout of the components of the pixel 10 illustrated in FIG. 4A. Note that here, the transistor 102 is an n-channel transistor, the one electrode of the photoelectric conversion device 101 electrically connected to the transistor 102 has n-type conductivity, and a low-resistance region 102n electrically connecting the transistor 102 and the photoelectric conversion device 101 has n-type conductivity. The low-resistance region 102n can be provided in the semiconductor layer 431.

In this layout, the one of the source and the drain of the transistor 102 is electrically connected to the one electrode of the photoelectric conversion device 101 through the low-resistance region 102n. The low-resistance region 102n can also be referred to as a region of the one of the source and the drain of the transistor 102. The low-resistance region 102n can also be referred to as a region of the one electrode of the photoelectric conversion device 101.

The other of the source and the drain of the transistor 102 and the one of the source and the drain of the transistor 103 are electrically connected to the one of the source and the drain of the transistor 107 through a plug 102P. The other of the source and the drain of the transistor 107 is electrically connected to the gate of the transistor 104 through a plug 107P.

The structure in which the transistor 102 and the photoelectric conversion device 101 are electrically connected to each other through the low-resistance region 102n provided in the semiconductor layer 431 can be employed for the structure of FIG. 5.

<Pixel Operation>

Figure 8:
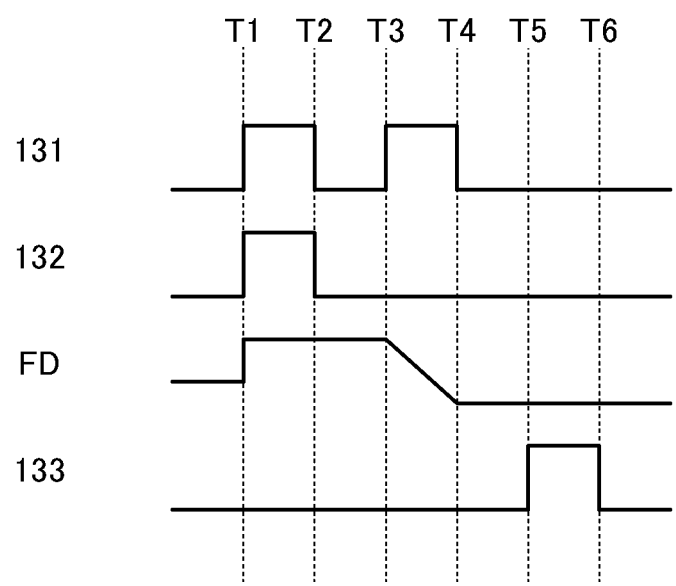
FIG. 8 is a timing chart showing a pixel operation.

FIG. 8 is a timing chart showing an example of a pixel operation. The pixel circuit illustrated in FIG. 3A can be operated in accordance with the timing chart. The pixel circuit illustrated in FIG. 4A can also be operated by supplying the same signal potential to the wiring 131 and a wiring 134. The pixel circuit illustrated in FIG. 4A may be operated by supplying different signal potentials to the wiring 131 and the wiring 134.

In the description below, "H" represents a potential for turning on a transistor, and "L" represents a potential for turning off a transistor. In addition, the wiring 122 is continuously supplied with a high potential (e.g., VDD), and the wiring 121 is continuously supplied with a low potential (e.g., VSS).

At time T1, when the potential of the wiring 131 is set to "H" and the potential of the wiring 132 is set to "H", the transistor 102 and the transistor 103 are turned on and the potentials of the node FD and the cathode of the photoelectric conversion device 101 are reset to high potentials.

At time T2, when the potential of the wiring 131 is set to "L" and the potential of the wiring 132 is set to "L", the transistor 102 is turned off and the photoelectric conversion device 101 starts to accumulate electric charge in accordance with the intensity of emitted light. In addition, the transistor 103 is turned off and the potential of the node FD is retained.

At time T3, when the potential of the wiring 131 is set to "H", the transistor 102 is turned on, and the electric charge accumulated in the cathode of the photoelectric conversion device 101 is transferred to the node FD. At this time, the potential of the node FD decreases in accordance with the amount of transferred electric charge.

At time T4, when the potential of the wiring 131 is set to "L", the transistor 102 is turned off, and the potential of the node FD is determined and retained.

At time T5, when the potential of the wiring 133 is set to "H", the transistor 105 is turned on, the transistor 104 operates in accordance with the potential of the node FD, and data is output to the wiring 123. At Time T6, the potential of the wiring 133 is set to "L" to turn off the transistor 105. The above is the description of the image capturing operation of the pixel.

<Structure of Imaging Device>

Figure 9:
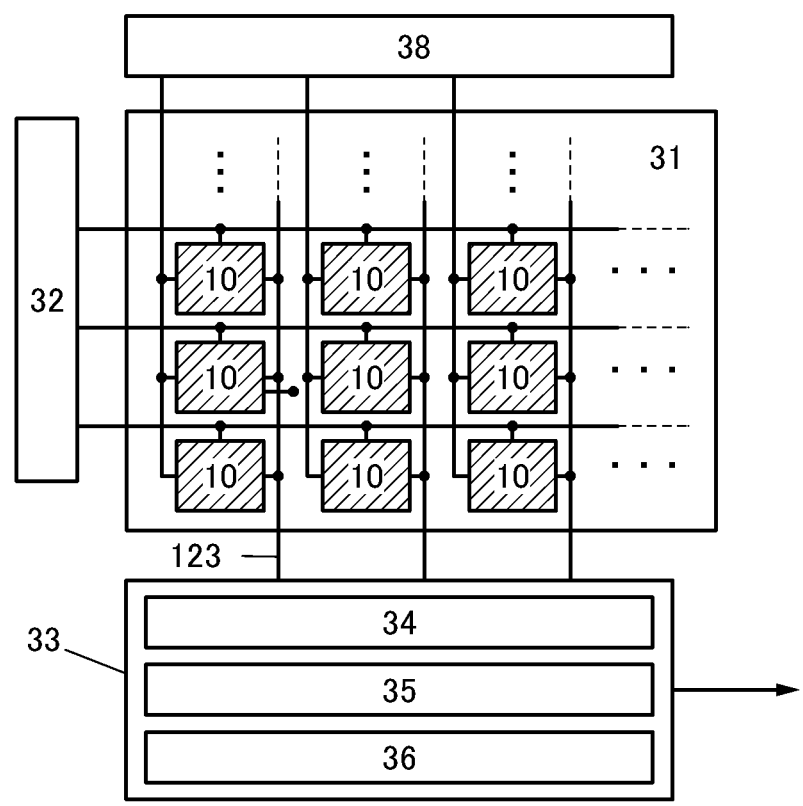
FIG. 9 is a block diagram showing an imaging device.

FIG. 9 is a block diagram showing the imaging device of one embodiment of the present invention. The imaging device includes a pixel array 31 including the pixels 10 arranged in a matrix, a circuit 32 having a function of selecting a row of the pixel array 31 (row driver), a circuit 33 having a function of reading out data from the pixels 10, and a circuit 38 for supplying a power supply potential. Note that the number of wirings connecting each component is reduced in FIG. 9. The number of each of the circuits 32, 33, and 38 may be more than one.

The circuit 33 can include a circuit 34 for performing correlated double sampling processing on output data of the pixel 10 (CDS circuit), a circuit 35 having a function of converting analog data output from the circuit 34 into digital data (A/D converter circuit or the like), a circuit 36 having a function of selecting a column to which data is output (column driver), and the like.

Figure 10A:
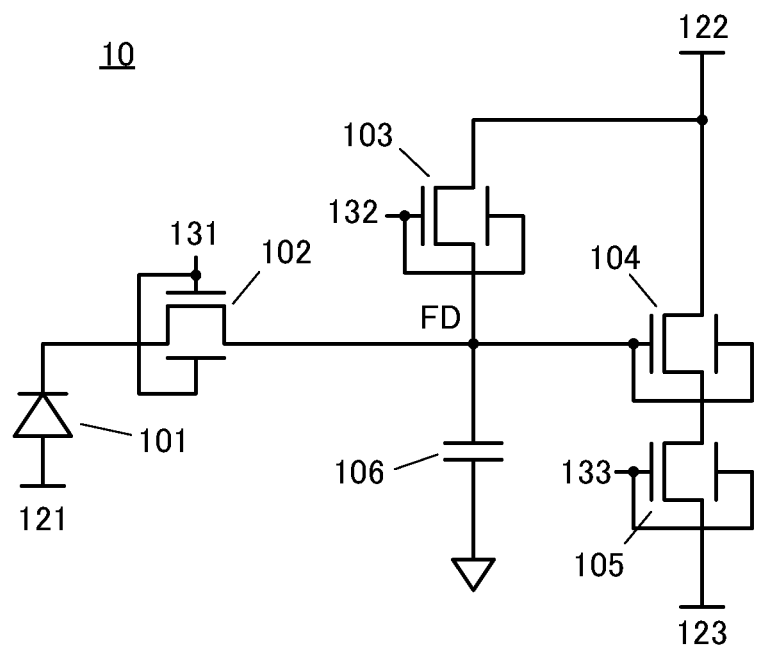
FIG. 10A and FIG. 10B are diagrams each showing a pixel circuit.
Figure 10B:
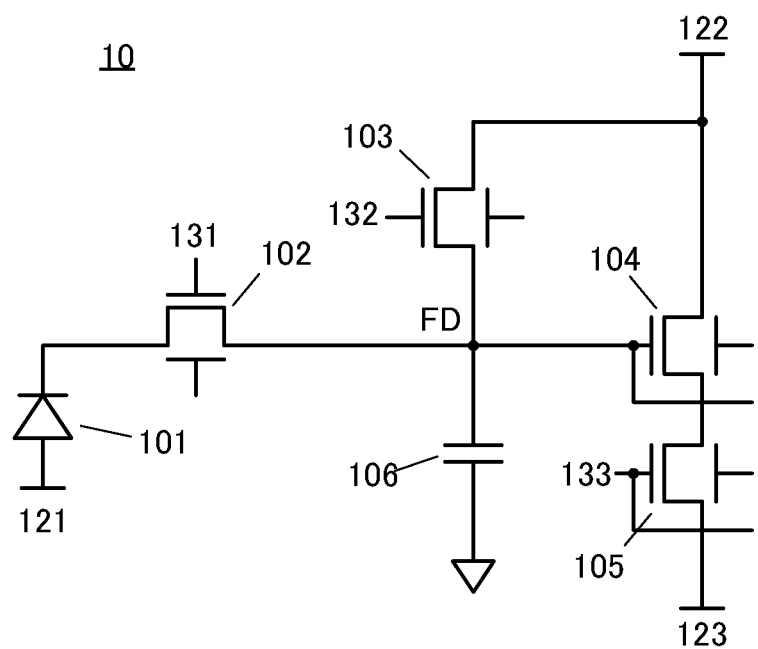

In one embodiment of the present invention, as illustrated in examples of FIG. 10A and FIG. 10B, a structure in which transistors are provided with back gates may be employed. FIG. 10A illustrates a structure in which back gates are electrically connected to front gates, which has an effect of increasing on-state current. Alternatively, as illustrated in FIG. 10B, a structure may be employed in which back gates are supplied with a constant potential. This structure enables control of the threshold voltages of the transistors. Furthermore, the structures of FIG. 10A and FIG. 10B may be included in one circuit. Furthermore, a transistor without a back gate may be provided.

This embodiment can be combined with the description of the other embodiments as appropriate.

Embodiment 2

In this embodiment, an imaging device having an arithmetic function, which is one embodiment of the present invention, is described with reference to drawings. The imaging device having a stacked structure described in Embodiment 1 can be used as the imaging device described in this embodiment. Note that portions different from those in Embodiment 1 are described on a case-by-case basis. The same components as those in Embodiment 1 are described using common reference numerals.

One embodiment of the present invention is an imaging device having an additional function such as image recognition. The imaging device has a function of retaining analog data (image data) obtained by an image capturing operation in pixels and extracting data obtained by multiplying the analog data by a given weight coefficient. The imaging device has a function of adding the data output from the plurality of pixels (a product-sum operation function).

In addition, when the data taken out from the pixels is taken in a neural network or the like provided inside or outside the imaging device, processing such as image recognition can be performed. Since, in one embodiment of the present invention, an enormous amount of image data can be retained in pixels in an analog data state and an arithmetic operation can be performed in the pixels, processing can be performed efficiently.

<Imaging Device>

Figure 11:
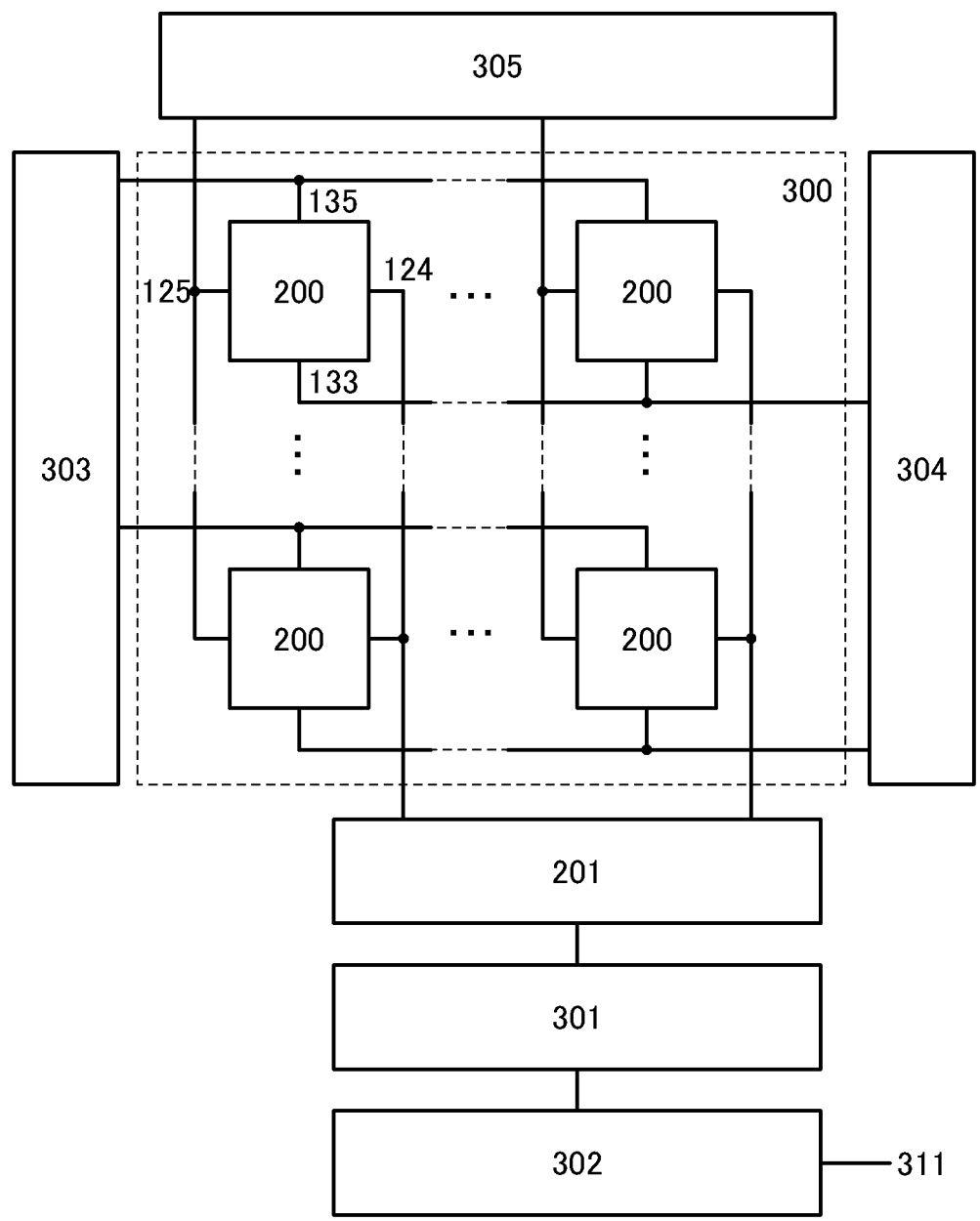
FIG. 11 is a block diagram showing an imaging device.

FIG. 11 is a block diagram illustrating the imaging device of one embodiment of the present invention. The imaging device includes a pixel array 300, a circuit 201, a circuit 301, a circuit 302, a circuit 303, a circuit 304, and a circuit 305. Note that one or more of the circuit 201, the circuit 301, the circuit 302, the circuit 303, the circuit 304, and the circuit 305 may include a region overlapping with the pixel array 300. Such a structure can reduce the area of the imaging device.

In the imaging device of one embodiment of the present invention, a circuit having two or more functions among the functions of the circuit 201 and the circuit 301 to the circuit 305 may be used alternatively. Moreover, a circuit other than the circuit 201 and the circuit 301 to the circuit 305 may also be used. Furthermore, one or more of the functions of the circuit 201 and the circuit 301 to the circuit 305 may be replaced by a software operation. Some of the circuits 201 and 301 to 305 may be placed outside the imaging device.

The pixel array 300 can have an image capturing function and an arithmetic function. The circuits 201 and 301 can each have an arithmetic function. The circuit 302 can have an arithmetic function or a data conversion function and can output data to a wiring 311. The circuits 303 and 304 can have a selection function. The circuit 305 can have a function of supplying a potential (e.g., a weight) to a pixel. As the circuit having a selection function, a shift register, a decoder, or the like can be used.

Figure 12:
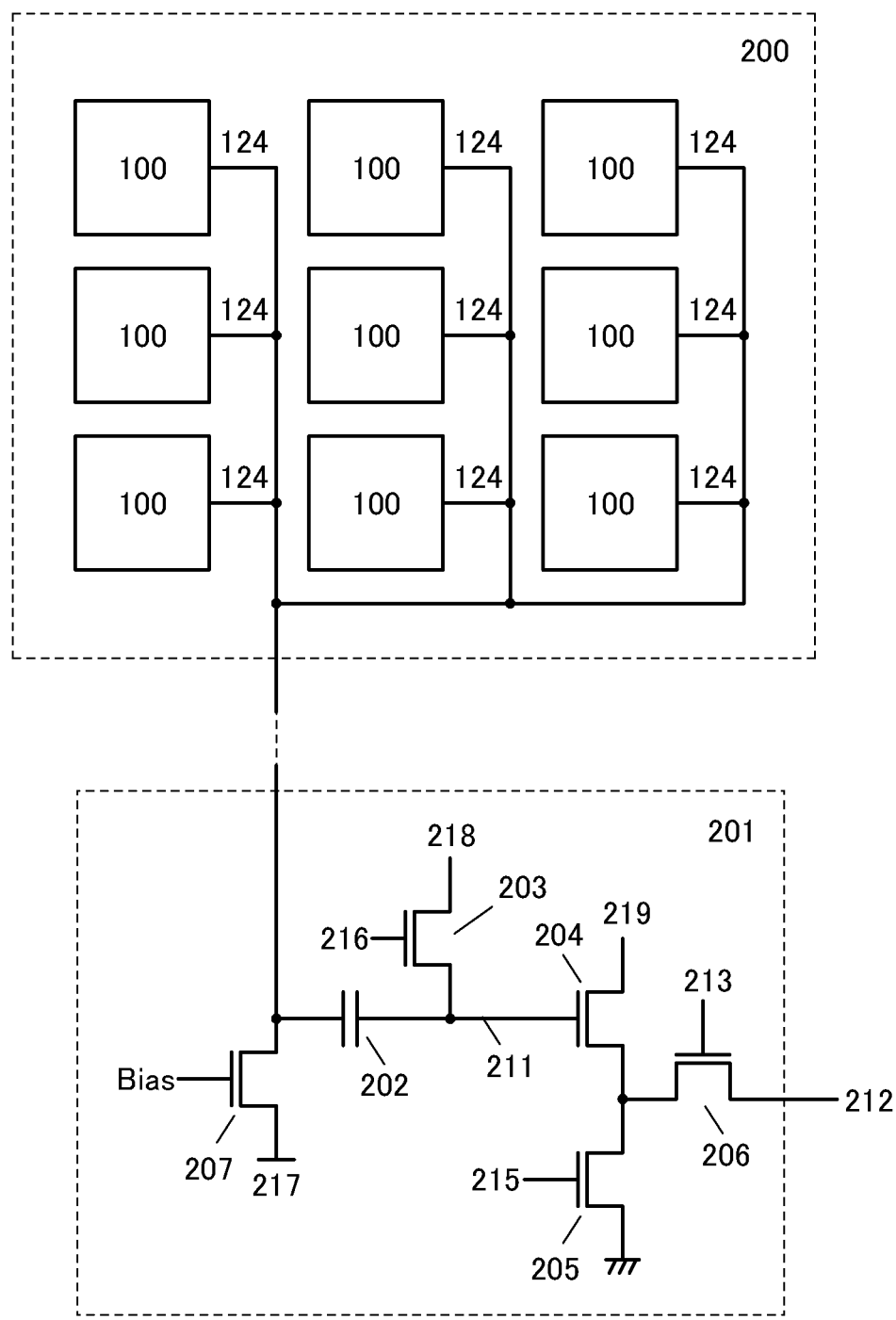
FIG. 12 is a diagram showing a pixel block 200 and a circuit 201.

The pixel array 300 includes a plurality of pixel blocks 200. As illustrated in FIG. 12, the pixel block 200 includes a plurality of pixels 100 arranged in a matrix, and each of the pixels 100 is electrically connected to the circuit 201 through a wiring 124. Note that the circuit 201 can also be provided in the pixel block 200.

The pixels 100 can acquire image data and generate data obtained by adding the image data and a weight coefficient. Note that the number of pixels included in the pixel block 200 is 3×3 in an example illustrated in FIG. 12 but is not limited to this. For example, the number of pixels can be 2×2, 4×4, or the like. Alternatively, the number of pixels in a horizontal direction and the number of pixels in a vertical direction may differ from each other. Furthermore, some pixels may be shared by adjacent pixel blocks.

The pixel block 200 and the circuit 201 can operate as a product-sum operation circuit.

<Pixel Circuit>

Figure 13A:
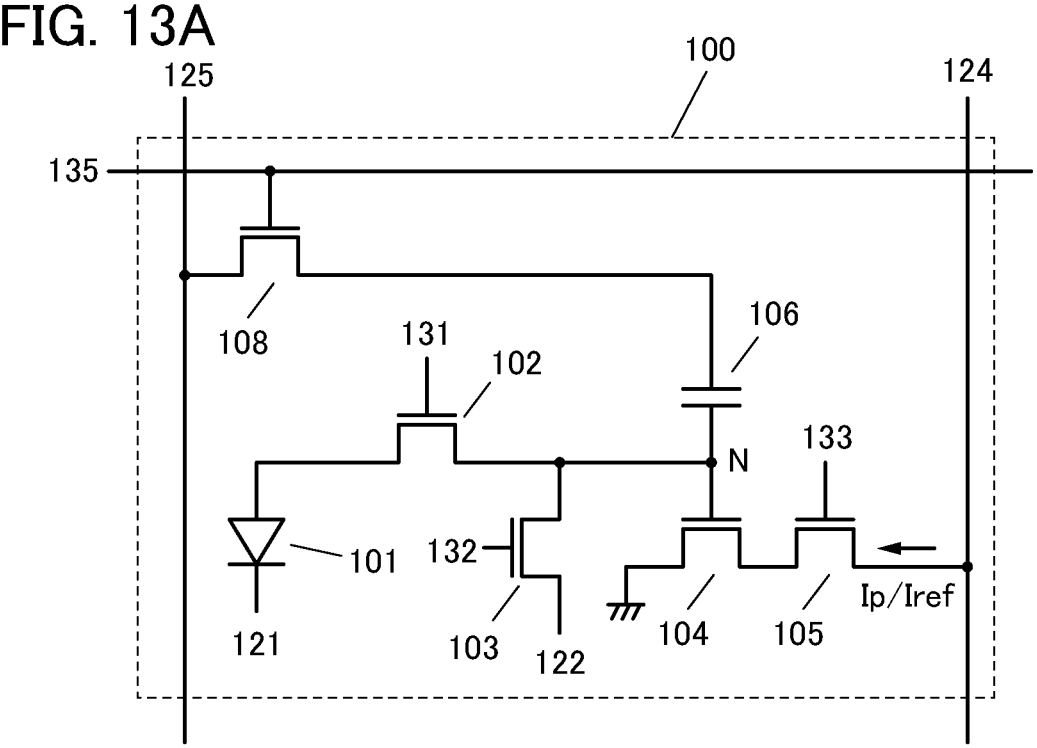
FIG. 13A and FIG. 13B are diagrams each showing a pixel 100.

As illustrated in FIG. 13A, the pixel 100 can include the photoelectric conversion device 101, the transistor 102, the transistor 103, the transistor 104, the transistor 105, the capacitor 106, and a transistor 108.

The pixel 100 is different from the pixel circuit illustrated in FIG. 3A, FIG. 3B, and the like in Embodiment 1 in that the transistor 108 is included, the other electrode of the capacitor 106 is electrically connected to one of a source and a drain of the transistor 108, and a wiring electrically connected to the transistor 104 and a wiring electrically connected to the transistor 105 are different from those in FIG. 3A, FIG. 3B, and the like.

One electrode of the photoelectric conversion device 101 is electrically connected to one of the source and the drain of the transistor 102. The other of the source and the drain of the transistor 102 is electrically connected to one of the source and the drain of the transistor 103, one electrode of the capacitor 106, and the gate of the transistor 104. One of the source and the drain of the transistor 104 is electrically connected to one of the source and the drain of the transistor 105. The other electrode of the capacitor 106 is electrically connected to one of the source and the drain of the transistor 108.

The other electrode of the photoelectric conversion device 101 is electrically connected to the wiring 121. The gate of the transistor 102 is electrically connected to the wiring 131. The other of the source and the drain of the transistor 103 is electrically connected to the wiring 122. The gate of the transistor 103 is electrically connected to the wiring 132. The other of the source and the drain of the transistor 104 is electrically connected to a GND wiring or the like. The other of the source and the drain of the transistor 105 is electrically connected to the wiring 124. The gate of the transistor 105 is electrically connected to the wiring 133. The other of the source and the drain of the transistor 108 is electrically connected to a wiring 125. A gate of the transistor 108 is electrically connected to a wiring 135.

Here, a node N is an electrical connection point of the other of the source and the drain of the transistor 102, the one of the source and the drain of the transistor 103, the one electrode of the capacitor 106, and the gate of the transistor 104.

The wirings 121 and 122 can each function as a power supply line. For example, the wiring 121 can function as a high-potential power supply line, and the wiring 122 can function as a low-potential power supply line. The wirings 131, 132, 133, and 135 can function as signal lines for controlling conduction of the respective transistors. The wiring 125 can function as a wiring for supplying a potential corresponding to a weight coefficient to the pixel 100. The wiring 124 can function as a wiring which electrically connects the pixel 100 and the circuit 201.

Note that an amplifier circuit or a gain control circuit, or the like may be electrically connected to the wiring 124.

As the photoelectric conversion device 101, a photodiode can be used. In order to increase the light detection sensitivity under low illuminance conditions, an avalanche photodiode is preferably used.

The transistor 102 can have a function of controlling the potential of the node N. The transistor 103 can have a function of initializing the potential of the node N. The transistor 104 can have a function of controlling a current fed by the circuit 201 in accordance with the potential of the node N. The transistor 105 can have a function of selecting a pixel. The transistor 108 can have a function of supplying the potential corresponding to the weight coefficient to the node N.

Figure 13B:
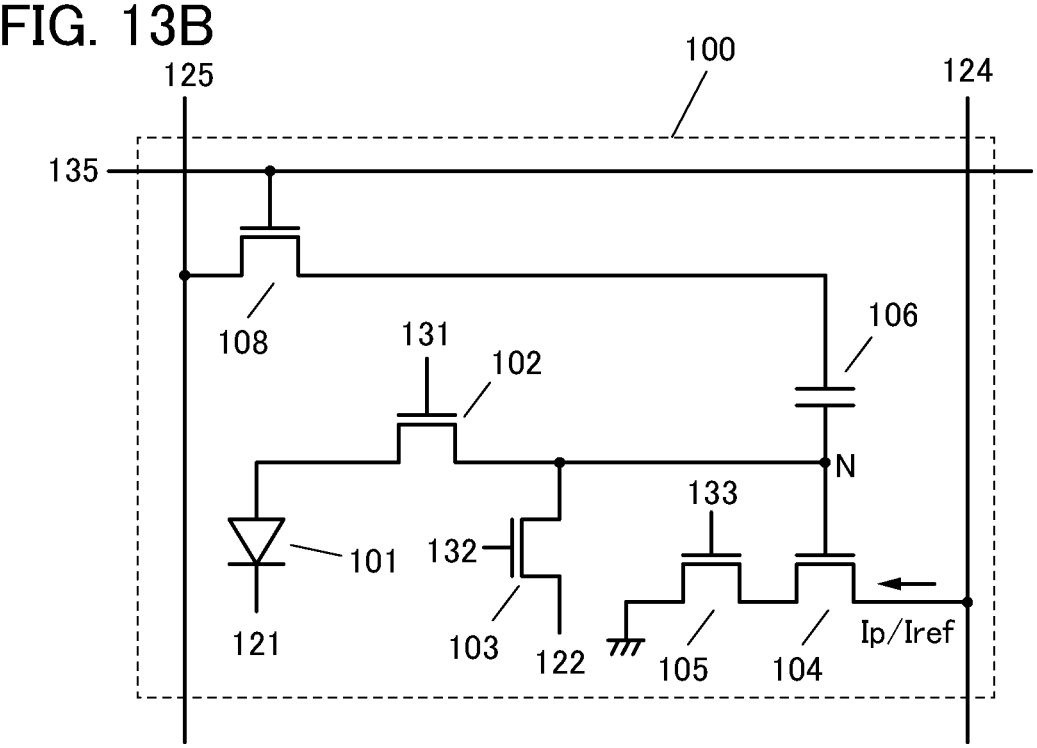

Note that as illustrated in FIG. 13B, the transistor 104 and the transistor 105 may be arranged such that the one of the source and the drain of the transistor 104 is electrically connected to the one of the source and the drain of the transistor 105, the other of the source and the drain of the transistor 104 is connected to the wiring 124, and the other of the source and the drain of the transistor 105 is electrically connected to the GND wiring or the like.

In FIG. 13A and FIG. 13B, the connection direction of the pair of electrodes included in the photoelectric conversion device 101 may be reversed. In that case, the wiring 121 functions as a low potential power supply line and the wiring 122 functions as a high potential power supply line.

The transistors 102 and 103 preferably use transistors including a metal oxide in a channel formation region (OS transistors). The OS transistor has a characteristic of an extremely low off-state current. When OS transistors are used as the transistors 102 and 103, the electric charge retention period at the node N can be elongated greatly. Furthermore, a global shutter mode in which an electric charge accumulation operation is performed in all the pixels at the same time can be employed without complicating the circuit structure, the operation method, and the like. Furthermore, while image data is retained at the node N, an arithmetic operation using the image data can be performed a plurality of times.

Meanwhile, it is sometimes desired that the transistor 104 have excellent amplifying properties. In addition, transistors having high mobility capable of a high-speed operation are sometimes preferably used as the transistors 105 and 108. Accordingly, transistors using silicon in channel formation regions (Si transistors) may be used as the transistors 104, 105, and 108.

Note that without limitation to the above, an OS transistor and a Si transistor may be freely employed in combination. Alternatively, all the transistors may be OS transistors. Alternatively, all the transistors may be Si transistors. Examples of the Si transistor include a transistor including amorphous silicon and a transistor including crystalline silicon (microcrystalline silicon, low-temperature polysilicon, or single crystal silicon).

The potential of the node N in the pixel 100 is determined by the potential obtained by adding a reset potential supplied from the wiring 122 and a potential (image data) generated by photoelectric conversion by the photoelectric conversion device 101. Alternatively, the potential of the node N is determined by capacitive coupling of the potential corresponding to a weight coefficient supplied from the wiring 125. Consequently, a current corresponding to data in which a given weight coefficient is added to the image data can be made to flow through the transistor <Circuit 201>

As illustrated in FIG. 12, the pixels 100 are electrically connected to each other by the wiring 124. The circuit 201 can perform an arithmetic operation using the sum of currents flowing through the transistors 104 of the pixels 100.

The circuit 201 includes a capacitor 202, a transistor 203, a transistor 204, a transistor 205, a transistor 206, and a transistor 207 as a voltage converter circuit. An appropriate analog potential (Bias) is applied to a gate of the transistor 207.

One electrode of the capacitor 202 is electrically connected to one of a source and a drain of the transistor 203 and a gate of the transistor 204. One of a source and a drain of the transistor 204 is electrically connected to one of a source and a drain of the transistor 205 and one of a source and a drain of the transistor 206. The other electrode of the capacitor 202 is electrically connected to the wiring 124 and one of a source and a drain of the transistor 207.

The other of the source and the drain of the transistor 203 is electrically connected to a wiring 218. The other of the source and the drain of the transistor 204 is electrically connected to a wiring 219. The other of the source and the drain of the transistor 205 is electrically connected to a reference power supply line such as a GND wiring. The other of the source and the drain of the transistor 206 is electrically connected to a wiring 212. The other of the source and the drain of the transistor 207 is electrically connected to a wiring 217. A gate of the transistor 203 is electrically connected to a wiring 216. A gate of the transistor 205 is electrically connected to a wiring 215. A gate of the transistor 206 is electrically connected to a wiring 213.

The wirings 217, 218, and 219 can each have a function of a power supply line. For example, the wiring 218 can have a function of a wiring that supplies a reset potential (Vr) for reading. The wirings 217 and 219 can function as high potential power supply lines. The wirings 213, 215, and 216 can function as signal lines that control the electrical conduction of the respective transistors. The wiring 212 is an output line and can be electrically connected to the circuit 301 illustrated in FIG. 11, for example.

The transistor 203 can have a function of resetting the potential of the wiring 211 to the potential of the wiring 218. The transistors 204 and 205 can have a function of source follower circuits. The transistor 206 can have a function of controlling reading. The circuit 201 has a function of a correlated double sampling circuit (a CDS circuit) and can be replaced with a circuit having the function and another structure.

In one embodiment of the present invention, offset components other than the product of image data (X) and a weight coefficient (W) are eliminated to extract an objective WX. WX can be calculated using data obtained from the same pixel when light exposure is performed (image capturing is performed) and when light exposure is not performed (image capturing is not performed), and data obtained by adding the weight to these data.

The total amount of currents ($I_p$) flowing through the pixels 100 when light exposure is performed is $k\Sigma(X-V_{th})^2$, and the total amount of currents ($I_p$) flowing through the pixels 100 when the weight is added is $k\Sigma(W+X-V_{th})^2$. The total amount of currents ($I_{ref}$) flowing through the pixels 100 when light exposure is not performed is $k\Sigma(0-V_{th})^2$, and the total amount of currents ($I_{ref}$) flowing through the pixels 100 when the weight is added is $k\Sigma(W-V_{th})^2$. Here, k is a constant and $V_{th}$ is the threshold voltage of the transistor 104.

First, a difference (data A) between the data obtained when light exposure is performed and the data obtained by adding the weight to the data is calculated. The difference is $k\Sigma((X-V_{th})^2-(W+X-V_{th})^2)=k\Sigma(-W^2-2W\cdot X+2W\cdot V_{th})$.

Next, a difference (data B) between the data obtained when light exposure is not performed and the data obtained by adding the weight to the data is calculated. The difference is $k\Sigma((0-V_{th})^2-(W-V_{th})^2)=k\Sigma(-W^2+2W\cdot V_{th})$.

Then, a difference between the data A and the data B is calculated. The difference is $k\Sigma(-W^2-2W\cdot X+2W\cdot V_{th})-(-W^2+2W\cdot V_{th}))=k\Sigma(-2W\cdot X)$. That is, offset components other than the product of the image data (X) and the weight coefficient (W) can be eliminated.

The circuit 201 can read out the data A and the data B. Note that the calculation of the difference between the data A and the data B can be performed by the circuit 301, for example.

<Image Capturing Operation>

Figure 14A:
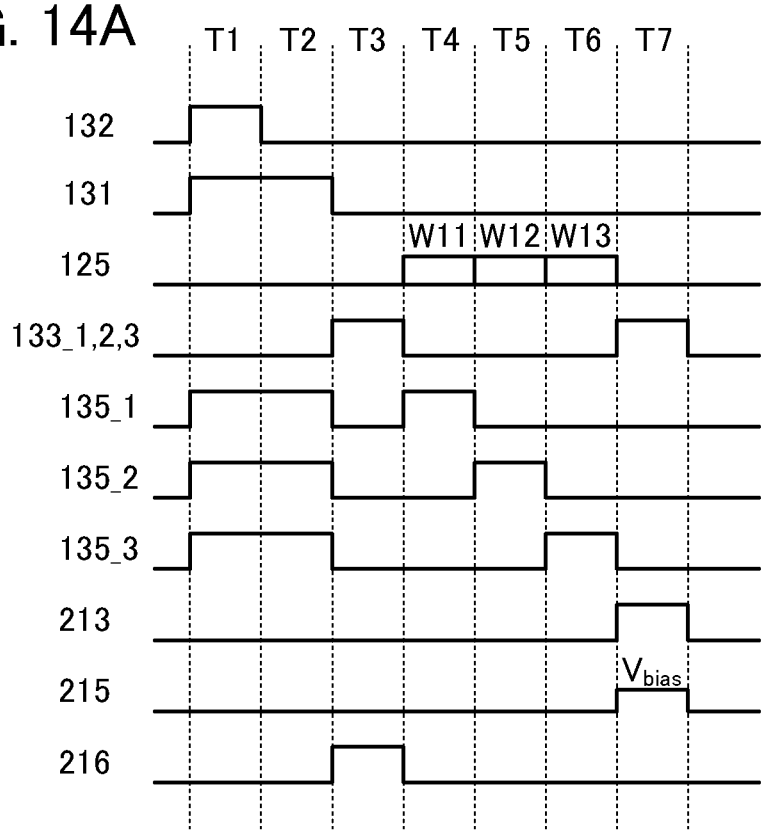
FIG. 14A and FIG. 14B are timing charts each showing operations of the pixel block 200 and the circuit 201.

FIG. 14A is a timing chart showing an operation of calculating the difference (data A) between the data obtained when light exposure is performed and the data obtained by adding the weight to the data in the pixel blocks 200 and the circuit 201. For convenience, the timings of changing signals are matched in the chart; however, in reality, the timings are preferably shifted in consideration of the delay inside the circuit. In the following description, a high potential is represented by "H", and a low potential is represented by "L".

First, in Period T1, the potential of the wiring 132 is set to "H" and the potential of the wiring 131 is set to "H", so that the node N in the pixel 100 has a reset potential. Furthermore, the potential of the wiring 125 is brought to "L" and the potentials of wirings 135_1 to 135_3 (the wirings 135 in the first row to the third row) are brought to "H", so that a weight coefficient 0 is written.

In Period T2, the potential of the wiring 131 is kept at "H" and the potential of the wiring 132 is set to "L", so that the potential X (image data) is written to the node N by photoelectric conversion of the photoelectric conversion device 101.

In Period T3, the potentials of wirings 133_1, 133_2, and 133_3 are set to "H", so that all of the pixels 100 in the pixel blocks are selected. At this time, a current corresponding to the potential X flows to the transistor 104 in each of the pixels 100. The potential of the wiring 216 is set to "H", so that the potential Vr of the wiring 218 is written to the wiring 211. The operation in Periods T1 to T3 corresponds to obtainment of the data obtained when light exposure is performed, and the data is initialized to the potential Vr of the wiring 211.

In Period T4, the potential of the wiring 125 is set to a potential corresponding to a weight coefficient W11 (a weight added to the pixels in the first row), and the potential of the wiring 135_1 is set to "H", so that the weight coefficient W11 is added to the nodes N of the pixels 100 in the first row by capacitive coupling of the capacitors 106.

In Period T5, the potential of the wiring 125 is set to a potential corresponding to a weight coefficient W12 (a weight added to the pixels in the second row), and the potential of the wiring 135_2 is set to "H", so that the weight coefficient W12 is added to the nodes N of the pixels 100 in the second row by capacitive coupling of the capacitors 106.

In Period T6, the potential of the wiring 125 is set to a potential corresponding to a weight coefficient W13 (a weight added to the pixels in the third row), and the potential of the wiring 135_3 is set to "H", so that the weight coefficient W13 is added to the nodes N of the pixels 100 in the third row by capacitive coupling of the capacitors 106. The operation in Period T4 to Period T6 corresponds to generation of data in which weights are added to the data obtained when image capturing is performed.

In Period T7, the potentials of the wirings 133_1, the wiring 133_2, and the wiring 133_3 are set to "H", so that all of the pixels 100 in the pixel blocks are selected. At this time, a current corresponding to the potential W11+X flows to the transistors 104 in the pixels 100 in the first row. A current corresponding to the potential W12+X flows to the transistors 104 in the pixels 100 in the second row. A current corresponding to the potential W13+X flows to the transistors 104 in the pixels 100 in the third row.

Here, the potential of the other electrode of the capacitor 202 changes in accordance with the current flowing through the wiring 124, and an amount Y of change is added to the potential Vr of the wiring 211 by capacitive coupling. Accordingly, the potential of the wiring 211 becomes "Vr+Y". Here, given that Vr=0, Y is the difference itself, which means that the data A is calculated.

The potential of the wiring 213 is set to "H" and the potential of the wiring 215 is set to an appropriate analog potential such as "$V_{bias}$", so that the circuit 201 can output a signal potential in accordance with the data A of the pixel blocks 200 in the first row by a source follower operation.

Figure 14B:
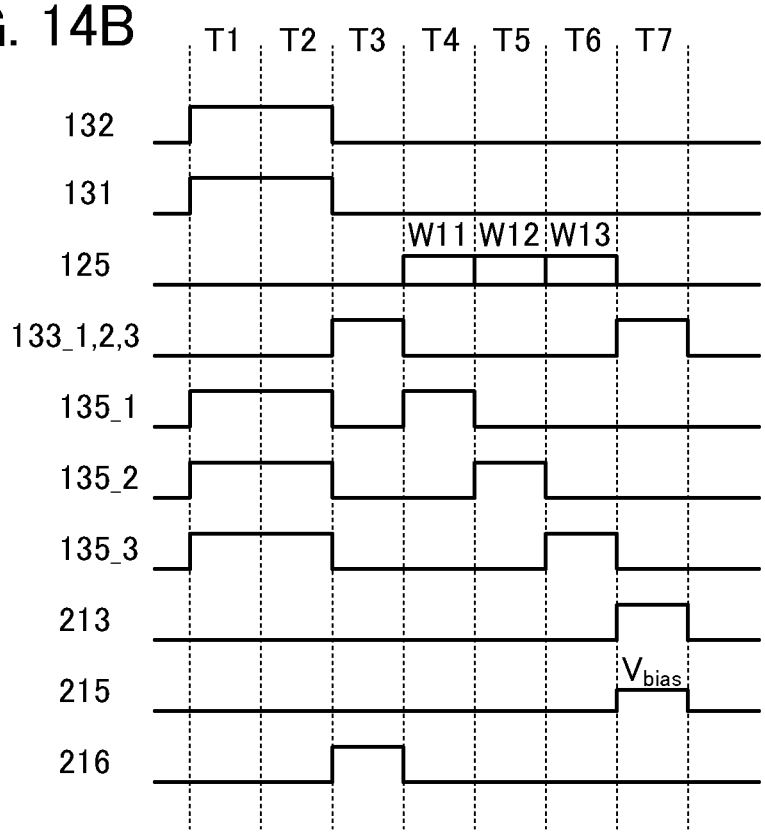

FIG. 14B is a timing chart showing an operation of calculating the difference (data B) between the data obtained when light exposure is not performed and the data obtained by adding the weight to the data in the pixel blocks 200 and the circuit 201. Note that the data B may be obtained as needed. For example, the obtained data B may be stored in a memory, and if the input weight is not changed, the data B may be read from the memory. Note that a plurality of pieces of data B corresponding to a plurality of weights may be stored in the memory. Either the data A or the data B may be obtained first.

First, in Periods T1 and T2, the potential of the wiring 132 is set to "H" and the potential of the wiring 131 is set to "H", so that the node N in the pixel 100 has a reset potential (0). At the end of Period T2, the potential of the wiring 132 is set to "L" and the potential of the wiring 131 is set to "L". That is, in these periods, the potential of the node N is the reset potential regardless of the operation of the photoelectric conversion device 101.

In addition, in Period T1, the potential of the wiring 125 is set to "L" and the wirings 135_1, 135_2, and 135_3 are set to "H", so that a weight coefficient 0 is written. This operation is performed during a period in which the potential of the node N is the reset potential.

In Period T3, the potentials of the wirings 133_1, 133_2, and 133_3 are set to "H", so that all of the pixels 100 in the pixel blocks are selected. At this time, a current corresponding to the reset potential flows to the transistor 104 in each of the pixels 100. The potential of the wiring 216 is set to "H", so that the potential Vr of the wiring 218 is written to the wiring 211. The operation in Periods T1 to T3 corresponds to obtainment of the data obtained when light exposure is not performed, and the data is initialized to the potential Vr of the wiring 211.

In Period T4, the potential of the wiring 125 is set to a potential corresponding to the weight coefficient W11 (the weight added to the pixels in the first row), and the potential of the wiring 135_1 is set to "H", so that the weight coefficient W11 is added to the nodes N of the pixels 100 in the first row by capacitive coupling of the capacitors 106.

In Period T5, the potential of the wiring 125 is set to a potential corresponding to the weight coefficient W12 (the weight added to the pixels in the second row), and the potential of the wiring 135_2 is set to "H", so that the weight coefficient W12 is added to the nodes N of the pixels 100 in the second row by capacitive coupling of the capacitors 106.

In Period T6, the potential of the wiring 125 is set to a potential corresponding to the weight coefficient W13 (the weight added to the pixels in the third row), and the potential of the wiring 135_3 is set to "H", so that the weight coefficient W13 is added to the nodes N of the pixels 100 in the third row by capacitive coupling of the capacitors 106. The operation in Period T4 to Period T6 corresponds to generation of data in which weights are added to the data obtained when image capturing is not performed.

In Period T7, the potentials of the wirings 133_1, 133_2, and 133_3 are set to "H", so that all of the pixels 100 in the pixel blocks are selected. At this time, a current corresponding to the potential W11+0 flows to the transistors 104 in the pixels 100 in the first row. A current corresponding to the potential W12+0 flows to the transistors 104 in the pixels 100 in the second row. A current corresponding to the potential W13+0 flows to the transistors 104 in the pixels 100 in the third row.

Here, the potential of the other electrode of the capacitor 202 changes in accordance with the current flowing through the wiring 124, and an amount Z of change is added to the potential Vr of the wiring 211. Accordingly, the potential of the wiring 211 becomes "Vr+Y". Here, given that Vr=0, Z is the difference itself, which means that the data B is calculated.

The potential of the wiring 213 is set to "H" and the potential of the wiring 215 is set to an appropriate analog potential ($V_{bias}$) or the like, so that the circuit 201 can output a signal potential in accordance with the data B of the pixel blocks 200 in the first row by a source follower operation.

The data A and the data B output from the circuit 201 through the above operations are input to the circuit 301. Calculation of the difference between the data A and the data B is performed in the circuit 301, so that unnecessary offset components other than the product of the image data (potential X) and the weight coefficient (potential W) can be eliminated. The circuit 301 may have a structure in which the difference is calculated by utilizing a memory circuit and software processing, other than the structure including an arithmetic circuit such as the circuit 201.

Note that in the above operations, the potential of the wiring 211 of the circuit 201 is initialized to the potential "Vr" both in the operation of obtaining the data A and the operation of obtaining the data B. Then, "(Vr+Y)−(Vr+Z)"="Y−Z" in the following difference calculation, so that the component of the potential "Vr" is eliminated. As described above, the other unnecessary offset components are also eliminated, so that the product of the image data (potential X) and the weight coefficient (potential W) can be extracted.

This operation corresponds to the initial operation of a neural network performing inference or the like. Thus, at least one arithmetic operation can be performed in the imaging device before an enormous amount of image data is taken out to the outside, which can reduce the frequency of arithmetic operation in the outside, input and output of data, or the like. Furthermore, entire processing can be performed at higher speed to reduce the power consumption.

Alternatively, as an operation other than the operation described above, the potential of the wiring 211 of the circuit 201 may be initialized to different potentials in the operation of obtaining the data A and in the operation of obtaining the data B. For example, the potential of the wiring 211 is initialized to a potential "Vr1" in the operation of obtaining the data A and to a potential "Vr2" in the operation of obtaining the data B. In this case, "(Vr1+Y)−(Vr2+Z)"=" (Vr1−Vr2)+(Y−Z)" in the following difference calculation. "Y−Z" is extracted as the product of the image data (potential X) and the weight coefficient (potential W) as in the above operation, and "Vr1−Vr2" is added. Here, "Vr1−Vr2" corresponds to a bias used for threshold value adjustment in the arithmetic operation in a middle layer of the neural network.

Furthermore, the weight has a function of, for example, a filter of a convolutional neural network (CNN) and may additionally have a function of amplifying or attenuating data. For example, when the weight coefficient (W) in the operation of obtaining the data A is set to the product of data obtained by the filter processing and an amplified amount, the product of the image data and the weight coefficient in the filter processing can be amplified and data corrected to a brighter image can be extracted. The data B is data obtained when image capturing is not performed and thus can also be referred to as black level data. Thus, the operation of calculating the difference between the data A and the data B can be an operation of promoting visualization of an image taken in a dark place. That is, luminance correction using a neural network can be performed.

As described above, a bias can be generated by the operation in the imaging device in one embodiment of the present invention. Furthermore, a functional weight can be added in the imaging device. Thus, a load in an arithmetic operation or the like performed in the outside can be reduced and the imaging device can be employed for a variety of usages. For example, part of processing in inference of a subject, correction of the definition of image data, correction of luminance, generation of a color image from a monochrome image, generation of a three-dimensional image from a two-dimensional image, restoration of defected information, generation of a moving image from a still image, correction of an out-of-focus image, or the like can be performed in the imaging device.

<Circuits 301 and 302>

Figure 15A:
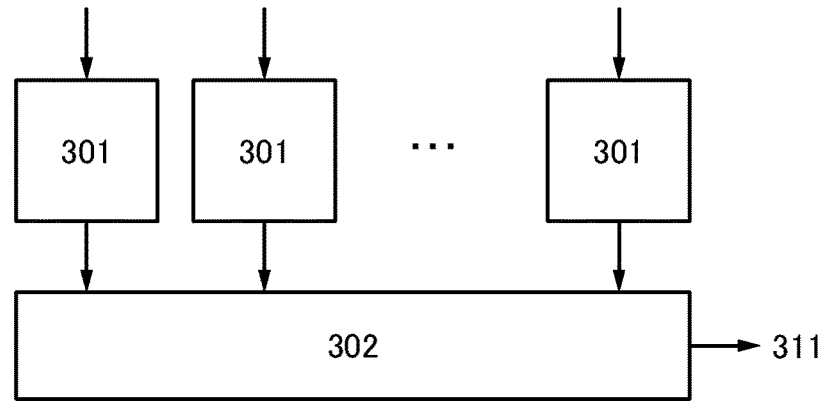
FIG. 15A and FIG. 15B are diagrams each showing circuits 301 and a circuit 302.

FIG. 15A is a diagram showing the circuit 302 and the circuits 301 connected to the circuit 201. Product-sum operation result data output from the circuit 201 is sequentially input to the circuits 301. The circuits 301 may have a variety of arithmetic functions in addition to the above-described function of calculating the difference between the data A and the data B. For example, the circuits 301 can have a structure similar to that of the circuit 201. Alternatively, the function of the circuits 301 may be replaced by software processing.

In addition, the circuit 301 may include a circuit that performs an arithmetic operation of an activation function. A comparator circuit can be used as the circuit, for example. A comparator circuit outputs a result of comparing input data and a set threshold as binary data. In other words, the pixel blocks 200 and the circuits 301 can operate as some components of a neural network.

The circuits 301 may include an A/D converter. When image data is output to the outside from the pixel blocks 200 with or without undergoing an arithmetic operation, the analog data can be converted into digital data by the circuits 301.

For example, in the pixel block 200 including 3×3 pixels 100, when the same weight (e.g., 0) is supplied to all the pixels 100 and the transistor 108 included in the pixel from which data is to be output is turned on, the sum of image data of the whole pixel block 200, the row-basis sum of image data, data from each pixel, or the like can be output from the pixel block 200.

In the case where the data output from the pixel blocks 200, which corresponds to image data of a plurality of bits, can be binarized by the circuits 301, the binarization can be rephrased as compression of image data.

Data output from the circuits 301 is sequentially input to the circuit 302. The circuit 302 can have a structure including a latch circuit, a shift register, and the like, for example. With this structure, parallel-serial conversion can be performed and data input in parallel can be output to the wiring 311 as serial data.

Figure 15B:
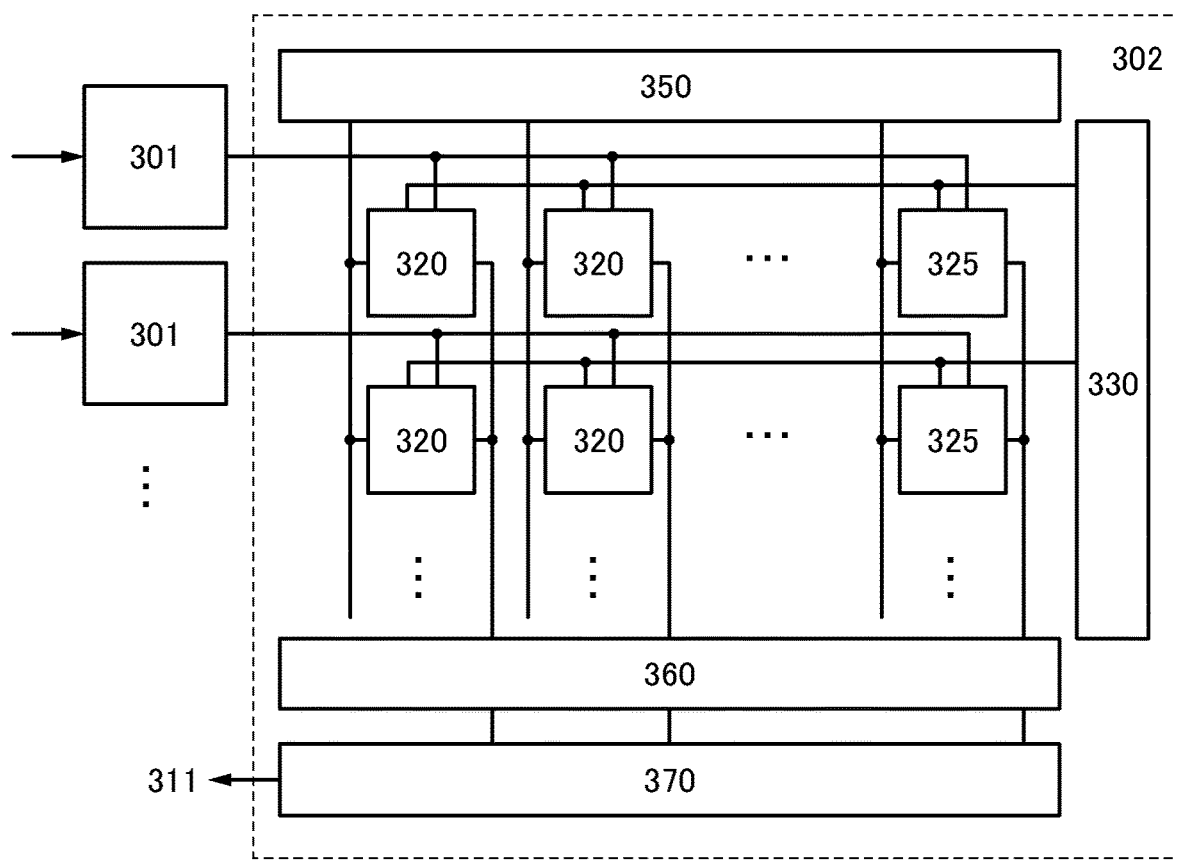

Moreover, as illustrated in FIG. 15B, the circuit 302 may include a neural network. The neural network includes memory cells arranged in a matrix, and each memory cell retains a weight coefficient. Data output from the circuits 301 is input to corresponding memory cells 320, and a product-sum operation can be performed. Note that the number of memory cells illustrated in FIG. 15B is an example, and the number is not limited thereto. Data after the product-sum operation can be output to the wiring 311.

Note that the connection destination of the wiring 311 is not limited in FIG. 15A and FIG. 15B. For example, the wiring 311 can be connected to a neural network, a memory device, a communication device, or the like.

The neural network illustrated in FIG. 15B includes memory cells 320 and reference memory cells 325 which are arranged in a matrix, a circuit 330, a circuit 350, a circuit 360, and a circuit 370.

Figure 16:
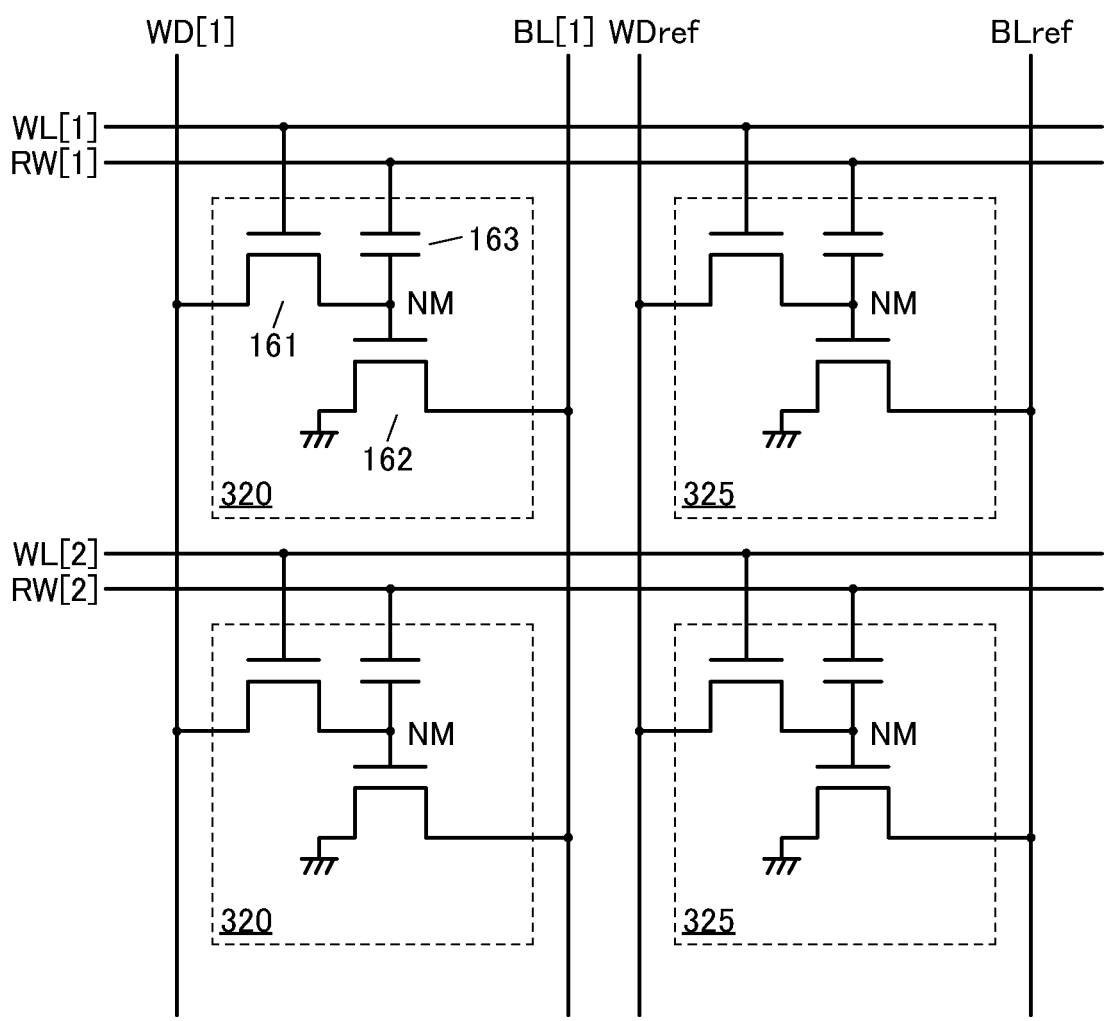
FIG. 16 is a diagram showing memory cells.

FIG. 16 illustrates an example of the memory cells 320 and the reference memory cells 325. The reference memory cells 325 are provided in any one column. The memory cells 320 and the reference memory cells 325 have similar structures and each include a transistor 161, a transistor 162, and a capacitor 163.

One of a source and a drain of the transistor 161 is electrically connected to a gate of the transistor 162. The gate of the transistor 162 is electrically connected to one electrode of the capacitor 163. Here, a point at which the one of the source and the drain of the transistor 161, the gate of the transistor 162, and the one electrode of the capacitor 163 are connected is referred to as a node NM.

A gate of the transistor 161 is electrically connected to a wiring WL. The other electrode of the capacitor 163 is electrically connected to a wiring RW. One of a source and a drain of the transistor 162 is electrically connected to a reference potential wiring such as a GND wiring.

In the memory cell 320, the other of the source and the drain of the transistor 161 is electrically connected to a wiring WD. The other of the source and the drain of the transistor 162 is electrically connected to a wiring BL.

In the reference memory cell 325, the other of the source and the drain of the transistor 161 is electrically connected to a wiring WDref. The other of the source and the drain of the transistor 162 is electrically connected to a wiring BLref.

The wiring WL is electrically connected to a circuit 330. As the circuit 330, a decoder, a shift register, or the like can be used.

The wiring RW is electrically connected to the circuit 301. Binary data output from the circuit 301 is written to each memory cell. Note that a sequential circuit such as a shift register may be provided between the circuit 301 and the memory cells.

The wiring WD and the wiring WDref are electrically connected to the circuit 350. As the circuit 350, a decoder, a shift register, or the like can be used. Furthermore, the circuit 350 may include a D/A converter and an SRAM. The circuit 350 can output a weight coefficient to be written to the node NM.

The wiring BL and the wiring BLref are electrically connected to the circuit 360. The circuit 360 can have a structure equivalent to that of the circuit 201. By the circuit 360, a signal of a product-sum operation result from which offset components are eliminated can be obtained.

The circuit 360 is electrically connected to the circuit 370. The circuit 370 can also be referred to as an activation function circuit. The activation function circuit has a function of performing an arithmetic operation for converting the signal input from the circuit 360 in accordance with a predefined activation function. As the activation function, for example, a sigmoid function, a tanh function, a softmax function, a ReLU function, a threshold function, or the like can be used. The signal converted by the activation function circuit is output to the outside as output data.

Figure 17A:
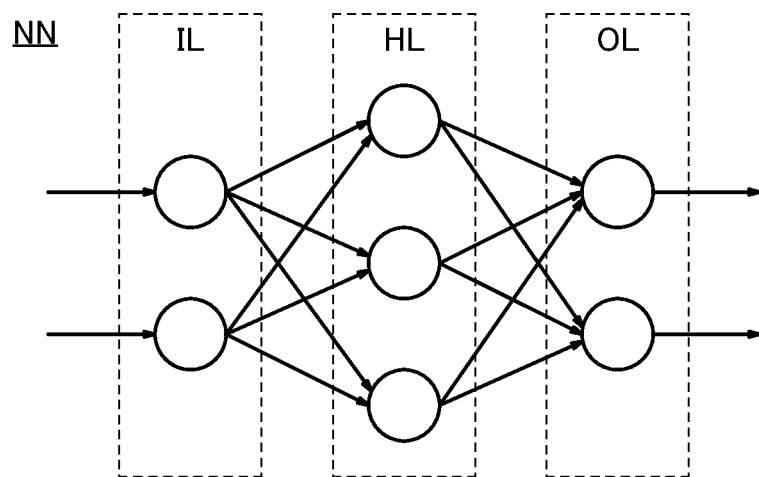
FIG. 17A and FIG. 17B are diagrams illustrating structure examples of neural networks.

As illustrated in FIG. 17A, a neural network NN can be formed of an input layer IL, an output layer OL, and a middle layer (hidden layer) HL. The input layer IL, the output layer OL, and the middle layer HL each include one or more neurons (units). Note that the middle layer HL may be composed of one layer or two or more layers. A neural network including two or more middle layers HL can also be referred to as a DNN (deep neural network). Learning using a deep neural network can also be referred to as deep learning.

Input data is input to each neuron in the input layer IL. An output signal of a neuron in the previous layer or the subsequent layer is input to each neuron in the middle layer HL. To each neuron in the output layer OL, output signals of the neurons in the previous layer are input. Note that each neuron may be connected to all the neurons in the previous and subsequent layers (full connection), or may be connected to some of the neurons.

Figure 17B:
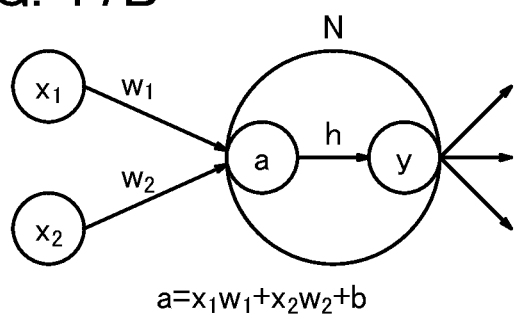

FIG. 17B illustrates an example of an arithmetic operation with the neurons. Here, a neuron N and two neurons in the previous layer which output signals to the neuron N are illustrated. An output $x_1$ of a neuron in the previous layer and an output $x_2$ of a neuron in the previous layer are input to the neuron N. Then, in the neuron N, a total sum $x_1w_1+x_2w_2$ of a multiplication result ($x_1w_1$) of the output $x_1$ and a weight $w_1$ and a multiplication result ($x_2w_2$) of the output $x_2$ and a weight $w_2$ is calculated, and then a bias b is added as necessary, so that the value $a=x_1w_1+x_2w_2+b$ is obtained. Then, the value a is converted with an activation function h, and an output signal y=ah is output from the neuron N.

In this manner, the arithmetic operation with the neurons includes the arithmetic operation that sums the products of the outputs and the weights of the neurons in the previous layer, that is, the product-sum operation ($x_1w_1+x_2w_2$ described above). This product-sum operation may be performed using a program on software or may be performed using hardware.

In one embodiment of the present invention, an analog circuit is used as hardware to perform a product-sum operation. In the case where an analog circuit is used as the product-sum operation circuit, the circuit scale of the product-sum operation circuit can be reduced, or higher processing speed and lower power consumption can be achieved by reduced frequency of access to a memory.

The product-sum operation circuit preferably has a structure including an OS transistor. An OS transistor is suitably used as a transistor included in an analog memory of the product-sum operation circuit because of its extremely low off-state current. Note that the product-sum operation circuit may be formed using both a Si transistor and an OS transistor.

This embodiment can be combined with the description of the other embodiments as appropriate.

Embodiment 3

In this embodiment, structure examples and the like of the imaging device of one embodiment of the present invention are described.

<Photoelectric Conversion Device>

Figure 18A:
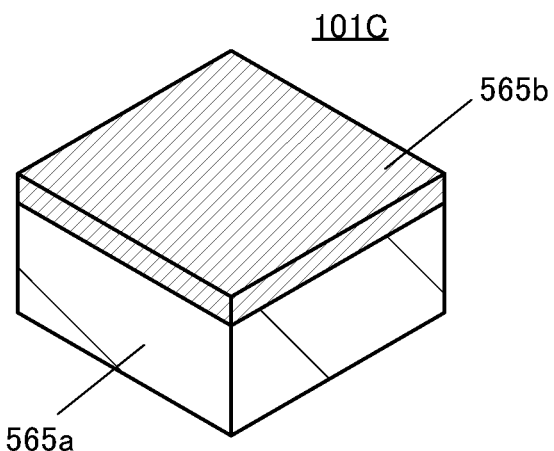
FIG. 18A and FIG. 18B are diagrams each showing a structure of a photoelectric conversion device.

A photoelectric conversion device 101C illustrated in FIG. 18A is an example of the structure that can be used for the photoelectric conversion device 101 included in the layer 24 described in Embodiment 1. The photoelectric conversion device 101C can include a layer 565a and a layer 565b. Note that the layer may be replaced with the region in some cases.

The photoelectric conversion device 101C is a pn-junction photodiode; for example, a p-type semiconductor can be used for the layer 565a, and an n-type semiconductor can be used for the layer 565b. Alternatively, an n-type semiconductor may be used for the layer 565a, and a p-type semiconductor may be used for the layer 565b.

Figure 18B:
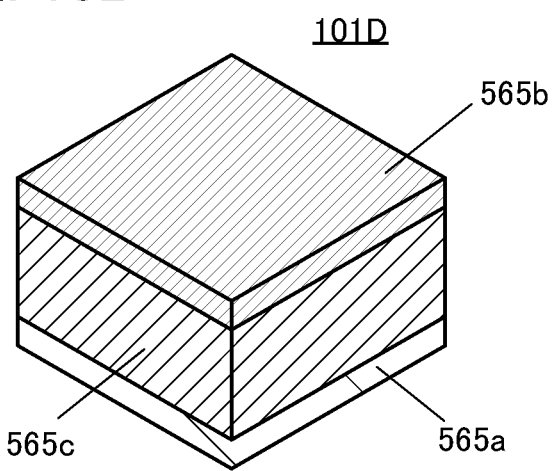

The structure of a photoelectric conversion device 101D illustrated in FIG. 18B may be used for the photoelectric conversion device 101. The photoelectric conversion device 101D is a pin-junction photodiode; for example, a p-type semiconductor can be used for the layer 565a, an i-type semiconductor can be used for the layer 565c, and an n-type semiconductor can be used for the layer 565b. Alternatively, an n-type semiconductor may be used for the layer 565a, and a p-type semiconductor may be used for the layer 565b.

The pn-junction photodiode and the pin-junction diode can be typically formed using single crystal silicon.

<OS Transistor>

The pixel circuit and the circuit 423 described in Embodiment 1 can include OS transistors.

As a semiconductor material used for an OS transistor, a metal oxide whose energy gap is greater than or equal to 2 eV, preferably greater than or equal to 2.5 eV, further preferably greater than or equal to 3 eV can be used. A typical example is an oxide semiconductor containing indium, and a CAAC-OS or a CAC-OS, each of which will be described later, or the like can be used, for example. A CAAC-OS has a crystal structure including stable atoms and is suitable for a transistor that is required to have high reliability, and the like. A CAC-OS has high mobility and is suitable for a transistor that operates at high speed, and the like.

A semiconductor layer of an OS transistor has a large energy gap, and thus the OS transistor has an extremely low off-state current of several yoctoamperes per micrometer (current per micrometer of a channel width). An OS transistor has features such that impact ionization, an avalanche breakdown, a short-channel effect, and the like do not occur, which are different from those of a Si transistor. Hence, the use of an OS transistor enables formation of a circuit having high withstand voltage and high reliability. Moreover, variations in electrical characteristics due to crystallinity unevenness, which are caused in Si transistors, are less likely to occur in OS transistors.

A semiconductor layer included in an OS transistor can be, for example, a film represented by an In-M-Zn-based oxide that contains indium, zinc, and M (M is one or more selected from metals such as aluminum, titanium, gallium, germanium, yttrium, zirconium, lanthanum, cerium, tin, neodymium, and hafnium). The In-M-Zn-based oxide can be formed by, for example, a sputtering method, an ALD (Atomic layer deposition) method, or an MOCVD (Metal organic chemical vapor deposition) method.

In the case where the In-M-Zn-based oxide is deposited by a sputtering method, it is preferable that the atomic ratio of the metal elements in a sputtering target satisfy In≥M and Zn≥M. The atomic ratio of the metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:3, In:M:Zn=5:1:6, In:M:Zn=5:1:7, In:M:Zn=5:1:8, or In:M:Zn=10:1:3. Note that the atomic ratio in the formed semiconductor layer varies from the above atomic ratio of the metal elements of the sputtering target in a range of ±40%.

An oxide semiconductor with a low carrier density is used for the semiconductor layer. For example, for the semiconductor layer, it is possible to use an oxide semiconductor whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, even further preferably lower than $1\times10^{10}/cm^3$, and higher than or equal to $1\times10^{-9}/cm^3$. Such an oxide semiconductor is referred to as a highly purified intrinsic or substantially highly purified intrinsic oxide semiconductor. The oxide semiconductor has a low density of defect states and can thus be referred to as an oxide semiconductor having stable characteristics Note that the composition is not limited to those described above, and an oxide semiconductor having an appropriate composition can be used depending on required semiconductor characteristics and electrical characteristics (e.g., field-effect mobility and threshold voltage) of the transistor. To obtain the required semiconductor characteristics of the transistor, it is preferable that the carrier density, the impurity concentration, the defect density, the atomic ratio between metal elements and oxygen, the interatomic distance, the density, or the like of the semiconductor layer be set to appropriate values.

When silicon or carbon, which is one of elements belonging to Group 14, is contained in the oxide semiconductor included in the semiconductor layer, oxygen vacancies are increased, and the semiconductor layer becomes n-type. Thus, the concentration of silicon or carbon (the concentration obtained by secondary ion mass spectrometry) in the semiconductor layer is set lower than or equal to $2\times10^{18}$ atoms/$cm^3$, preferably lower than or equal to $2\times10^{17}$ atoms/$cm^3$.

Alkali metal and alkaline earth metal might generate carriers when bonded to an oxide semiconductor, in which case the off-state current of the transistor might be increased. Therefore, the concentration of alkali metal or alkaline earth metal (the concentration obtained by secondary ion mass spectrometry) in the semiconductor layer is set lower than or equal to $1\times10^{18}$ atoms/$cm^3$, preferably lower than or equal to $2\times10^{16}$ atoms/$cm^3$.

When nitrogen is contained in the oxide semiconductor included in the semiconductor layer, electrons serving as carriers are generated and the carrier density increases, so that the semiconductor layer easily becomes n-type. As a result, a transistor using an oxide semiconductor that contains nitrogen is likely to have normally-on characteristics. Hence, the nitrogen concentration (the concentration obtained by secondary ion mass spectrometry) in the semiconductor layer is preferably set lower than or equal to $5\times10^{18}$ atoms/$cm^3$.

When hydrogen is contained in the oxide semiconductor included in the semiconductor layer, hydrogen reacts with oxygen bonded to a metal atom to be water, and thus sometimes forms oxygen vacancies in the oxide semiconductor. If the channel formation region in the oxide semiconductor includes oxygen vacancies, the transistor sometimes has normally-on characteristics. In some cases, a defect in which hydrogen enters oxygen vacancies functions as a donor and generates an electron serving as a carrier. In other cases, bonding of part of hydrogen to oxygen bonded to a metal atom generates electrons serving as carriers. Thus, a transistor using an oxide semiconductor that contains a large amount of hydrogen is likely to have normally-on characteristics.

A defect in which hydrogen enters oxygen vacancies can function as a donor of the oxide semiconductor. However, it is difficult to evaluate the defects quantitatively. Thus, the oxide semiconductor is sometimes evaluated by not its donor concentration but its carrier concentration. Therefore, in this specification and the like, the carrier concentration assuming the state where an electric field is not applied is sometimes used, instead of the donor concentration, as the parameter of the oxide semiconductor. That is, "carrier concentration" in this specification and the like can be replaced with "donor concentration" in some cases.

Therefore, hydrogen in the oxide semiconductor is preferably reduced as much as possible. Specifically, the hydrogen concentration in the oxide semiconductor, which is obtained by secondary ion mass spectrometry (SIMS), is lower than $1\times10^{20}$ atoms/$cm^3$, preferably lower than $1\times10^{19}$ atoms/$cm^3$, further preferably lower than $5\times10^{18}$ atoms/$cm^3$, still further preferably lower than $1\times10^{18}$ atoms/$cm^3$. When an oxide semiconductor with sufficiently reduced impurities such as hydrogen is used for a channel formation region of a transistor, the transistor can have stable electrical characteristics.

The semiconductor layer may have a non-single-crystal structure, for example. Examples of the non-single-crystal structure include a CAAC-OS (C-Axis Aligned Crystalline $O_{X1}$ de Semiconductor) including a c-axis aligned crystal, a polycrystalline structure, a microcrystalline structure, and an amorphous structure. Among the non-single-crystal structures, the amorphous structure has the highest density of defect states, whereas the CAAC-OS has the lowest density of defect states.

An oxide semiconductor film having an amorphous structure has disordered atomic arrangement and no crystalline component, for example. Alternatively, an oxide film having an amorphous structure has, for example, a completely amorphous structure and no crystal part.

Note that the semiconductor layer may be a mixed film including two or more of a region having an amorphous structure, a region having a microcrystalline structure, a region having a polycrystalline structure, a CAAC-OS region, and a region having a single crystal structure. The mixed film has, for example, a single-layer structure or a stacked-layer structure including two or more of the above-described regions in some cases.

The composition of a CAC (Cloud-Aligned Composite)-OS, which is one embodiment of a non-single-crystal semiconductor layer, is described below.

A CAC-OS refers to one composition of a material in which elements constituting an oxide semiconductor are unevenly distributed with a size greater than or equal to 0.5 nm and less than or equal to 10 nm, preferably greater than or equal to 1 nm and less than or equal to 2 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 2 nm, or a similar size in an oxide semiconductor is hereinafter referred to as a mosaic pattern or a patch-like pattern.

Note that an oxide semiconductor preferably contains at least indium. In particular, indium and zinc are preferably contained. In addition, one or more kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, a CAC-OS in an In—Ga—Zn oxide (of the CAC-OS, an In—Ga—Zn oxide may be particularly referred to as CAC-IGZO) has a composition in which materials are separated into indium oxide (hereinafter $InO_{X1}$, where X1 is a real number greater than 0) or indium zinc oxide (hereinafter $In_{X2}Zn_{Y2}O_{Z2}$, where X2, Y2, and Z2 are real numbers greater than 0), and gallium oxide (hereinafter $GaO_{X3}$, where X3 is a real number greater than 0) or gallium zinc oxide (hereinafter $Ga_{X4}Zn_{Y4}O_{Z4}$, where X4, Y4, and Z4 are real numbers greater than 0), for instance, to form a mosaic pattern, and $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor having a composition in which a region including $GaO_{X3}$ as a main component and a region including $In_{X2} Zn_{Y2}O_{Z2}$ or $InO_{X1}$ as a main component are mixed. Note that in this specification, for example, when the atomic ratio of In to the element M in a first region is greater than the atomic ratio of In to the element M in a second region, the first region is regarded as having a higher In concentration than the second region.

Note that IGZO is a common name, which may specify a compound containing In, Ga, Zn, and O. A typical example is a crystalline compound represented by $InGaO_3(ZnO)_{m1}$ (m1 is a natural number) or $In_{(1+x0)}Ga_{(1-x0)}O_3(ZnO)_{m0}$ (−1≤x0≤1; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. The CAC-OS refers to a composition in which, in the material composition containing In, Ga, Zn, and O, some regions that contain Ga as a main component and are observed as nanoparticles and some regions that contain In as a main component and are observed as nanoparticles are randomly dispersed in a mosaic pattern. Therefore, the crystal structure is a secondary element for the CAC-OS.

Note that in the CAC-OS, a stacked-layer structure including two or more films with different compositions is not included. For example, a two-layer structure of a film containing In as a main component and a film containing Ga as a main component is not included.

A boundary between the region containing $GaO_{X3}$ as a main component and the region containing $In_{X2}Zn_{Y2}O_{Z2}$ or $InO_{X1}$ as a main component is not clearly observed in some cases.

In the case where one or more kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, nanoparticle regions containing the selected metal element(s) as a main component are observed in part of a CAC-OS and nanoparticle regions containing In as a main component are observed in part of the CAC-OS, and these nanoparticle regions are randomly dispersed to form a mosaic pattern.

The CAC-OS can be formed by a sputtering method under a condition where a substrate is not heated intentionally, for example. Moreover, in the case of forming the CAC-OS by a sputtering method, any one or more selected from an inert gas (typically, argon), an oxygen gas, and a nitrogen gas are used as a deposition gas. The ratio of the flow rate of the oxygen gas to the total flow rate of the deposition gas in deposition is preferably as low as possible, and for example, the ratio of the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an Out-of-plane method, which is an X-ray diffraction (XRD) measurement method. That is, it is found from X-ray diffraction measurement that no alignment in the a-b plane direction and the c-axis direction is observed in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. It is therefore found from the electron diffraction pattern that the crystal structure of the CAC-OS includes an nc (nano-crystal) structure with no alignment in the plan-view direction and the cross-sectional direction.

Moreover, for example, it can be confirmed by EDX mapping obtained using energy dispersive X-ray spectroscopy (EDX) that the CAC-OS in the In—Ga—Zn oxide has a composition in which regions including $GaO_{X3}$ as a main component and regions including $In_{X2}Zn_{Y2}O_{Z2}$ or $InO_{X1}$ as a main component are unevenly distributed and mixed.

The CAC-OS has a composition different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are phase-separated from each other to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through the regions including $In_{X2}Zn_{Y2}O_{Z2}$ or $InO_{X1}$ as a main component, the conductivity of an oxide semiconductor is exhibited. Accordingly, when the regions including $In_{x2}Zn_{y2}O_{z2}$ or $InO_{x1}$ as a main component are distributed in an oxide semiconductor like a cloud, high field-effect mobility (μ) can be achieved.

By contrast, the insulating property of a region including $GaO_{x3}$ or the like as a main component is higher than that of a region including $In_{x2}Zn_{y2}O_{z2}$ or $InO_{x1}$ as a main component. In other words, when the regions including $GaO_{x3}$ or the like as a main component are distributed in an oxide semiconductor, a leakage current can be suppressed and a favorable switching operation can be achieved.

Accordingly, when the CAC-OS is used for a semiconductor element, the insulating property derived from $GaO_{x3}$ or the like and the conductivity derived from $In_{x2}Zn_{y2}O_{z2}$ or $InO_{x1}$ complement each other, whereby a high on-state current ($I_{on}$) and high field-effect mobility (μ) can be achieved.

A semiconductor element using a CAC-OS has high reliability. Thus, the CAC-OS is suitably used as a constituent material of a variety of semiconductor devices.

Next, a stacked structure of the imaging device is described with reference to a cross-sectional view. The cross-sectional view corresponds to a plane in the height direction including the dashed-dotted line A1-A2 illustrated in the layer 23 in FIG. 2. Note that components such as insulating layers and conductive layers that are described below are examples, and the imaging device may further include another component. Alternatively, some of the components described below may be omitted. The stacked structure described below can be formed by repeating a deposition step, a polishing step, and the like as needed.

<Stacked Structure 1>

Figure 19:
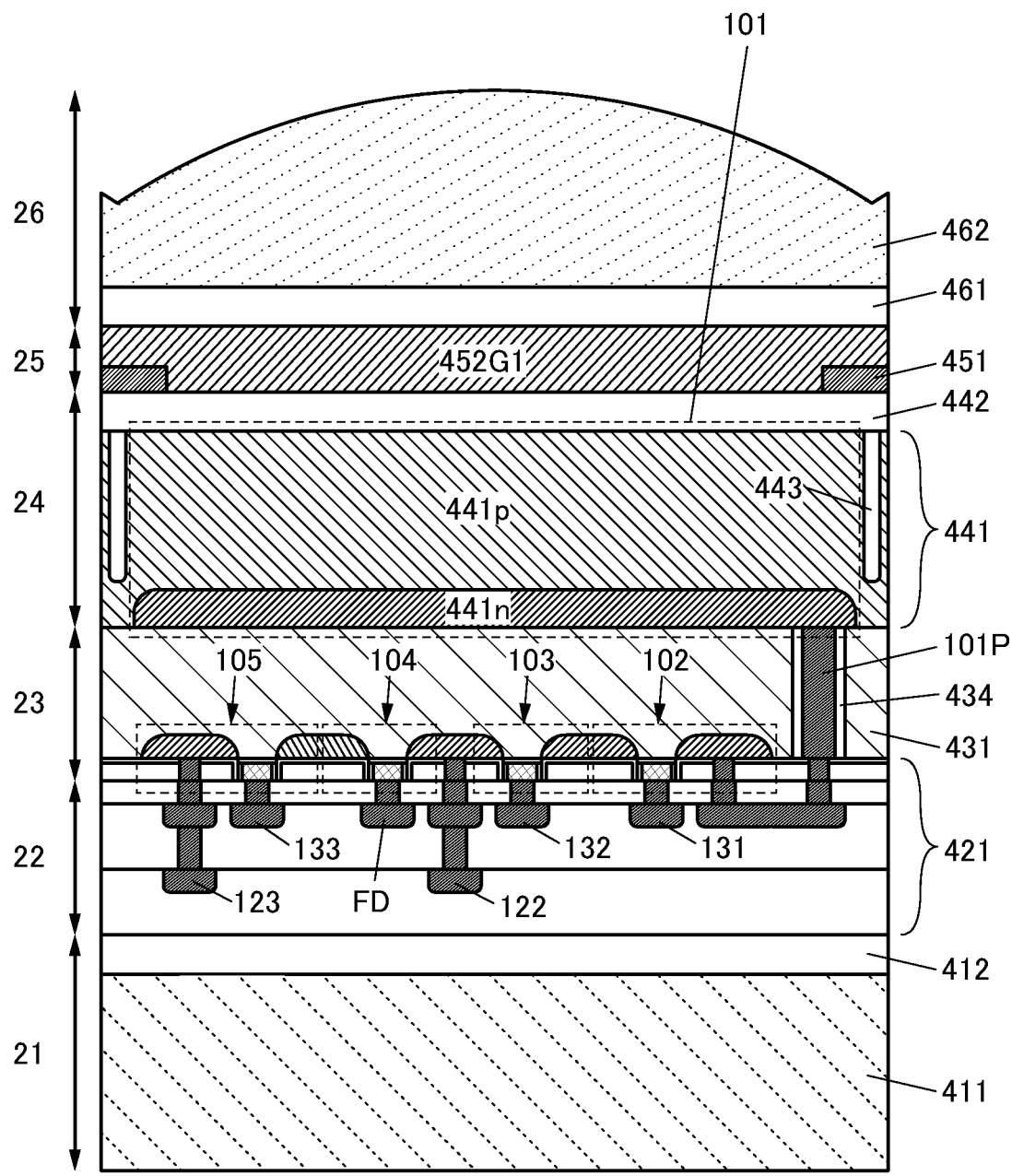
FIG. 19 is a diagram showing a pixel.

FIG. 19 is a cross-sectional view of an imaging device employing the layout illustrated in FIG. 5. The transistors 102, 103, 104, and 105 illustrated in the layer 23 are transistors each including a channel formation region in the semiconductor layer 431, which is a silicon epitaxial growth layer (hereinafter such a transistor is referred to as a Si transistor).

Figure 20A:
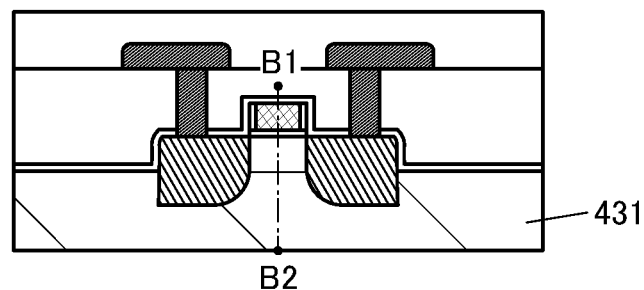
FIG. 20A to FIG. 20C are diagrams showing Si transistors.
Figure 20B:
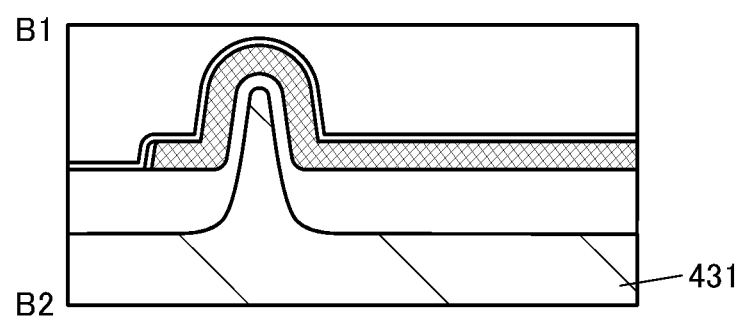

The transistors illustrated in FIG. 19 are planar-type transistors, but may be fin-type transistors as illustrated in FIG. 20A and FIG. 20B. FIG. 20A is a cross-sectional view in the channel length direction, and FIG. 20B is a cross-sectional view of a position of the dashed-dotted line B1-B2 illustrated in FIG. 20A in the channel width direction.

Figure 20C:
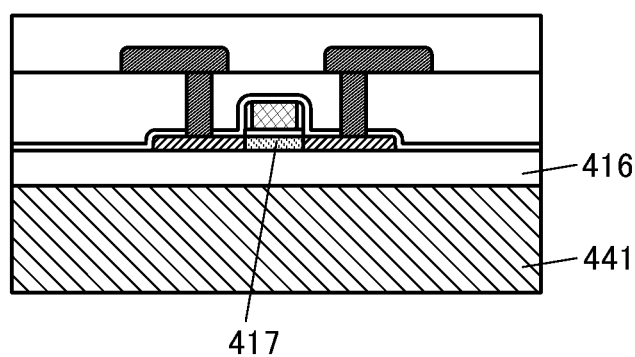

Alternatively, a transistor may include a semiconductor layer 417 of a silicon thin film as illustrated in FIG. 20C. The semiconductor layer 417 can be single crystal silicon (SOI (Silicon on Insulator)) formed on an insulating layer 416 on the single crystal silicon substrate 441 included in the layer 24, for example.

The layer 22 has a stacked structure and includes a multilayer wiring layer in which main wirings connected to the transistors are embedded in the multilayer insulating layer 421. The wirings, or the wiring and the transistor are connected through a plug.

As the insulating layers (an insulating layer 412, the insulating layers 421, 442, and 461, and the like) included in the stacked structure, for example, an inorganic insulating film such as a silicon oxide film or an organic insulating film of an acrylic resin, a polyimide resin, or the like can be used. Alternatively, a silicon nitride film, a silicon oxide film, an aluminum oxide film, and the like may be stacked.

As a conductor that can be used for a wiring, an electrode, and a plug used for electrical connection between devices, a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements as its component; an alloy containing a combination of the above metal elements; or the like is selected and used as appropriate. The conductor is not limited to a single layer, and may be a plurality of layers including different materials.

The photoelectric conversion device 101 illustrated in the layer 24 has the structure of the pn-junction photodiode illustrated in FIG. 18A and includes a layer 441n (n-type region) and a layer 441p (p-type region, part of the single crystal silicon substrate 441).

The photoelectric conversion device 101 included in one pixel is surrounded by the element separation layer 443 to be separated from the photoelectric conversion device 101 in an adjacent pixel. The element separation layer 443 can inhibit carriers generated by photoelectric conversion from diffusing into adjacent pixels. Note that the element separation layer 443 may have a function of a light-blocking layer or a reflective layer.

As the element separation layer 443, an inorganic insulating layer, an organic insulating layer, or the like can be used. For example, the element separation layer 443 can be formed using the same material as the insulating layer 442 provided in contact with the single crystal silicon substrate 441. A space may be provided in part of the element separation layer 443. The space may contain air or a gas such as an inert gas. The space may be in a reduced pressure state.

The layer 441n, which corresponds to the cathode of the photoelectric conversion device 101, is electrically connected to one of the source and the drain of the transistor 102 through the plug 101P provided in the semiconductor layer 431 in the layer 23. An insulator 434 is preferably provided between the plug 101P and an opening portion provided in the semiconductor layer 431.

Figure 21:
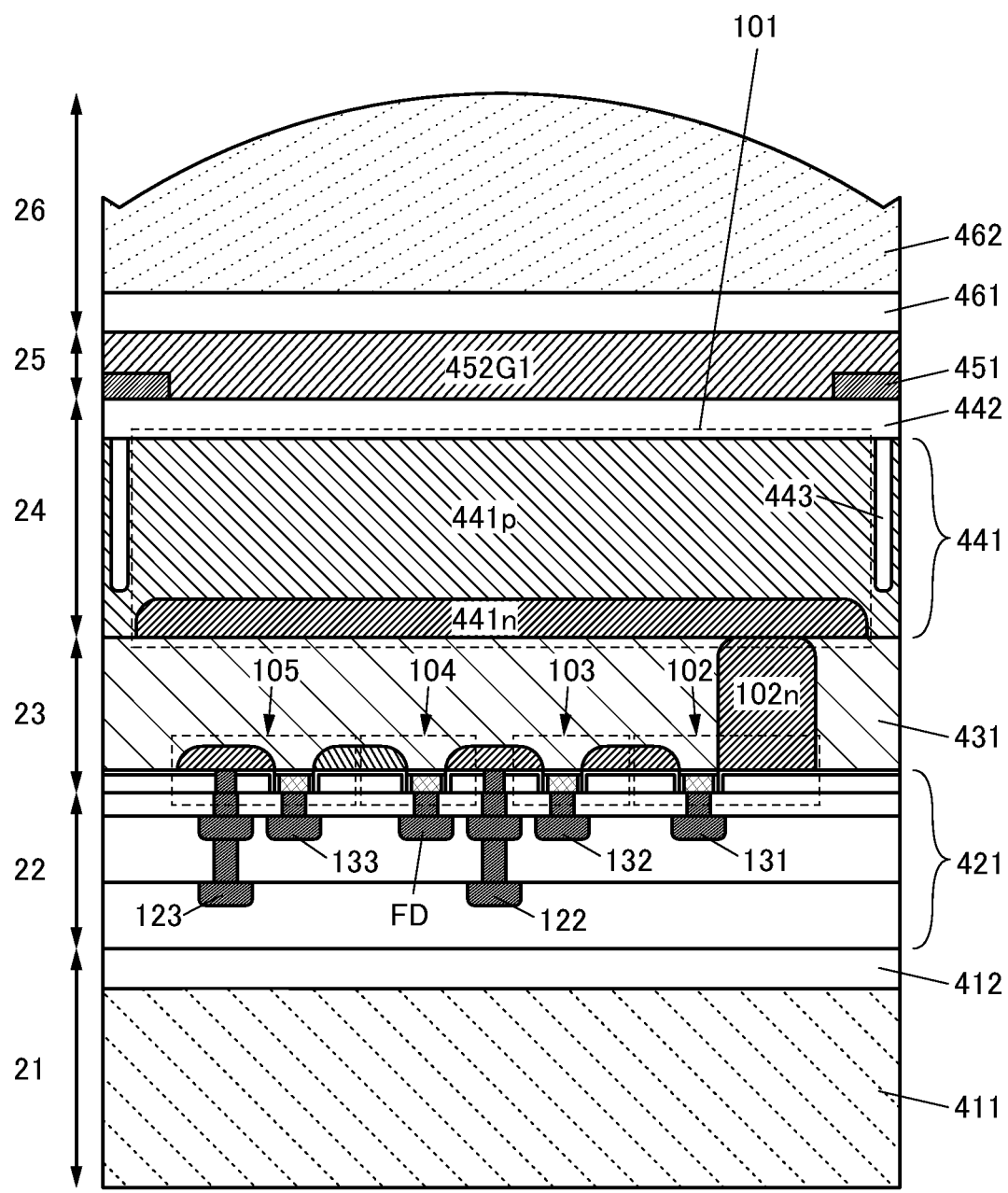
FIG. 21 is a diagram showing a pixel.

The electrical connection between the photoelectric conversion device 101 and the transistor 102 may be performed through the low-resistance region 102n provided in the semiconductor layer 431 as illustrated in FIG. 21. In the case where the transistor 102 is an n-channel transistor, the low-resistance region 102n has n-type conductivity, and the layer 441n has n-type conductivity, the one of the source and the drain of the transistor 102 is directly connected to the photoelectric conversion device 101. Such a structure allows complete transfer of electric charge due to complete depletion in the photoelectric conversion device 101, thereby reducing noise.

Figure 22:
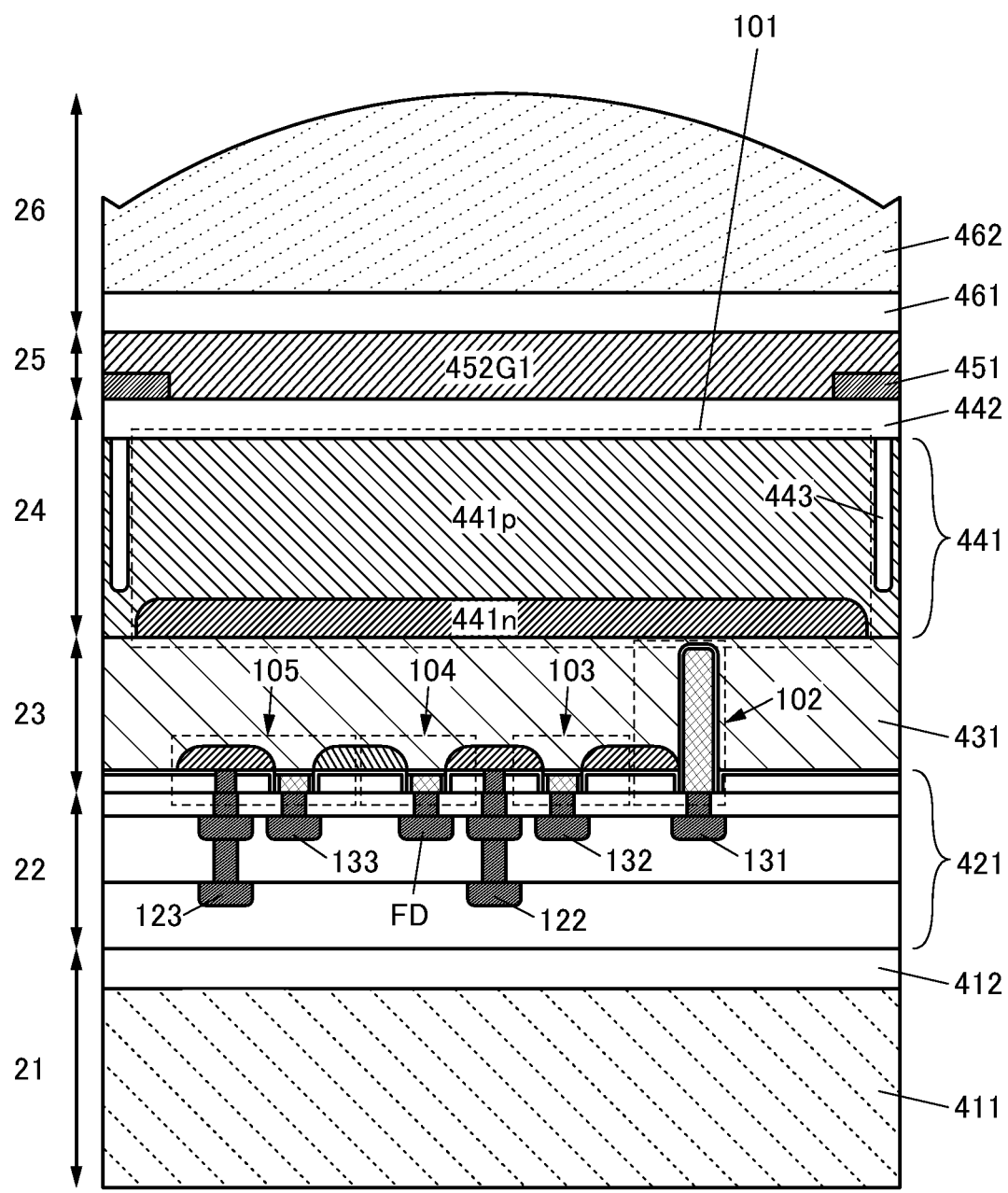
FIG. 22 is a diagram showing a pixel.

The electrical connection between the photoelectric conversion device 101 and the transistor 102 may be performed with the structure illustrated in FIG. 22. The structure illustrated in FIG. 22 has a trench structure in which the gate of the transistor 102 is provided in the semiconductor layer 431: when a voltage is applied to the gate, the formed channel can be electrically connected to the layer 441n.

The light-blocking layer 451 and a photoelectric conversion layer are provided in the layer 25. Here, the color filter 452G1 is illustrated as the photoelectric conversion layer.

The light-blocking layer 451 can suppress entry of light into an adjacent pixel. As the light-blocking layer 451, a metal layer of aluminum, tungsten, or the like can be used. Alternatively, the metal layer and a dielectric film may be stacked. The dielectric film functions as an anti-reflection film.

When the photoelectric conversion device 101 has sensitivity to visible light, a color filter can be used as the photoelectric conversion layer. When colors of R (red), G (green), B (blue), Y (yellow), C (cyan), M (magenta), and the like are assigned to the color filters of respective pixels, a color image can be obtained.

Figure 29A:
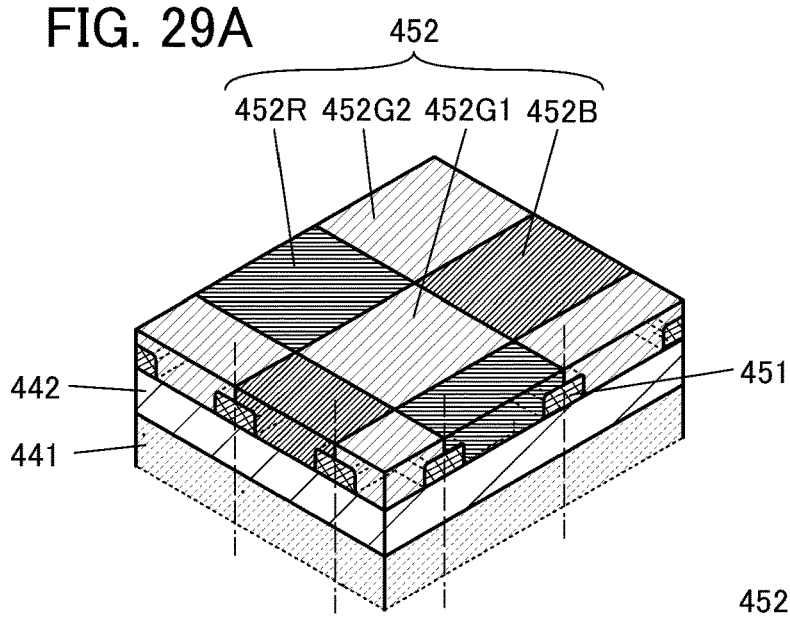
FIG. 29A to FIG. 29C are diagrams each showing a pixel.

For example, as illustrated in a perspective view (including a cross section) of FIG. 29A, a color filter 452R (red), a color filter 452G1 (green), a color filter 452G2 (green), and a color filter 452B (blue) can be assigned to different pixels as a photoelectric conversion layer 452.

When a wavelength cut filter is used as the photoelectric conversion layer 452, the imaging device can capture images in various wavelength regions.

For example, when an infrared filter that blocks light having a wavelength shorter than or equal to that of visible light is used as the photoelectric conversion layer 452, an infrared imaging device can be obtained. When a filter that blocks light with a wavelength shorter than or equal to that of near infrared light is used as the photoelectric conversion layer 452, a far-infrared imaging device can be obtained. When an ultraviolet filter that blocks light having a wavelength longer than or equal to that of visible light is used as the photoelectric conversion layer 452, an ultraviolet imaging device can be obtained.

Figure 29B:
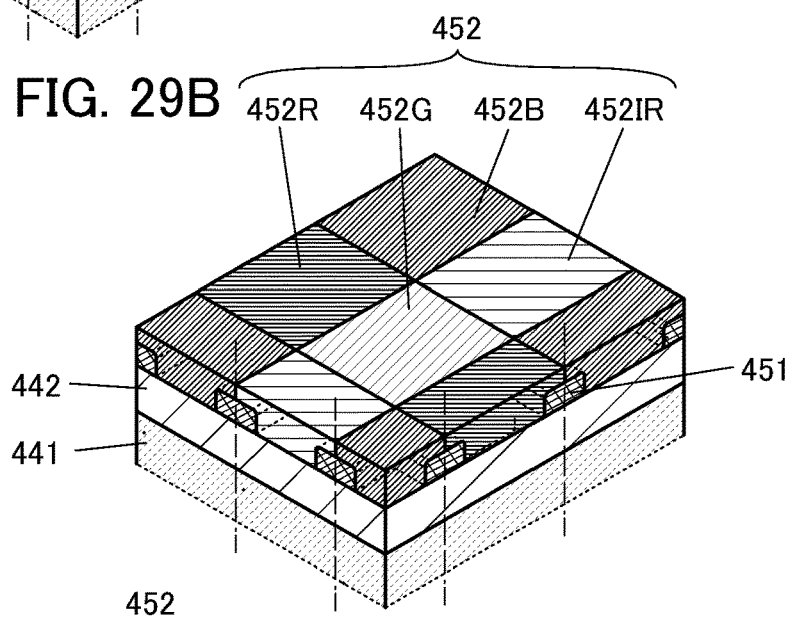

Note that photoelectric conversion layers with different functions may be provided in one imaging device. For example, as illustrated in FIG. 29B, the color filter 452R (red), the color filter 452G (green), the color filter 452B (blue), and an infrared filter 452IR can be assigned to different pixels. With this structure, a visible light image and an infrared light image can be obtained simultaneously.

Figure 29C:
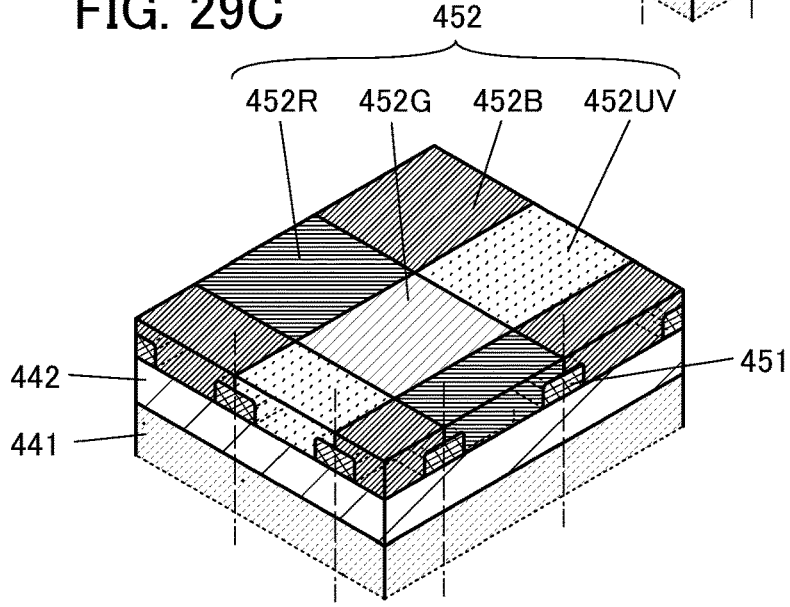

Alternatively, as illustrated in FIG. 29C, the color filter 452R (red), the color filter 452G (green), the color filter 452B (blue), and an ultraviolet filter 452UV can be assigned to different pixels. With this structure, a visible light image and an ultraviolet light image can be obtained simultaneously.

When a scintillator is used for the photoelectric conversion layer 452, it is possible to achieve an imaging device that obtains an image visualizing the intensity of radiation, which is used for an X-ray imaging device or the like. Radiation such as X-rays passes through an object and enters the scintillator, and then is converted into light (fluorescence) such as visible light or ultraviolet light owing to a photoluminescence phenomenon. Then, the photoelectric conversion device 101 detects the light to obtain image data. Furthermore, the imaging device having this structure may be used in a radiation detector or the like.

A scintillator contains a substance that, when irradiated with radiation such as X-rays or gamma-rays, absorbs energy of the radiation to emit visible light or ultraviolet light. For example, it is possible to use a resin, ceramics, or the like in which $Gd_2O_2S:Tb$, $Gd_2O_2S:Pr$, $Gd_2O_2S:Eu$, $BaFCl:Eu$, $NaI$, $CsI$, $CaF_2$, $BaF_2$, $CeF_3$, $LiF$, $LiI$, $ZnO$, or the like is dispersed.

Image capturing with the use of infrared light or ultraviolet light can provide the imaging device with an inspection function, a security function, a sensor function, or the like. For example, by image capturing with the use of infrared light, non-destructive inspection of products, sorting of agricultural products (e.g., sugar content meter function), vein authentication, medical inspection, or the like can be performed. Furthermore, by image capturing with the use of ultraviolet light, detection of ultraviolet light released from a light source or a frame can be performed, whereby a light source, a heat source, a production device, or the like can be controlled, for example.

The layer 26 includes the microlens array 462. Light passing through an individual lens of the microlens array 462 goes through the photoelectric conversion layer directly under the lens, and the photoelectric conversion device 101 is irradiated with the light. With the microlens array 462, collected light can be incident on the photoelectric conversion device 101; thus, photoelectric conversion can be efficiently performed. The microlens array 462 is preferably formed using a resin, glass, or the like having a high light transmitting property with respect to light with an intended wavelength.

<Stacked Structure 2>

Figure 23:
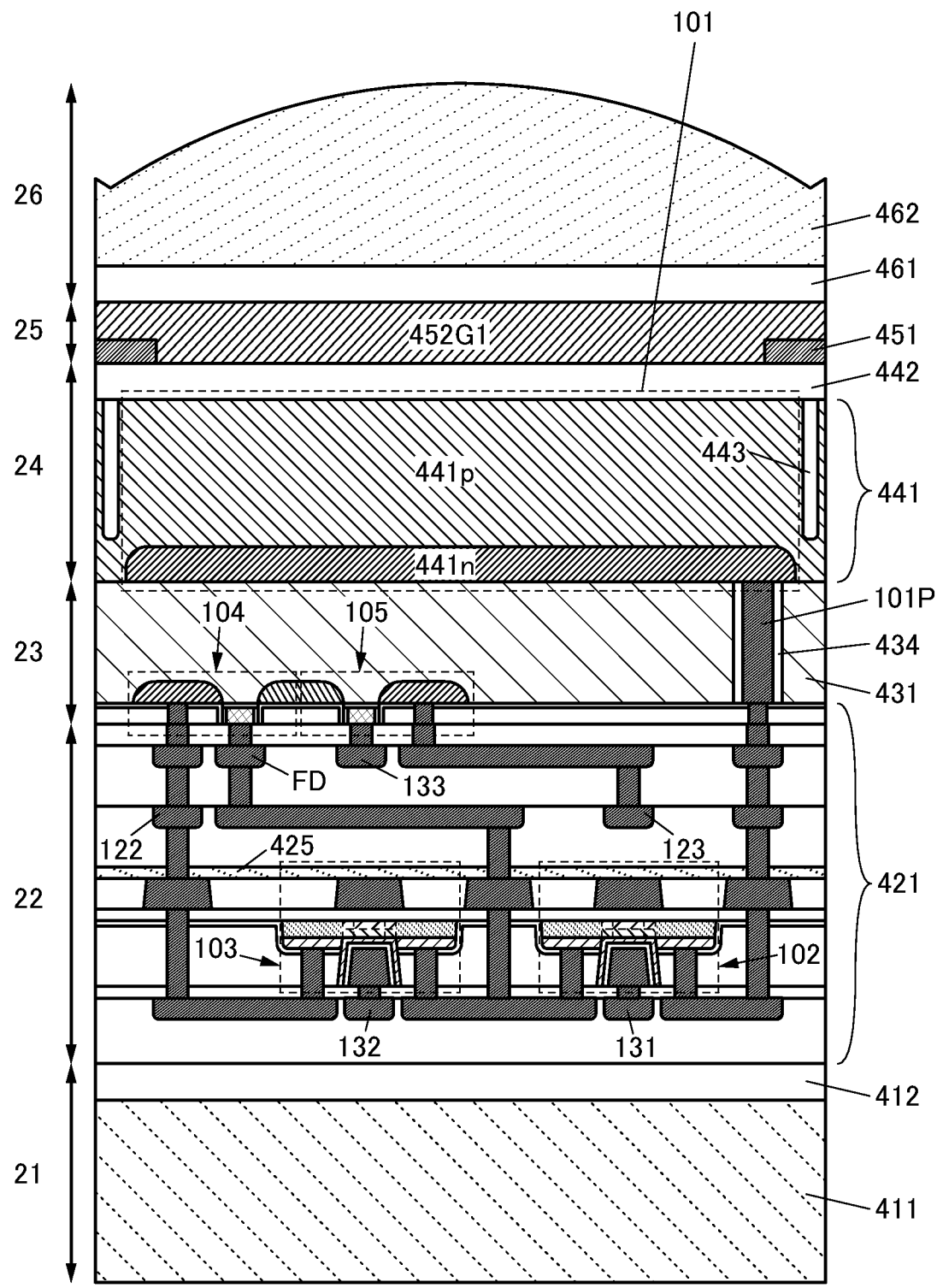
FIG. 23 is a diagram showing a pixel.

FIG. 23 is a cross-sectional view of an imaging device employing the layout illustrated in FIG. 6. The transistors 104 and 105 illustrated in the layer 23 are each a Si transistor including a channel formation region in the semiconductor layer 431. The transistors 102 and 103 illustrated in the layer 22 are each an OS transistor including a metal oxide in a channel formation region.

Figure 24A:
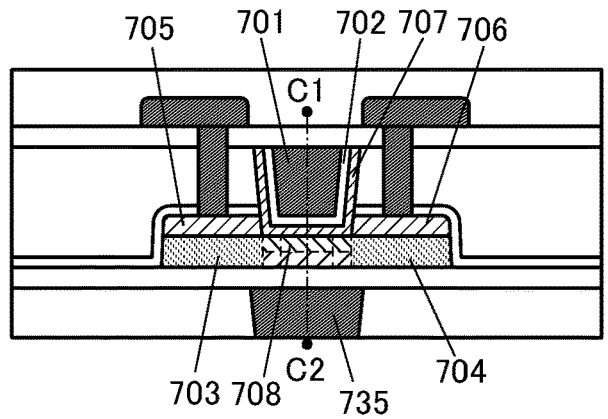
FIG. 24A to FIG. 24D are diagrams showing OS transistors.

The details of an OS transistor are illustrated in FIG. 24A. The OS transistor illustrated in FIG. 24A has a self-aligned structure in which a source electrode 705 and a drain electrode 706 are formed through formation of an insulating layer over a stack of an oxide semiconductor layer and a conductive layer and formation of an opening portion reaching the oxide semiconductor layer.

The OS transistor can include a gate electrode 701 and a gate insulating film 702 in addition to a channel formation region 708, a source region 703, and a drain region 704 that are formed in the oxide semiconductor layer. At least the gate insulating film 702 and the gate electrode 701 are provided in the opening portion. An oxide semiconductor layer 707 may also be provided in the opening portion.

Figure 24B:
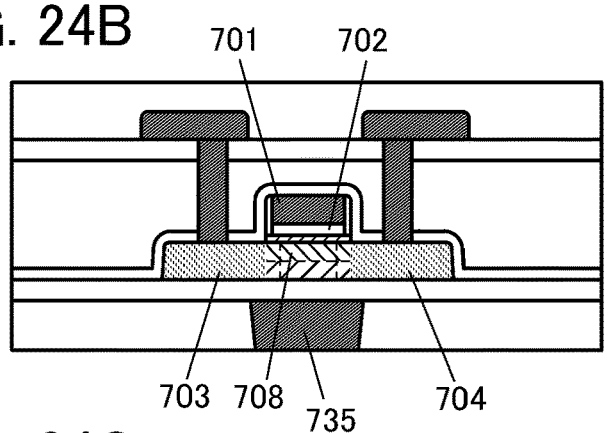

As illustrated in FIG. 24B, the OS transistor may have a self-aligned structure in which the source region 703 and the drain region 704 are formed in the semiconductor layer with the gate electrode 701 as a mask.

Figure 24C:
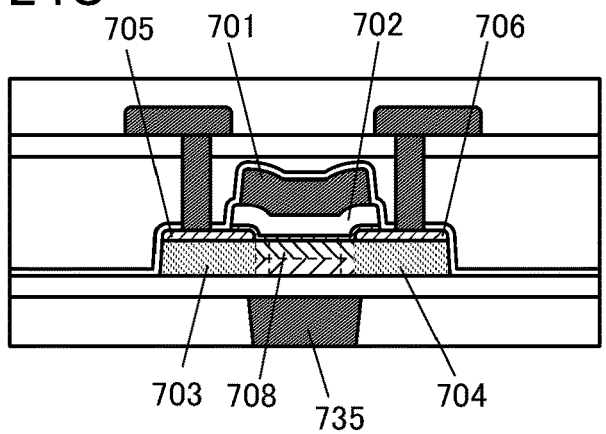

As illustrated in FIG. 24C, the OS transistor may be a non-self-aligned top-gate transistor including a region where the gate electrode 701 overlaps with the source electrode 705 or the drain electrode 706.

Figure 24D:
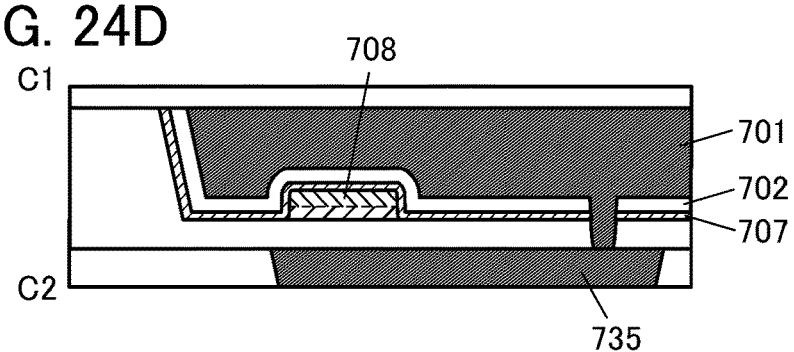

Although the OS transistor has a structure with a back gate 735, it may have a structure without a back gate. As illustrated in a cross-sectional view of the transistor in the channel width direction in FIG. 24D, the back gate 735 may be electrically connected to a front gate of the transistor, which is provided to face the back gate. Note that FIG. 24D illustrates a C1-C2 cross section of the transistor in FIG. 24A as an example, and the same applies to a transistor having any of the other structures. A structure may be employed in which different fixed potentials can be supplied to the back gate 735 and the front gate.

An insulating layer 425 is preferably provided between the layer in which the OS transistors are provided and the layer in which the Si transistors are provided. The insulating layer 425 functions as a blocking layer.

As the blocking layer, a film that has a function of preventing hydrogen diffusion is preferably used. In a Si device, hydrogen is necessary to terminate dangling bonds; however, hydrogen in the vicinity of an OS transistor is one of factors of generating carriers in an oxide semiconductor layer, which leads to a decrease in reliability. Therefore, a hydrogen blocking film is preferably provided between a layer in which the Si device is formed and a layer in which the OS transistor is formed.

For the blocking film, for example, aluminum oxide, aluminum oxynitride, gallium oxide, gallium oxynitride, yttrium oxide, yttrium oxynitride, hafnium oxide, hafnium oxynitride, or yttria-stabilized zirconia (YSZ) can be used.

<Stacked Structure 3>

Figure 25:
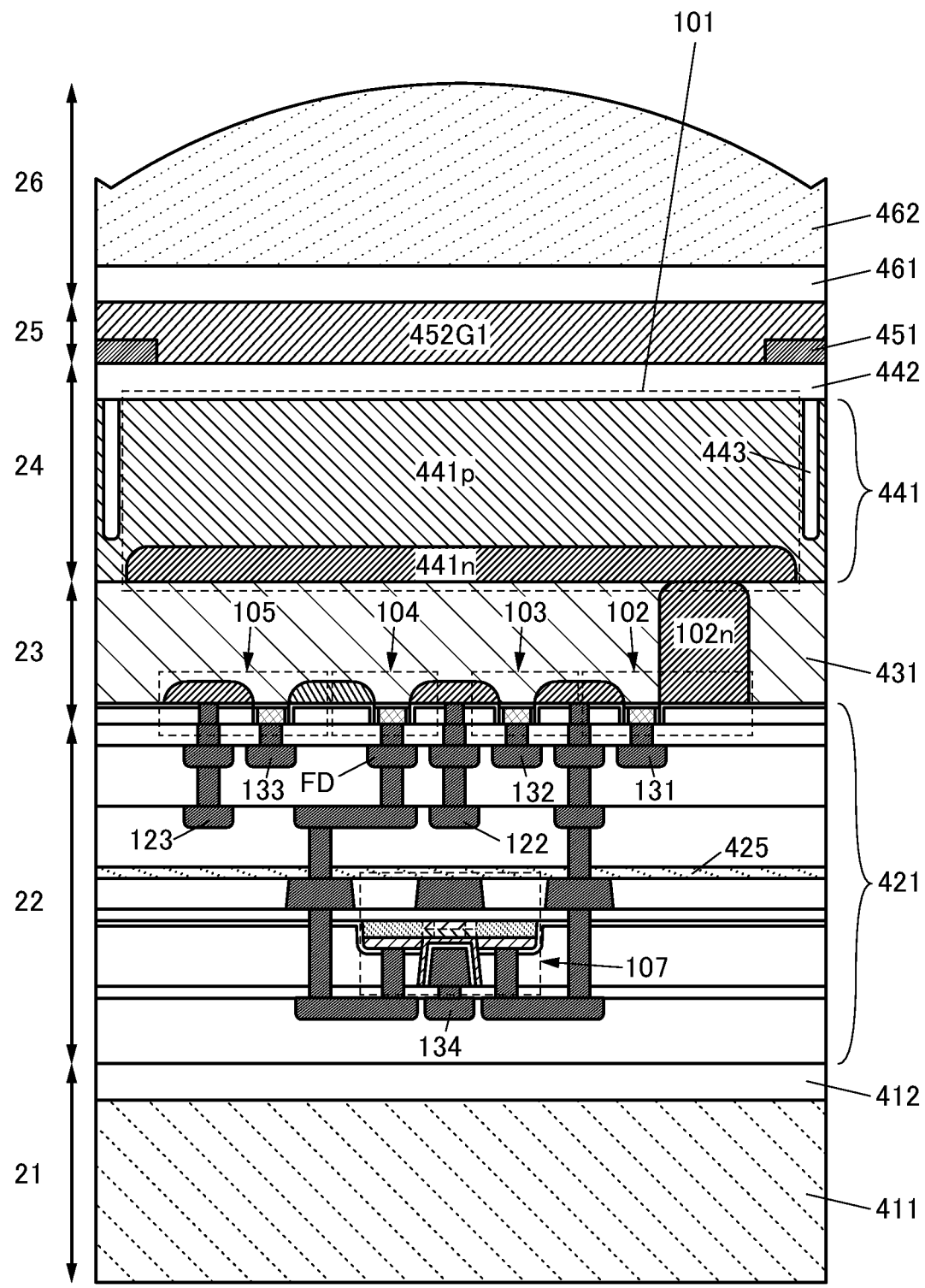
FIG. 25 is a diagram showing a pixel.

FIG. 25 is a cross-sectional view of an imaging device employing the layout illustrated in FIG. 7. The transistors 102, 103, 104, and 105 illustrated in the layer 23 are each a Si transistor including a channel formation region in the semiconductor layer 431. The transistor 107 illustrated in the layer 22 is an OS transistor including a metal oxide in a channel formation region.

In this structure, as in the structure of FIG. 21, the one of the source and the drain of the transistor 102 is directly connected to the photoelectric conversion device 101, which allows complete transfer of electric charge due to complete depletion in the photoelectric conversion device 101, thereby reducing noise.

<Stacked Structure 4>

Figure 26:
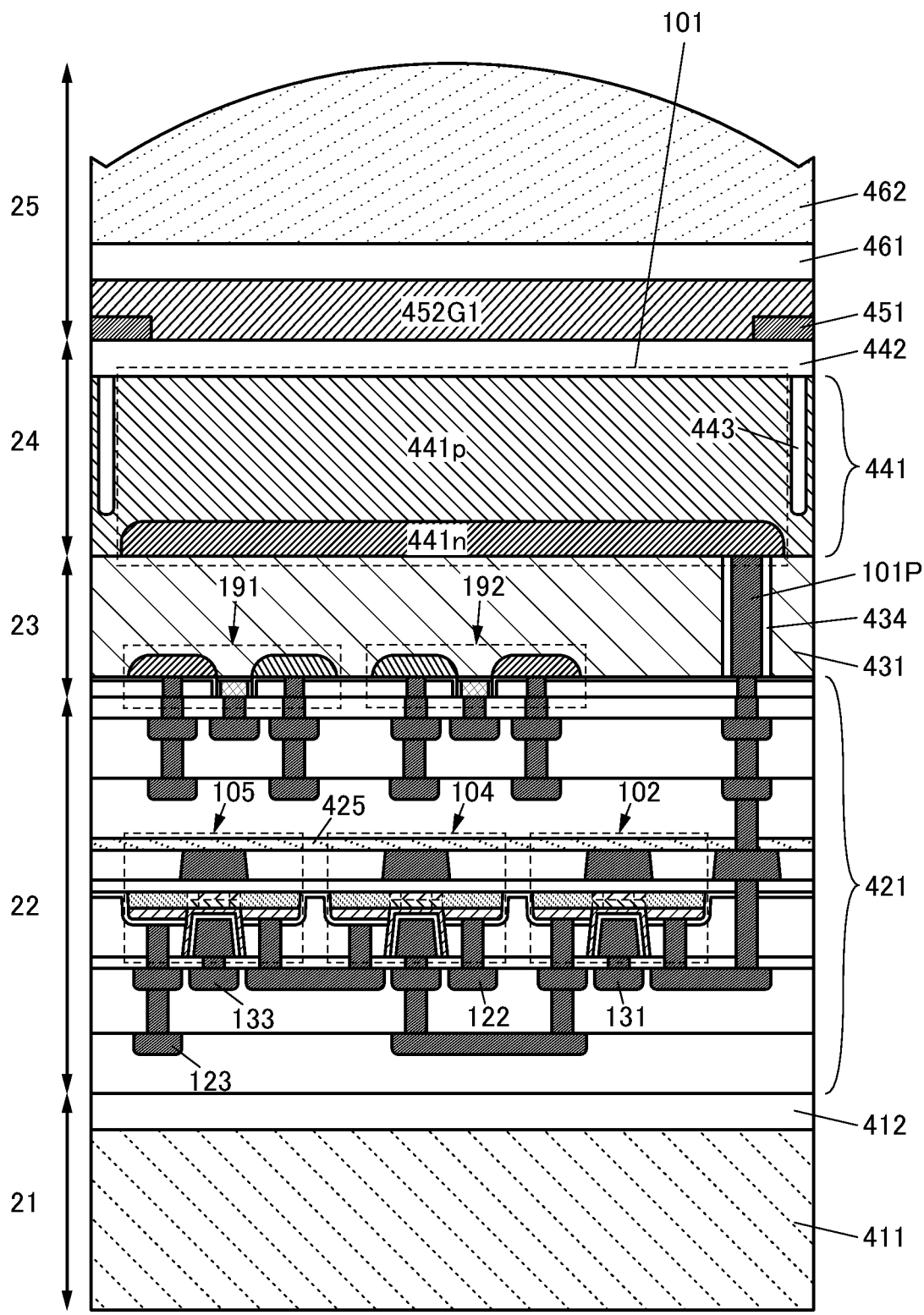
FIG. 26 is a diagram showing a pixel.

FIG. 26 illustrates a mode in which a pixel circuit is formed with OS transistors provided in the layer 22. Transistors 191 and 192 illustrated in the layer 23 are each a Si transistor including a channel formation region in the semiconductor layer 431. The transistors 102, 104, and 105 illustrated in the layer 22 are each an OS transistor including a metal oxide in a channel formation region.

The transistors 191 and 192 correspond to the components of the circuit 433 illustrated in the layer 23 in FIG. 2, i.e., the components of the functional circuit other than the pixel circuit.

<Stacked Structure 5>

Figure 27:
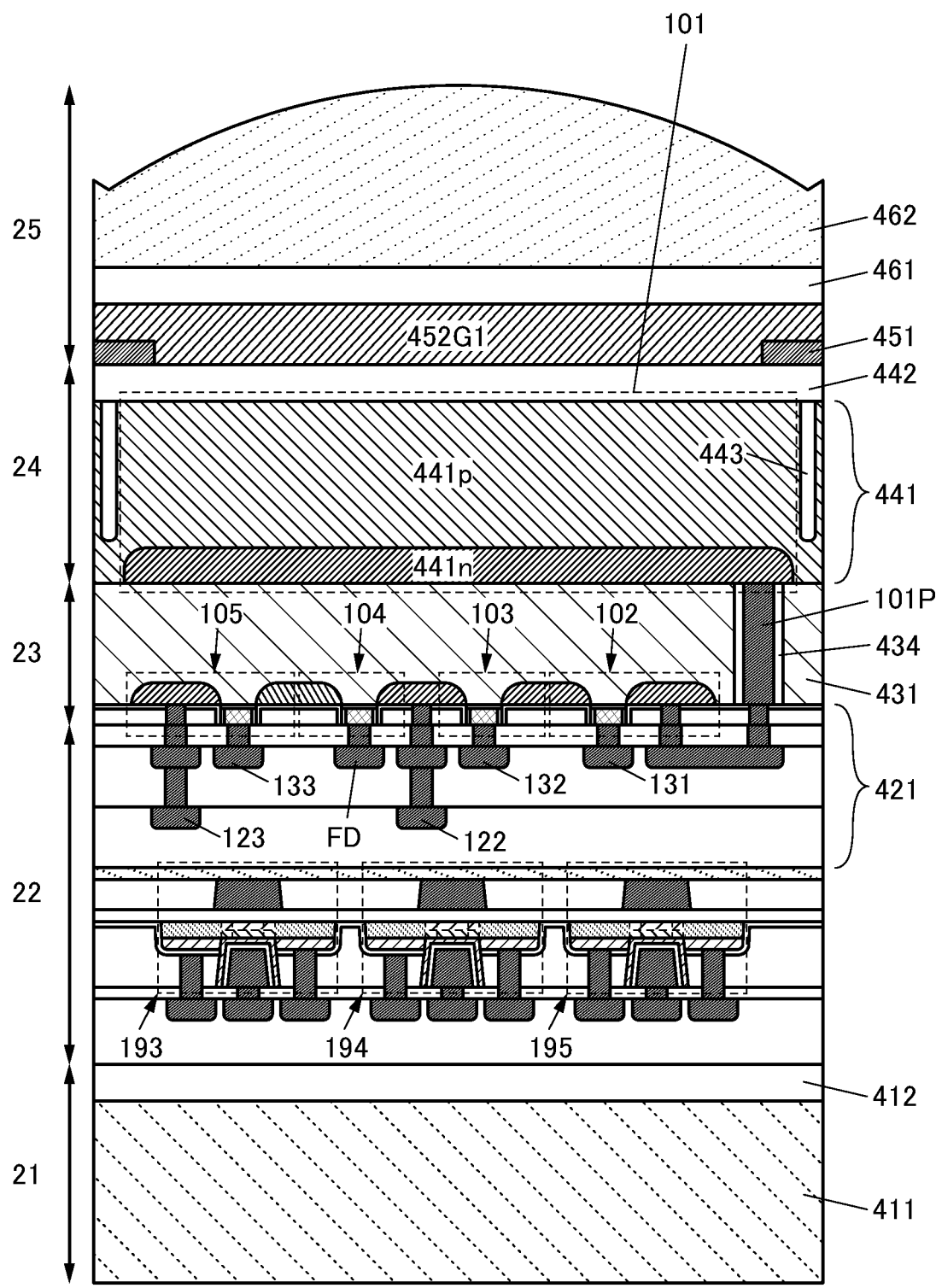
FIG. 27 is a diagram showing a pixel.

FIG. 27 illustrates a mode in which a pixel circuit is formed with Si transistors provided in the layer 23 and a functional circuit is formed with OS transistors. The transistors 102, 103, 104, and 105 illustrated in the layer 23 are each a Si transistor including a channel formation region in the semiconductor layer 431. Transistors 193, 194, and 195 illustrated in the layer 22 are each an OS transistor including a metal oxide in a channel formation region.

The transistors 193, 194, and 195 correspond to the components of the circuit 423 illustrated in the layer 22 in FIG. 2, i.e., the components of the functional circuit other than the pixel circuit.

As illustrated in Stacked structure 2 to Stacked structure 5, the OS transistor can be formed so as to have a region overlapping with the Si transistor; thus, circuits or components for adding a function to the imaging device can be arranged while being stacked. As a result, the imaging device can be downsized effectively.

<Bonding>

Although Stacked structure 2 to Stacked structure 5 each illustrate an example in which the OS transistor is formed over the Si transistor through common steps such as a wiring step, electrical connection between the Si transistor and the OS transistor may be performed by using a bonding step.

Figure 28:
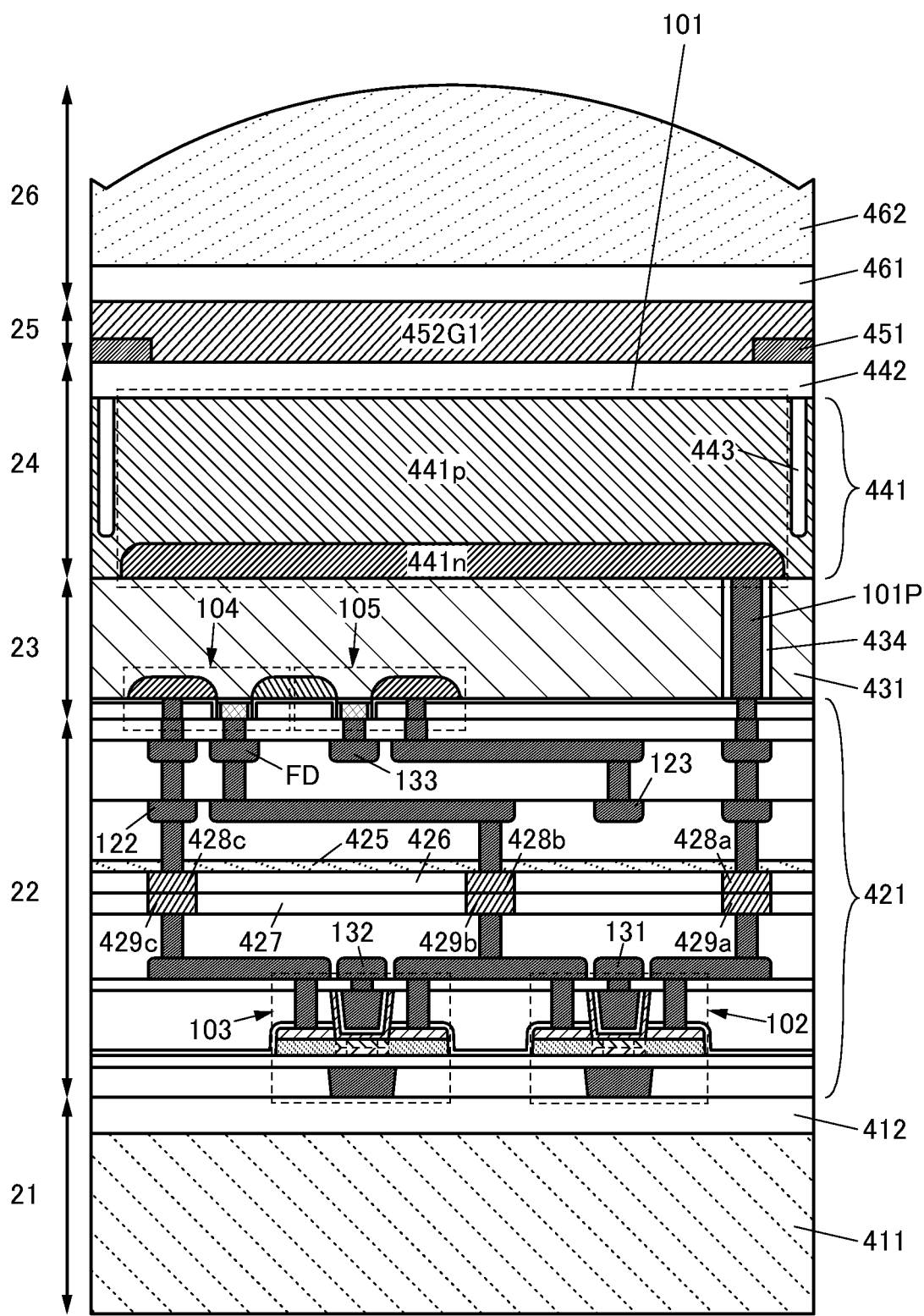
FIG. 28 is a diagram showing a pixel.

FIG. 28 shows an example in which the Si transistors and the OS transistors illustrated in FIG. 23 are electrically connected to each other by bonding.

In the structure illustrated in FIG. 28, an insulating layer 426, an insulating layer 427, conductive layers 428a, 428b, and 428c, and conductive layers 429a, 429b, and 429c are provided in the layer 22. The insulating layers 426 and 427 can be regarded as part of the insulating layer 421.

The conductive layer 428a is electrically connected to the cathode of the photoelectric conversion device 101. The conductive layer 428b is electrically connected to the gate of the transistor 104. The conductive layer 428c is electrically connected to the wiring 122. The conductive layer 429a is electrically connected to one of the source and the drain of the transistor 102. The conductive layer 429b is electrically connected to the other of the source and the drain of the transistor 102 and one of the source and the drain of the transistor 103. The conductive layer 429c is electrically connected to the other of the source and the drain of the transistor 103.

Description is made on bonding of the insulating layer 426 and the insulating layer 427, bonding of the conductive layer 428a and the conductive layer 429a, bonding of the conductive layer 428b and the conductive layer 429b, and bonding of the conductive layer 428c and the conductive layer 429c.

The conductive layers 428a, 428b, and 428c each include a region embedded in the insulating layer 426. The surfaces of the conductive layers 428a, 428b, and 428c and the insulating layer 426 are planarized to be level with each other.

The conductive layers 429a, 429b, and 429c each include a region embedded in the insulating layer 427. The surfaces of the conductive layers 429a, 429b, and 429c and the insulating layer 427 are planarized to be level with each other.

Here, a main component of the conductive layers 428a, 428b, and 428c and a main component of the conductive layers 429a, 429b, and 429c are preferably the same metal element. Furthermore, the insulating layer 426 and the insulating layer 427 are preferably formed of the same component.

For the conductive layers 428a, 428b, and 428c and the conductive layers 429a, 429b, and 429c, Cu, Al, Sn, Zn, W, Ag, Pt, or Au can be used, for example. Preferably, Cu, Al, W, or Au is used for easy bonding. In addition, for the insulating layer 426 and the insulating layer 427, silicon oxide, silicon oxynitride, silicon nitride oxide, silicon nitride, titanium nitride, or the like can be used.

That is, the same metal material described above is preferably used for each of the combinations of the conductive layer 428a and the conductive layer 429a, the conductive layer 428b and the conductive layer 429b, and the conductive layer 428c and the conductive layer 429c. Furthermore, the same insulating material described above is preferably used for the insulating layer 426 and the insulating layer 427.

Note that the conductive layers 428a, 428b, and 428c and the conductive layers 429a, 429b, and 429c may each have a multilayer structure of a plurality of layers. In that case, the outer layers (bonding surfaces) of each of the combinations of the conductive layer 428a and the conductive layer 429a, the conductive layer 428b and the conductive layer 429b, and the conductive layer 428c and the conductive layer 429c are formed of the same metal material. The insulating layer 426 and the insulating layer 427 may each have a multilayer structure of a plurality of layers; in that case, the outer layers (bonding surfaces) are formed of the same insulating material.

Through the above bonding, the electrical connection between the conductive layer 428a and the conductive layer 429a, between the conductive layer 428b and the conductive layer 429b, and between the conductive layer 428c and the conductive layer 429c can be obtained. Moreover, the connection between the insulating layer 426 and the insulating layer 427 with mechanical strength can be obtained.

For bonding metal layers to each other, a surface activated bonding method in which an oxide film, a layer adsorbing impurities, and the like on the surface are removed by sputtering or the like and the cleaned and activated surfaces are brought into contact to be bonded to each other can be used. Alternatively, a diffusion bonding method in which the surfaces are bonded to each other by using temperature and pressure together can be used, for example. Both methods cause bonding at an atomic level, and therefore not only electrically but also mechanically excellent bonding can be obtained.

For bonding insulating layers to each other, a hydrophilic bonding method or the like can be used; in the method, after high planarity is obtained by polishing or the like, the surfaces of the insulating layers subjected to hydrophilicity treatment with oxygen plasma or the like are brought into contact and bonded to each other temporarily, and then dehydrated by heat treatment to perform final bonding. The hydrophilic bonding method can also cause bonding at an atomic level; thus, mechanically excellent bonding can be obtained.

In the case where the insulating layers and the metal layers coexist on their bonding surfaces, the surface activated bonding method and the hydrophilic bonding method are performed in combination, for example.

For example, a method can be used in which the surfaces are made clean after polishing, the surfaces of the metal layers are subjected to antioxidant treatment and hydrophilicity treatment, and then bonding is performed. Furthermore, hydrophilicity treatment may be performed on the surfaces of the metal layers being hardly oxidizable metal such as Au. Note that a bonding method other than the above-mentioned methods may be used.

The stacked structure illustrated in FIG. 28 can be formed by the aforementioned bonding.

<Package and Module>

FIG. 30A1 is an external perspective view of the top surface side of a package in which an image sensor chip is placed. The package includes a package substrate 510 to which an image sensor chip 550 (see FIG. 30A3) is fixed, a cover glass 520, an adhesive 530 for bonding them, and the like.

FIG. 30A2 is an external perspective view of the bottom surface side of the package. A BGA (Ball grid array) in which solder balls are used as bumps 540 on the bottom surface of the package is employed. Without being limited to the BGA, an LGA (Land grid array), a PGA (Pin Grid Array), or the like may be employed.

FIG. 30A3 is a perspective view of the package, in which parts of the cover glass 520 and the adhesive 530 are not illustrated. Electrode pads 560 are formed over the package substrate 510, and the electrode pads 560 and the bumps 540 are electrically connected to each other via through-holes. The electrode pads 560 are electrically connected to the image sensor chip 550 through wires 570.

FIG. 30B1 is an external perspective view of the top surface side of a camera module in which an image sensor chip is placed in a package with a built-in lens. The camera module includes a package substrate 511 to which an image sensor chip 551 (see FIG. 30B3) is fixed, a lens cover 521, a lens 535, and the like. An IC chip 590 (see FIG. 30B3) having functions of a driver circuit, a signal conversion circuit, and the like of an imaging device is provided between the package substrate 511 and the image sensor chip 551; thus, the structure as an SiP (System in package) is included.

FIG. 30B2 is an external perspective view of the bottom surface side of the camera module. A QFN (Quad flat no-lead package) structure in which lands 541 for mounting are provided on the bottom surface and side surfaces of the package substrate 511 is employed. Note that this structure is only an example, and a QFP (Quad flat package) or the above-mentioned BGA may also be provided.

FIG. 30B3 is a perspective view of the module, in which parts of the lens cover 521 and the lens 535 are not illustrated. The lands 541 are electrically connected to electrode pads 561, and the electrode pads 561 are electrically connected to the image sensor chip 551 or the IC chip 590 through wires 571.

The image sensor chip placed in a package having the above form can be easily mounted on a printed circuit board and the like; hence, the image sensor chip can be incorporated into a variety of semiconductor devices and electronic devices.

This embodiment can be combined with the description of the other embodiments as appropriate.

Embodiment 4

As electronic devices that can use the imaging device of one embodiment of the present invention, display apparatuses, personal computers, image memory devices or image reproducing devices provided with storage media, mobile phones, game machines including portable game machines, portable data terminals, e-book readers, cameras such as video cameras and digital still cameras, goggle-type displays (head mounted displays), navigation systems, audio reproducing devices (car audio players, digital audio players, and the like), copiers, facsimiles, printers, multifunction printers, automated teller machines (ATM), vending machines, and the like are given. FIG. 31A to FIG. 31F illustrate specific examples of these electronic devices.

Figure 31A:
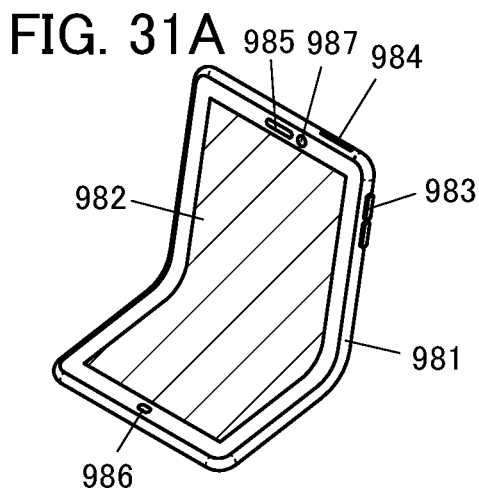
FIG. 31A to FIG. 31F are diagrams each showing an electronic device.

FIG. 31A is an example of a mobile phone, which includes a housing 981, a display portion 982, an operation button 983, an external connection port 984, a speaker 985, a microphone 986, a camera 987, and the like. The display portion 982 of the mobile phone is provided with a touch sensor. A variety of operations such as making a call and inputting text can be performed by touch on the display portion 982 with a finger, a stylus, or the like. The imaging device of one embodiment of the present invention and the operation method thereof can be used in the mobile phone, enabling an infrared light image as well as a color image to be obtained.

Figure 31B:
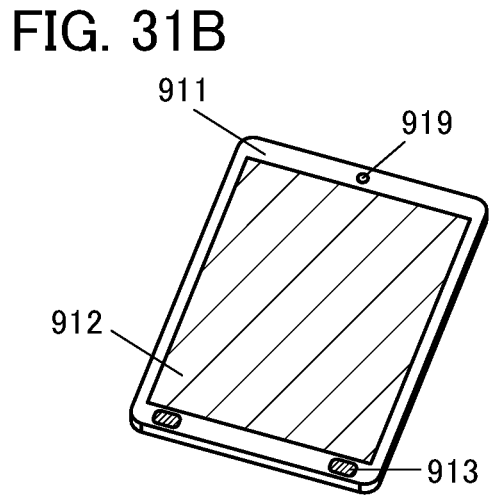

FIG. 31B is a portable data terminal, which includes a housing 911, a display portion 912, a speaker 913, a camera 919, and the like. A touch panel function of the display portion 912 enables input and output of information. Furthermore, a character or the like in an image that is captured by the camera 919 can be recognized and the character can be voice-output from the speaker 913. The imaging device of one embodiment of the present invention and the operation method thereof can be used in the portable data terminal, enabling an infrared light image as well as a color image to be obtained.

Figure 31C:
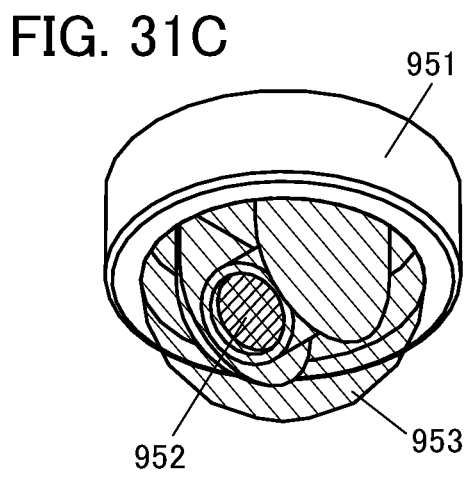

FIG. 31C is a surveillance camera, which includes a support base 951, a camera unit 952, a protection cover 953, and the like. By setting the camera unit 952 provided with a rotating mechanism and the like on a ceiling, an image of all of the surroundings can be taken. The imaging device of one embodiment of the present invention and the operation method thereof can be used for obtaining an image in the camera unit, enabling an infrared light image as well as a color image to be obtained. Note that a surveillance camera is a name in common use and does not limit the use thereof. A device that has a function of a surveillance camera can also be called a camera or a video camera, for example.

Figure 31D:
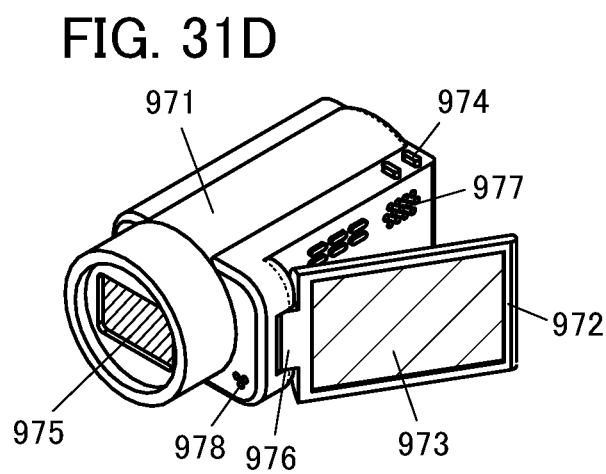

FIG. 31D is a video camera, which includes a first housing 971, a second housing 972, a display portion 973, an operation key 974, a lens 975, a connection portion 976, a speaker 977, a microphone 978, and the like. The operation key 974 and the lens 975 are provided for the first housing 971, and the display portion 973 is provided for the second housing 972. The imaging device of one embodiment of the present invention and the operation method thereof can be used in the video camera, enabling an infrared light image as well as a color image to be obtained.

Figure 31E:
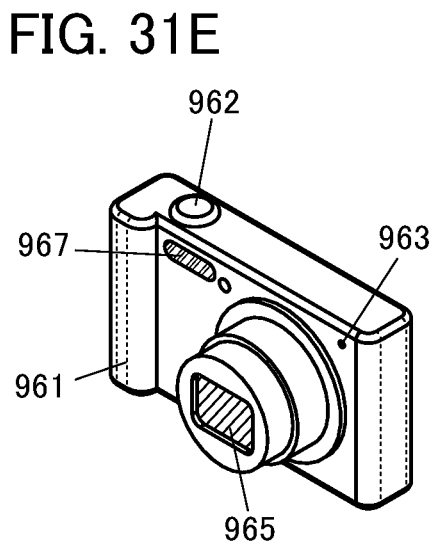

FIG. 31E is a digital camera, which includes a housing 961, a shutter button 962, a microphone 963, a light-emitting portion 967, a lens 965, and the like. The imaging device of one embodiment of the present invention and the operation method thereof can be used in the digital camera, enabling an infrared light image as well as a color image to be obtained.

Figure 31F:
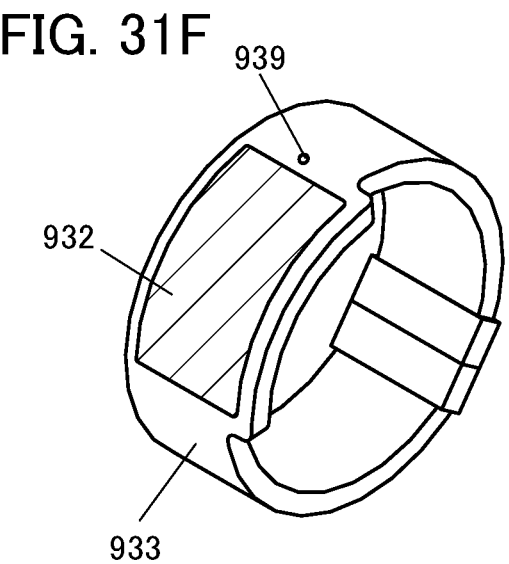

FIG. 31F is a wrist-watch-type information terminal, which includes a display portion 932, a housing and wristband 933, a camera 939, and the like. The display portion 932 is provided with a touch panel for performing the operation of the information terminal. The display portion 932 and the housing and wristband 933 have flexibility and fit a body well. The imaging device of one embodiment of the present invention and the operation method thereof can be used in the information terminal, enabling an infrared light image as well as a color image to be obtained.

Figure 32:
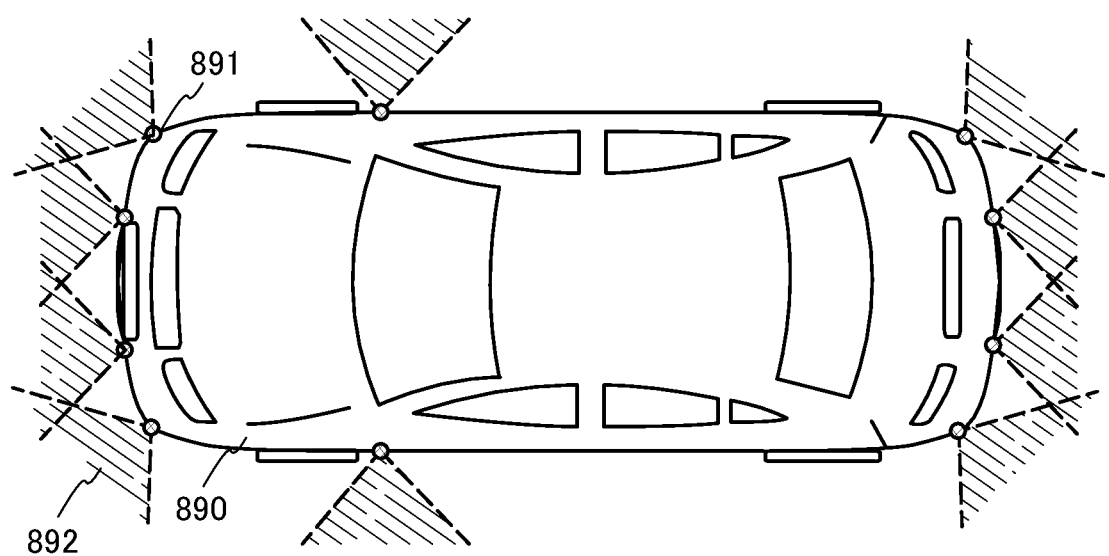
FIG. 32 is a diagram showing an automobile.

FIG. 32 illustrates an external view of an automobile as an example of a moving object. An automobile 890 includes a plurality of cameras 891 and the like to acquire information on the front, back, left, and right of the automobile 890. The imaging device of one embodiment of the present invention and the operation method thereof can be used in the cameras 891. The automobile 890 is also provided with various sensors such as an infrared radar, a millimeter wave radar, and a laser radar (not illustrated) and the like. The automobile 890 judges traffic conditions therearound such as the presence of a guardrail or a pedestrian by processing a plurality of images in a plurality of image capturing directions 892 taken by the cameras 891, and thus can perform autonomous driving. Furthermore, it can be used in a system for navigation, risk prediction, or the like.

When arithmetic processing with a neural network or the like is performed on the image data obtained by the cameras 891, for example, processing such as an increase in image resolution, a reduction in image noise, face recognition (for security reasons or the like), object recognition (for autonomous driving or the like), image compression, image compensation (a wide dynamic range), restoration of an image of a lensless image sensor, positioning, character recognition, and reduction of glare and reflection can be performed.

Note that an automobile is described above as an example of a moving object and may be any of an automobile having an internal-combustion engine, an electric vehicle, a hydrogen vehicle, and the like. Furthermore, the moving object is not limited to an automobile. Examples of moving objects include a train, a monorail train, a ship, and a flying object (a helicopter, an unmanned aircraft (a drone), an airplane, and a rocket), and these moving objects can include a system utilizing artificial intelligence when equipped with the computer of one embodiment of the present invention.

This embodiment can be combined with the description of the other embodiments as appropriate.

REFERENCE NUMERALS

10: pixel, 21: layer, 22: layer, 23: layer, 24: layer, 25: layer, 26: layer, 31: pixel array, 32: circuit, 33: circuit, 34: circuit, 35: circuit, 36: circuit, 38: circuit, 100: pixel, 101: photoelectric conversion device, 101C: photoelectric conversion device, 101D: photoelectric conversion device, 101P: plug, 102: transistor, 102$n$: low-resistance region, 102P: plug, 103: transistor, 103P: plug, 104: transistor, 105: transistor, 106: capacitor, 107: transistor, 107P: plug, 108: transistor, 121: wiring, 122: wiring, 122P: plug, 123: wiring, 123P: plug, 124: wiring, 125: wiring, 131: wiring, 131P: plug, 132: wiring, 132P: plug, 133: wiring, 133_1: wiring, 133_2: wiring, 133_3: wiring, 133P: plug, 134: wiring, 135: wiring, 135_1: wiring, 135_2: wiring, 135_3: wiring, 161: transistor, 162: transistor, 163: capacitor, 191: transistor, 192: transistor, 193: transistor, 194: transistor, 195: transistor, 200: pixel block, 201: circuit, 202: capacitor, 203: transistor, 204: transistor, 205: transistor, 206: transistor, 207: transistor, 211: wiring, 212: wiring, 213: wiring, 215: wiring, 216: wiring, 217: wiring, 218: wiring, 219: wiring, 300: pixel array, 301: circuit, 302: circuit, 303: circuit, 304: circuit, 305: circuit, 311: wiring, 320: memory cell, 325: reference memory cell, 330: circuit, 350: circuit, 360: circuit, 370: circuit, 412: insulating layer, 416: insulating layer, 417: semiconductor layer, 421: insulating layer, 422: insulating layer, 423: circuit, 424: wiring, 425: insulating layer, 426: insulating layer, 427: insulating layer, 428$a$: conductive layer, 428$b$: conductive layer, 428$c$: conductive layer, 429$a$: conductive layer, 429$b$: conductive layer, 429$c$: conductive layer, 431: semiconductor layer, 432: circuit, 433: circuit, 434: insulator, 441: single crystal silicon substrate, 441$n$: layer, 441$p$: layer, 442: insulating layer, 443: element separation layer, 451: light-blocking layer, 452: photoelectric conversion layer, 452B: color filter, 452G: color filter, 452G1: color filter, 452G2: color filter, 4521R: infrared filter, 452R: color filter, 452UV: ultraviolet filter, 461: insulating layer, 462: microlens array, 510: package substrate, 511: package substrate, 520: cover glass, 521: lens cover, 530: adhesive, 535: lens, 540: bump, 541: land, 550: image sensor chip, 551: image sensor chip, 560: electrode pad, 561: electrode pad, 565$a$: layer, 565$b$: layer, 565$c$: layer, 570: wire, 571: wire, 590: IC chip, 701: gate electrode, 702: gate insulating film, 703: source region, 704: drain region, 705: source electrode, 706: drain electrode, 707: oxide semiconductor layer, 708: channel formation region, 735: back gate, 890: automobile, 891: camera, 892: image capturing direction, 911: housing, 912: display portion, 913: speaker, 919: camera, 932: display portion, 933: housing and wristband, 939: camera, 951: support base, 952: camera unit, 953: protection cover, 961: housing, 962: shutter button, 963: microphone, 965: lens, 967: light-emitting portion, 971: housing, 972: housing, 973: display portion, 974: operation key, 975: lens, 976: connection portion, 977: speaker, 978: microphone, 981: housing, 982: display portion, 983: operation button, 984: external connection port, 985: speaker, 986: microphone, 987: camera

The invention claimed is:

1. An imaging device comprising a first layer, a second layer, and a third layer,
   wherein the first layer overlaps the third layer with the second layer provided therebetween,
   wherein the first layer includes a photoelectric conversion device comprising a single crystal silicon substrate,
   wherein a light-receiving plane of the photoelectric conversion device is a first plane of the single crystal silicon substrate, wherein the second layer includes a semiconductor layer and a first transistor having a channel formation region in a part of the semiconductor layer, wherein the semiconductor layer is provided in contact with a second plane of the single crystal silicon substrate opposite to the first plane of the single crystal silicon substrate, wherein the third layer includes a second transistor having a channel formation region in a metal oxide layer, wherein the second transistor is electrically connected to the first transistor and the photoelectric conversion device, and wherein the photoelectric conversion device has a first region overlapping the first transistor and a second region overlapping the second transistor.

2. The imaging device according to claim 1, wherein the semiconductor layer is a silicon epitaxial growth layer formed on the single crystal silicon substrate.

3. The imaging device according to claim 1, wherein the first transistor is a component of one of a pixel circuit and a driver circuit of the pixel circuit.

4. The imaging device according to claim 1, wherein the metal oxide layer comprises at least In.

5. The imaging device according to claim 1, wherein the metal oxide layer comprises In, Zn, and M (M is one or more of Al, Ti, Ga, Ge, Sn, Y, Zr, La, Ce, Nd, and Hf).

6. The imaging device according to claim 1, wherein the second transistor is a component of one of a pixel circuit and a driver circuit of the pixel circuit.

7. The imaging device according to claim 1, further comprising a fourth layer overlapping the second layer with the first layer provided therebetween, wherein the fourth layer includes a color filter, and wherein the color filter includes a region overlapping with the photoelectric conversion device.

8. An electronic device comprising the imaging device according to claim 1 and a display device.

9. A moving object comprising the imaging device according to claim 1.

10. An imaging device comprising a first layer, a second layer, and a third layer, wherein the first layer overlaps the third layer with the second layer provided therebetween, wherein the first layer includes a photoelectric conversion device comprising a single crystal silicon substrate, wherein a light-receiving plane of the photoelectric conversion device is a first plane of the single crystal silicon substrate, wherein the second layer includes a semiconductor layer and a first transistor having a channel formation region in a part of the semiconductor layer, wherein the semiconductor layer is provided in contact with a second plane of the single crystal silicon substrate opposite to the first plane of the single crystal silicon substrate, wherein the semiconductor layer is a single crystal silicon layer continuous from the single crystal silicon substrate, wherein the third layer includes a second transistor having a channel formation region in a metal oxide layer, wherein the second transistor is electrically connected to the photoelectric conversion device and the first transistor, and wherein the photoelectric conversion device has a first region overlapping the first transistor and a second region overlapping the second transistor.

11. An imaging device comprising:

a photoelectric conversion device comprising a single crystal silicon substrate, a light-receiving plane of the photoelectric conversion device being a first plane of the single crystal silicon substrate;

a semiconductor layer in contact with a second plane of the single crystal silicon substrate opposite to the first plane of the single crystal silicon substrate;

a first transistor having a channel formation region in a part of the semiconductor layer; and a second transistor provided under and electrically connected to the first transistor, the second transistor having a channel formation region in a metal oxide layer, wherein the semiconductor layer is a single crystal silicon layer continuous from the single crystal silicon substrate, wherein the second transistor is electrically connected to the photoelectric conversion device via a plug provided in an opening portion penetrating the semiconductor layer, and wherein the photoelectric conversion device has a first region overlapping the first transistor and a second region overlapping the second transistor.

12. The imaging device according to claim 11, wherein the semiconductor layer is a silicon epitaxial growth layer formed on the single crystal silicon substrate.

13. The imaging device according to claim 11, wherein the first transistor is a component of one of a pixel circuit and a driver circuit of the pixel circuit.

14. The imaging device according to claim 11, wherein the second transistor is a component of one of a pixel circuit and a driver circuit of the pixel circuit.

15. The imaging device according to claim 11, wherein the metal oxide layer comprises at least In.

16. The imaging device according to claim 11, wherein the metal oxide layer comprises In, Zn, and M (M is one or more of Al, Ti, Ga, Ge, Sn, Y, Zr, La, Ce, Nd, and Hf).

17. The imaging device according to claim 11, further comprising a color filter overlapping the photoelectric conversion device.

18. An electronic device comprising the imaging device according to claim 11 and a display device.

* * * * *